U S008896612B2

(12) United States Patent  
Chowdhry et al.

(10) Patent No.: US 8,896,612 B2  
(45) Date of Patent: Nov. 25, 2014

(54) SYSTEM AND METHOD FOR ON-THE-FLY KEY COLOR GENERATION

(75) Inventors: Anita Chowdhry, Saratoga, CA (US); Subir Ghosh, San Jose, CA (US)

(73) Assignee: nComputing Inc., Santa Clara, CA (US)

( * ) Notice: Subject to any disclaimer, the term of this patent is extended or adjusted under 35 U.S.C. 154(b) by 348 days.

(21) Appl. No.: 12/947,294

(22) Filed: Nov. 16, 2010

(65) Prior Publication Data

US 2012/0120320 A1    May 17, 2012

(51) Int. Cl.
| | |
|---|---|
| G09G 5/36 | (2006.01) |
| G09G 5/397 | (2006.01) |
| H04N 9/75 | (2006.01) |
| G06F 3/14 | (2006.01) |
| G09G 5/14 | (2006.01) |
| G09G 5/02 | (2006.01) |

(52) U.S. Cl.
CPC .. *H04N 9/75* (2013.01); *G06F 3/14* (2013.01); *G09G 5/14* (2013.01); *G09G 5/397* (2013.01); *G06F 3/1415* (2013.01); *G06F 3/1454* (2013.01); *G09G 5/026* (2013.01); *G09G 2320/10* (2013.01); *G09G 2340/02* (2013.01); *G09G 2340/125* (2013.01); *G09G 2350/00* (2013.01); *G09G 2360/10* (2013.01); *G09G 2360/125* (2013.01); *G09G 2370/022* (2013.01)
USPC .......... 345/546; 345/629; 345/591; 345/641; 345/547; 345/545

(58) Field of Classification Search
USPC ........... 715/249; 345/629, 591, 545–547, 641
See application file for complete search history.

(56) References Cited

U.S. PATENT DOCUMENTS

| | | | |
|---|---|---|---|
| 5,402,147 A |   3/1995 | Chen et al. | |
| 5,469,223 A |  11/1995 | Kimura | |
| 5,844,541 A * | 12/1998 | Cahill, III | ..................... 345/667 |
| 5,995,120 A |  11/1999 | Dye | |
| 6,014,125 A * |  1/2000 | Herbert | ......................... 345/660 |
| 6,278,645 B1 |   8/2001 | Buckelew et al. | |
| 6,313,822 B1 |  11/2001 | McKay et al. | |
| 6,411,333 B1 |   6/2002 | Auld et al. | |

(Continued)

FOREIGN PATENT DOCUMENTS

| | | |
|---|---|---|
| WO | WO-2009108345 A2 |  9/2009 |
| WO | WO-2009108345 A3 | 12/2009 |
| WO | WO-2012054720 A1 |  4/2012 |
| WO | WO-2012068242 A1 |  5/2012 |

OTHER PUBLICATIONS

"International Application Serial No. PCT/US2009/01239, International Search Report mailed Apr. 21, 2009", 4 pgs.

(Continued)

*Primary Examiner* — Nathan Hillery  
(74) *Attorney, Agent, or Firm* — Schwegman Lundberg & Woessner, P.A.

(57) ABSTRACT

The video output system in a computer system reads pixel information from a frame buffer to generate a video output signal. In addition, a full-motion video may also be displayed. Reading from both the frame buffer and the full-motion video buffer when displaying the full-motion video window wastes valuable memory bandwidth. Thus, the disclosed system provides a system and methods for identifying where the video output system must read from the frame buffer and where it must read from the full-motion video buffer while minimizing the amount of area it reads from both the frame buffer and the full-motion video buffer.

31 Claims, 40 Drawing Sheets

(56) References Cited

U.S. PATENT DOCUMENTS

| | | |
|---|---|---|
| 6,448,974 B1 * | 9/2002 | Asaro et al. .................. 345/591 |
| 6,516,283 B2 | 2/2003 | McCall et al. |
| 6,519,283 B1 | 2/2003 | Cheney et al. |
| 7,400,328 B1 | 7/2008 | Ye et al. |
| 7,746,346 B2 | 6/2010 | Woo |
| 8,279,138 B1 | 10/2012 | Margulis |
| 2002/0183958 A1 * | 12/2002 | McCall et al. ................ 702/141 |
| 2006/0028583 A1 | 2/2006 | Lin et al. |
| 2006/0282855 A1 | 12/2006 | Margulis |
| 2007/0132784 A1 | 6/2007 | Easwar et al. |
| 2007/0182748 A1 * | 8/2007 | Woo .............................. 345/506 |
| 2009/0279609 A1 | 11/2009 | De Haan et al. |
| 2009/0303156 A1 | 12/2009 | Ghosh et al. |
| 2012/0127185 A1 | 5/2012 | Chowdhry et al. |

OTHER PUBLICATIONS

"International Application Serial No. PCT/US2009/01239, Written Opinion mailed Apr. 21, 2009", 4 pgs.

"U.S. Appl. No. 12/908,365, Preliminary Amendment mailed", 3 pgs.

"International Application Serial No. PCT/US2011/057089, Search Report Mailed Jan. 23, 2012", 4 pgs.

"International Application Serial No. PCT/US2011/057089, Written Opinion Mailed Jan. 23, 2012", 4 pgs.

"International Application Serial No. PCT/US2011/060982, International Search Report mailed Mar. 19, 2012", 2 pgs.

"International Application Serial No. PCT/US2011/060982, Written Opinion mailed Mar. 19, 2012", 5 pgs.

"U.S. Appl. No. 12/908,365, Non Final Office Action mailed Mar. 28, 2013", 18 pgs.

"U.S. Appl. No. 12/908,365, Response filed Jun. 18, 2013 to Non Final Office Action mailed Mar. 28, 2013", 11 pgs.

"International Application Serial No. PCT/US2011/057089, International Preliminary Report on Patentability mailed May 2, 2013", 6 pgs.

"International Application Serial No. PCT/US2011/060982, International Preliminary Report on Patentability mailed May 30, 2013", 7 pgs.

"U.S. Appl. No. 12/908,365, Response filed Nov. 27, 2013 to Final Office Action mailed Sep. 3, 2013", 11 pgs.

"U.S. Appl. No. 12/908,365, Final Office Action mailed Sep. 3, 2013", 21 pgs.

"U.S. Appl. No. 13/301,429, Non Final Office Action mailed Dec. 11, 2013", 25 pgs.

"BitMatrix", (Colt 1.2.0—API Specification), Version 1.2.0, Last Published., Retrieved from the Internet: <URL:http://acs.lbl.gov/software/colt/api/cern/colt/bitvector/BitMatrix.html>, (Sep. 9, 2004), 10 pgs.

* cited by examiner

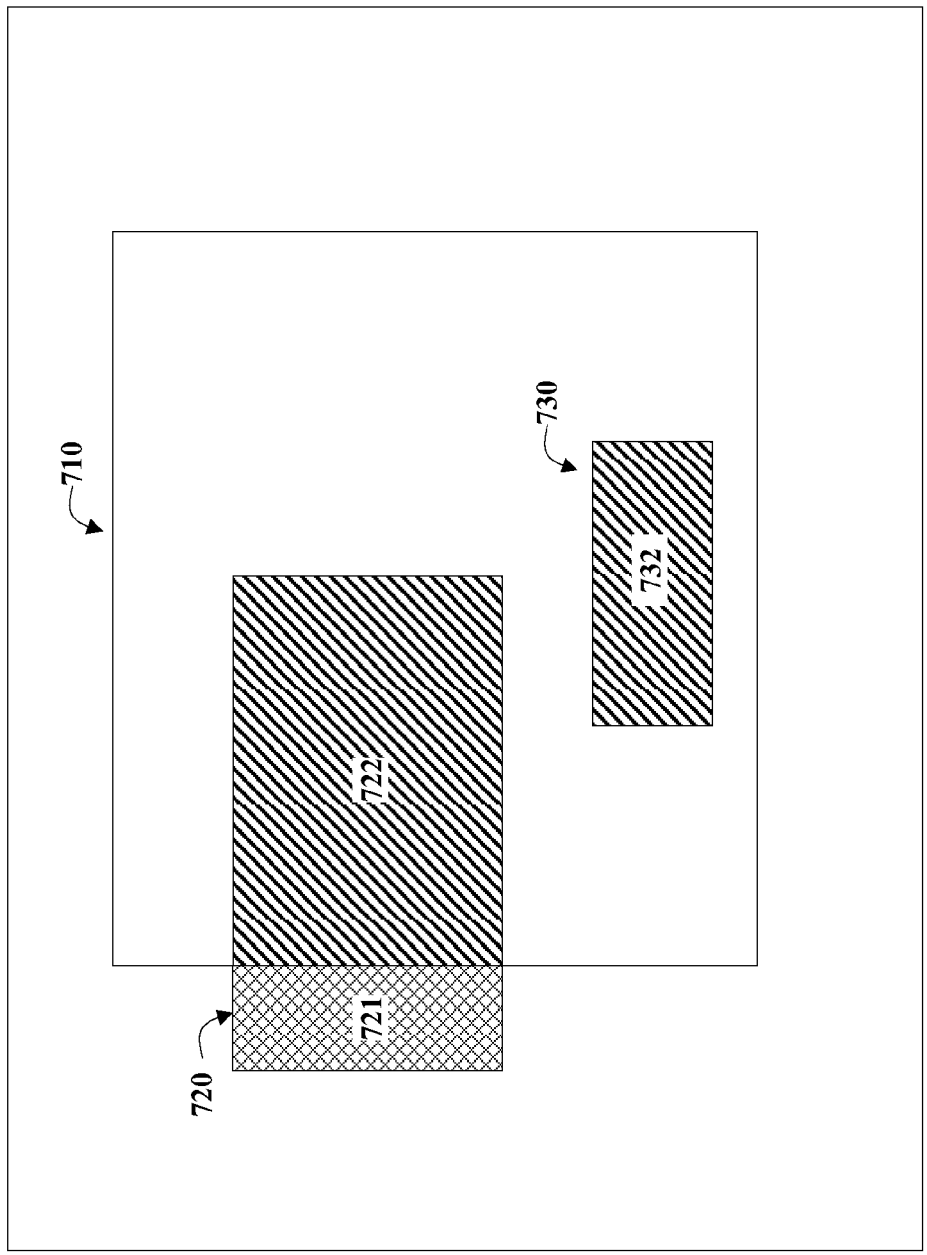

Figure 9E

|   | 0 | 1 | 2 | 3 | 4 | 5 | 6 |
|---|---|---|---|---|---|---|---|
| 7 |   |   |   |   |   |   |   |
| 6 |   |   |   |   |   |   |   |
| 5 |   | FB | FB | FB | FB | FB |   |
| 4 |   |   |   |   |   | FB |   |
| 3 |   | FB | FB | FB |   |   |   |
| 2 | FB | FB | FB |   |   | FB |   |
| 1 | FB | FB |   |   |   | FB |   |
| 0 |   |   |   |   |   | FB |   |

Figure 9H

| Horizontal Slices |
| --- |
| Slice 0 Row Start Address |
| Slice 0 Row End Address |
| Slice 1 Row Start Address |
| Slice 1 Row End Address |
| Slice 2 Row Start Address |
| Slice 2 Row End Address |
| Slice 3 Row Start Address |
| Slice 3 Row End Address |
| Slice 4 Row Start Address |
| Slice 4 Row End Address |
| Slice 5 Row Start Address |
| Slice 5 Row End Address |

| Vertical Slices |
| --- |
| Slice 0 Column Start Address |
| Slice 0 Column End Address |
| Slice 1 Column Start Address |
| Slice 1 Column End Address |
| Slice 2 Column Start Address |
| Slice 2 Column End Address |
| Slice 3 Column Start Address |
| Slice 3 Column End Address |
| Slice 4 Column Start Address |
| Slice 4 Column End Address |
| Slice 5 Column Start Address |
| Slice 5 Column End Address |

Column Group

| |
|---|
| Window A Top Left (X0,Y0) |
| Window A Bottom Right (X1,Y1) |
| Pointer to Next Window |
| Window B Top Left (X0,Y0) |
| Window B Bottom Right (X1,Y1) |
| Pointer to Next Window |
| Window C Top Left (X0,Y0) |
| Window C Bottom Right (X1,Y1) |
| Pointer to Next Window |
| Window D Top Left (X0,Y0) |
| Window D Bottom Right (X1,Y1) |
| Pointer to Next Window |
| ... |
| Window X Top Left (X0,Y0) |
| Window X Bottom Right (X1,Y1) |
| End of Table |

Row Group

| |
|---|
| Window A Top Left (X0,Y0) |
| Window A Bottom Right (X1,Y1) |
| Pointer to Next Window |
| Window B Top Left (X0,Y0) |
| Window B Bottom Right (X1,Y1) |
| Pointer to Next Window |
| Window C Top Left (X0,Y0) |
| Window C Bottom Right (X1,Y1) |
| Pointer to Next Window |
| Window D Top Left (X0,Y0) |
| Window D Bottom Right (X1,Y1) |
| Pointer to Next Window |
| ... |
| Window X Top Left (X0,Y0) |
| Window X Bottom Right (X1,Y1) |
| End of Table |

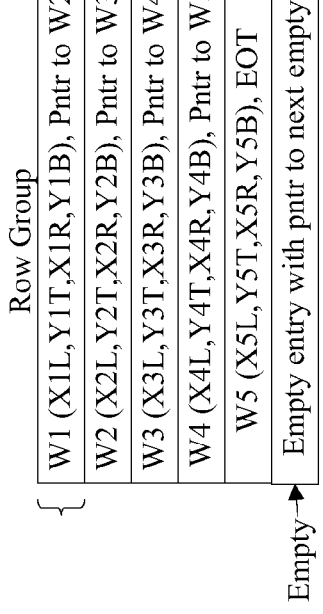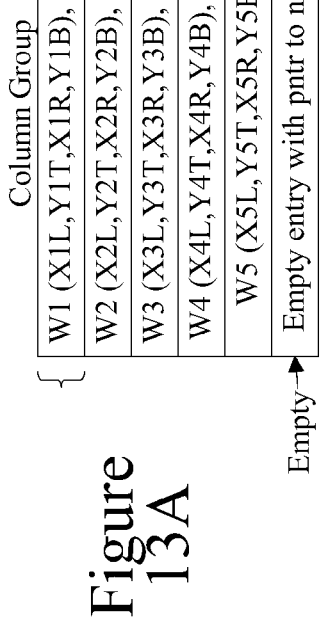
Figure 13A
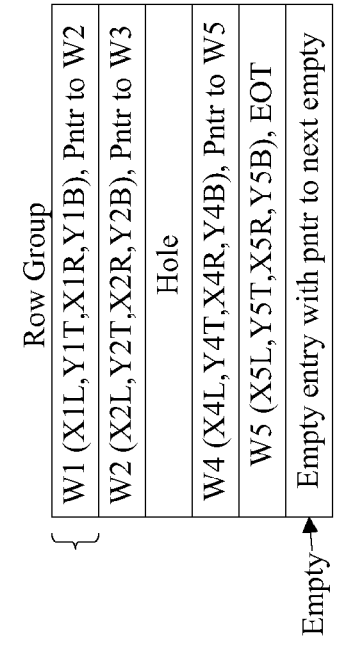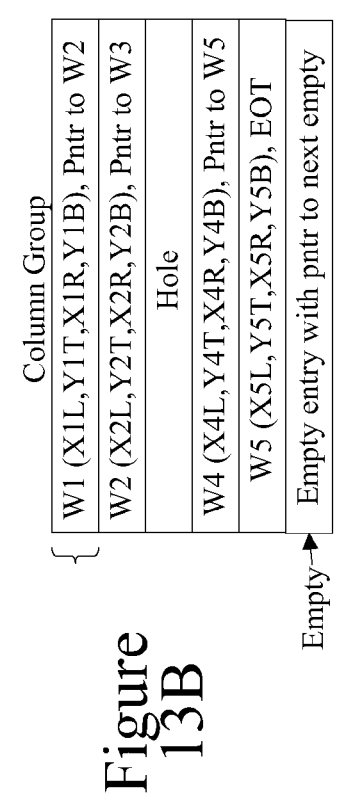
Figure 13B
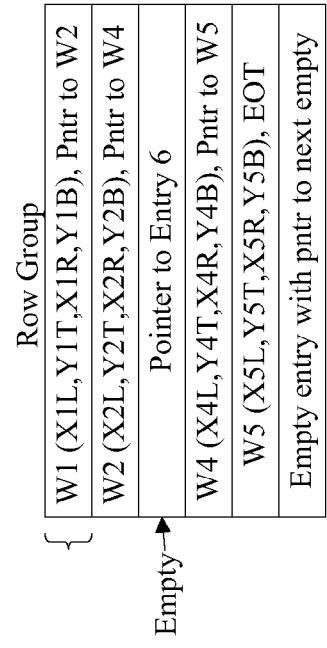
Figure 13C

| | 31 | 21 20 | 10 9 | 5 4 | 0 |
|---|---|---|---|---|---|
| W1 | W1T | W1B | H | L |
| W2 | W2T | W2B | P | U |
| | Empty | Empty | Empty | Empty |
| | Empty | Empty | Empty | Empty |
| | ⁓ | ⁓ | ⁓ | ⁓ |
| | Empty | Empty | Empty | Empty |
| | Empty | Empty | Empty | Empty |

| A | B | C | D | E | F | G | H | I | J | K | L | M | N | O | P | Q | R | S | T | U | V | W | X | Y | Z | AA | BB | CC | DD |
|---|---|---|---|---|---|---|---|---|---|---|---|---|---|---|---|---|---|---|---|---|---|---|---|---|---|----|----|----|----|

Figure 15E

| A | B | C | D | E | F | G | H | I | J | K | L | M | N | O | P | Q | R | S | T | U | V | W | X | Y | Z | AA | BB | CC | DD |
|---|---|---|---|---|---|---|---|---|---|---|---|---|---|---|---|---|---|---|---|---|---|---|---|---|---|----|----|----|----|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0  | 0  | 0  | 0  |

Figure 15F

| A | B | C | D | E | F | G | H | I | J | K | L | M | N | O | P | Q | R | S | T | U | V | W | X | Y | Z | AA | BB | CC | DD |
|---|---|---|---|---|---|---|---|---|---|---|---|---|---|---|---|---|---|---|---|---|---|---|---|---|---|----|----|----|----|
| 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 | 0 | 0 | 0  | 0  | 0  | 0  |

Figure 15G

| A | B | C | D | E | F | G | H | I | J | K | L | M | N | O | P | Q | R | S | T | U | V | W | X | Y | Z | AA | BB | CC | DD |
|---|---|---|---|---|---|---|---|---|---|---|---|---|---|---|---|---|---|---|---|---|---|---|---|---|---|----|----|----|----|
| 0 | 0 | 0 | 0 | 0 | 0 | 0 | 0 | 1 | 1 | 1 | 1 | 1 | 0 | 0 | 1 | 1 | 1 | 1 | 1 | 1 | 0 | 0 | 0 | 0 | 0 | 0  | 0  | 0  | 0  |

Figure 15H

| A | B | C | D | E | F | G | H | I | J | K | L | M | N | O | P | Q | R | S | T | U | V | W | X | Y | Z | AA | BB | CC | DD |
|---|---|---|---|---|---|---|---|---|---|---|---|---|---|---|---|---|---|---|---|---|---|---|---|---|---|----|----|----|----|
| 0 | 0 | 0 | 0 | 0 | 0 | 0 | 0 | 0 | 0 | 0 | 0 | 0 | 0 | 0 | 1 | 1 | 1 | 1 | 1 | 1 | 0 | 0 | 0 | 0 | 0 | 0  | 0  | 0  | 0  |

Figure 16C

| A | B | C | D | E | F | G | H | I | J | K | L | M | N | O | P | Q | R | S | T | U | V | W | X | Y | Z | AA | BB | CC | DD |
|---|---|---|---|---|---|---|---|---|---|---|---|---|---|---|---|---|---|---|---|---|---|---|---|---|---|----|----|----|----|

AABBCCDD

Figure 16D

| A' | B' | C' | D' | E' | F' | G' | H' | I' | J' | K' | L' | M' | N' | O' | P' | Q' | R' |
|----|----|----|----|----|----|----|----|----|----|----|----|----|----|----|----|----|----|
| 0  | 0  | 0  | 0  | 0  | 0  | 0  | 0  | 0  | 0  | 0  | 0  | 0  | 0  | 0  | 0  | 0  | 0  |

Figure 16E

| A' | B' | C' | D' | E' | F' | G' | H' | I' | J' | K' | L' | M' | N' | O' | P' | Q' | R' |
|----|----|----|----|----|----|----|----|----|----|----|----|----|----|----|----|----|----|
| 0  | 0  | 1  | 1  | 1  | 0  | 0  | 0  | 0  | 0  | 0  | 0  | 0  | 0  | 0  | 0  | 0  | 0  |

Figure 16F

| A' | B' | C' | D' | E' | F' | G' | H' | I' | J' | K' | L' | M' | N' | O' | P' | Q' | R' |
|----|----|----|----|----|----|----|----|----|----|----|----|----|----|----|----|----|----|
| 0  | 0  | 1  | 1  | 1  | 0  | 0  | 0  | 0  | 1  | 1  | 1  | 0  | 0  | 0  | 0  | 0  | 0  |

Figure 16G

| A' | B' | C' | D' | E' | F' | G' | H' | I' | J' | K' | L' | M' | N' | O' | P' | Q' | R' |
|----|----|----|----|----|----|----|----|----|----|----|----|----|----|----|----|----|----|
| 0  | 0  | 0  | 0  | 0  | 0  | 0  | 0  | 0  | 1  | 1  | 1  | 0  | 0  | 0  | 0  | 0  | 0  |

SYSTEM AND METHOD FOR ON-THE-FLY KEY COLOR GENERATION

TECHNICAL FIELD

The present invention relates to the field of digital video. In particular, but not by way of limitation, the present invention discloses techniques for reducing redundant memory accesses in a digital video output system.

BACKGROUND

Video generation systems within computer systems generally use a large amount of memory and a large amount of memory bandwidth. At the very minimum, a video generation system requires a frame buffer that stores a digital representation of the image currently being rendered on the video display screen. The CPU of the computer system must access the frame buffer to change the displayed image in response to user inputs and the execution of application programs. Simultaneously, the entire frame buffer is read by a video generation system at a rate of 30 to 70 times per second to render an image of the frame buffer on a video display screen. The combined accesses of the CPU updating the image to display and the video generation system reading the image out in order to render a video output signal use a significant amount of memory bandwidth.

In addition to those minimum requirements, there are other video functions of a computer system that may consume processing cycles, memory, and memory bandwidth. For example, three-dimensional (3D) graphics, full-motion video, and graphical overlays may all need to be handled by the video memory system and the video display adapter.

Many computer systems now include special three-dimensional (3D) graphics rendering systems that read information from 3D models and render a two-dimensional (2D) representation in the frame buffer that must be displayed. The reading of the models and rendering of a two-dimensional representation may consume a very large amount of memory bandwidth. Thus, computer system systems that will do a significant amount of 3D rendering generally have separate specialized 3D rendering systems that use a separate 3D memory area. Some computer systems use 'double-buffering' wherein two frame buffers are used. The CPU generates one image in a frame buffer that is not being displayed and when the image is complete, the system switches from a frame buffer currently being displayed to the frame buffer that was just completed.

Full-motion video generation systems decode and display of full-motion video. In the computer context, full-motion video is the rendering of clips of television programming or film on a computer screen for the user. (This document will use the term 'full-motion video' when referring to such television or film clips to distinguish such full-motion video from the reading of normal desktop graphics for generation of a video signal for display on a video display monitor.) Full-motion video is generally represented in digital form as computer files containing encoded video or an encoded digital video stream received from an external source. To display such full-motion video, the computer system must decode the full-motion video and then merge the full-motion video with video data in the computer systems main frame buffer. Thus, the generation of full-motion video is a memory size and memory bandwidth intensive task. However, the display of full-motion video is a standard feature that is now expected in all modern computer systems.

In a full personal computer system, there is ample CPU processing power, memory, and memory bandwidth in order to perform all of the needed functions for rendering a complex composite video display signal. For example, the CPU may decode full-motion video stream, the CPU may render a desktop display screen in a frame buffer, and a video display adapter may then read the decoded full-motion video, combine the decoded full-motion video with the desktop display screen, and render a composite video display signal.

However, in small computer systems wherein the computing resources are much more limited the task of generating a video display can be much more difficult. For example, mobile telephones, handheld computer systems, netbooks, and terminal systems will have much less CPU, memory, and video display adapter resources than a typical personal computer system. Thus, in a small computer the task of rendering a composite video display can be very difficult. It would therefore be desirable to develop methods of improving the display systems for small computer systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 7B illustrates the display screen of FIG. 7A with a second window overlaid on top of the full-motion video window.

FIG. 9E illustrates a truth table that may be used to determine if a video scanning system is within of the overlay windows in the slice intersections of FIG. 9D.

FIG. 9H illustrates a truth table that may be used to determine if a video scanning system is within of the overlay windows in the slice intersections of FIG. 9D.

FIG. 9I illustrates a data structure that may be used to store horizontal and vertical slice definitions.

FIG. 10A illustrates a data structure that may be used to store an ordered column group of overlay windows and an ordered row group of overlay windows.

FIG. 13A illustrates an ordered column group table and an ordered column group table of windows overlaid on top of a full-motion video window.

FIG. 13B illustrates the ordered column group table and an ordered column group table of windows from FIG. 13A with one window entry deleted.

FIG. 13C illustrates the ordered column group table and an ordered column group table of windows from FIG. 13B with the deleted window entry added to free entry list.

FIG. 15C illustrates a data structure of FIG. 15B storing definitions of the two windows overlaid on top of the full-motion video window illustrated in FIG. 15A.

FIG. 15D illustrates a bit map data structure that may be used to specify which sections of a row within a full-motion video window should use data from a frame buffer and which sections should use data from a full-motion video buffer.

FIG. 15E illustrates the bit map data structure of FIG. 15D as it would be filled for rows 0 to W1T of the screen display illustrated in FIG. 15A.

FIG. 15F illustrates the bit map data structure of FIG. 15D as it would be filled for rows W1T to W2T of the screen display illustrated in FIG. 15A.

FIG. 15G illustrates the bit map data structure of FIG. 15D as it would be filled for rows W2T to W1B of the screen display illustrated in FIG. 15A.

FIG. 15H illustrates the bit map data structure of FIG. 15D as it would be filled for rows W1B to W2B of the screen display illustrated in FIG. 15A.

FIG. 16C illustrates a data structure that may be used to define the location of a full-motion video window in a frame buffer.

FIG. 16D illustrates a data structure that may be used to define the locations of overlay windows from row 0 to row W1T for the screen display of FIG. 16A.

FIG. 16E illustrates a data structure that may be used to define the locations of overlay windows from row W1T to row W2T for the screen display of FIG. 16A.

FIG. 16F illustrates a data structure that may be used to define the locations of overlay windows from row W2T to row W1B for the screen display of FIG. 16A.

FIG. 16G illustrates a data structure that may be used to define the locations of overlay windows from row W1B to row W2B for the screen display of FIG. 16A.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although an example embodiment is described with reference to thin-client terminal systems, the teachings of this disclosure may be used in any computer system with a digital display. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
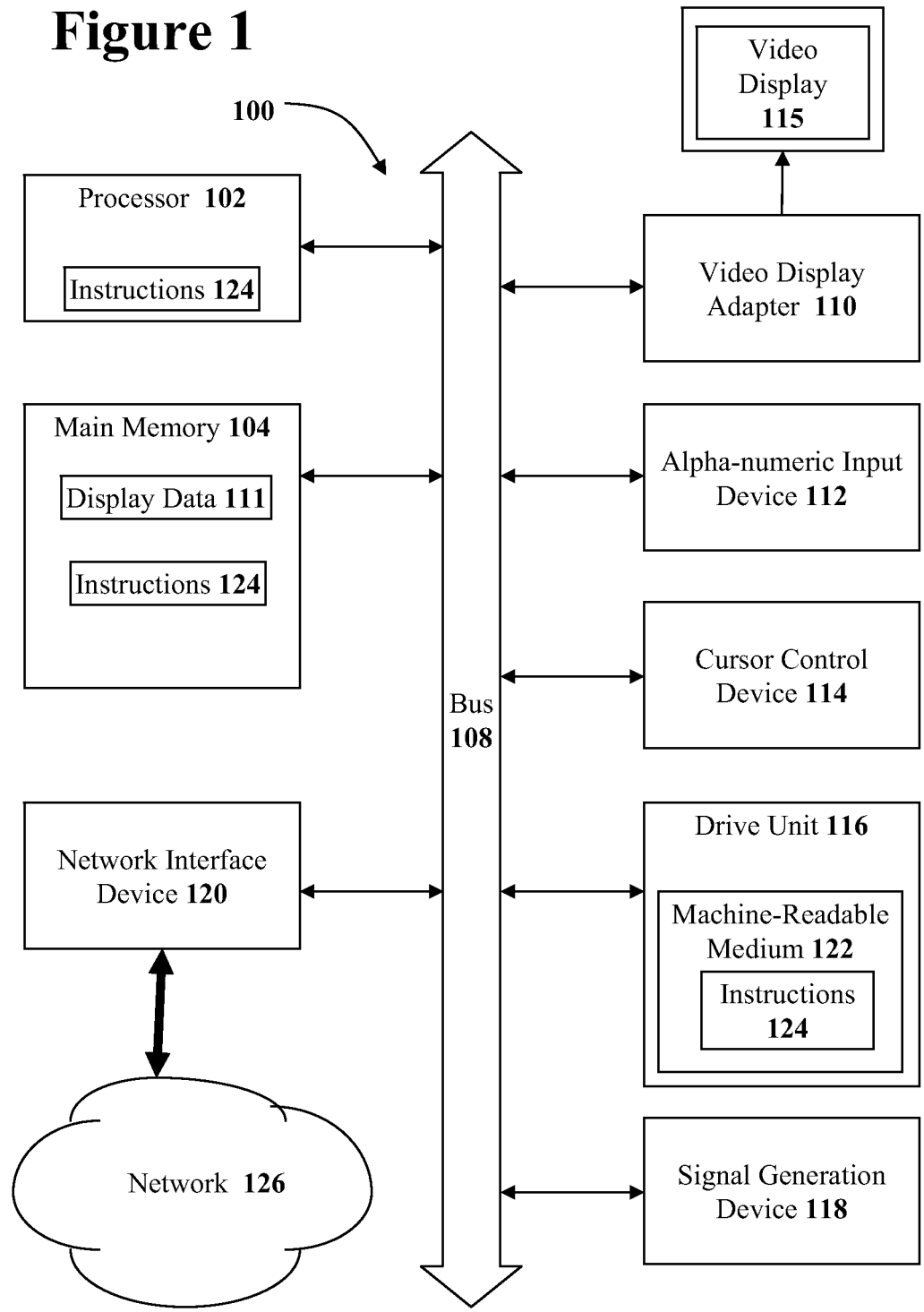
FIG. 1 illustrates a diagrammatic representation of machine in the example form of a computer system within which a set of instructions, for causing the machine to perform any one or more of the methodologies discussed herein, may be executed.

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), and a main memory 104 that communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

In many computer systems, a section of the main memory 104 is used to store display data 111 that will be accessed by the video display adapter 110 to generate a video signal. A section of memory that contains a digital representation of what the video display adapter 110 is currently outputting on the video display system 115 is generally referred to as a frame buffer. Some video display adapters store display data in a dedicated frame buffer located separate from the main memory. (For example, a frame buffer may reside within the video display adapter 110.) However, this application will primarily focus on computer systems that store a frame buffer in a shared memory system.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

Some computer systems may operate in a terminal mode wherein the system receives a full representation of display data to be stored in the frame buffer over the network interface device 120. Such computer systems will decode the display data and fill the frame buffer with the decoded display data. The video display adapter 110 will then render the received data on the video display system 115. In addition, a computer system may receive a stream of full-motion video for display. The computer system must decode the full-motion video stream data such that the full-motion video can be displayed. The video display adapter 110 must then merge that full-motion video data with display data in the frame buffer to generate a final display signal for the video display system 115.

In FIG. 1, the machine-readable medium 122 shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Computer Display Systems

A video display for computer system is made up of a matrix of individual pixels (picture elements). Each pixel is the individual "dot" on the video display device. The resolution of a video display device is defined as the number of pixels displayed on the video display device. For example, a video display monitor with a resolution of 800×600 will display a total of 480,000 pixels. Most modern computer systems can render video in several different display resolutions such that the computer system can take advantage of the specific resolution capabilities of the particular video display monitor coupled to the computer system.

In a computer system with a color display system, each individual pixel can be any different color that can be generated by the display system. Each individual pixel is represented in the frame buffer of the memory system with a digital value that specifies the pixel's color. The number of different colors that may be represented is limited by the number of bits assigned to each pixel. The number of bits per pixel is often referred to as the color-depth.

A single bit per pixel frame buffer would only be capable of representing black and white. A monochrome display would require a small number of bits to represent various shades of gray. A "High Color" display system is defined as each pixel containing 16 bits of color data where there is with 5 bits of red data, 6 bits of green data, and 5 bits of blue data. "True Color" is defined as each pixel containing 24 bits of data, with 8 bits of Red data, Green data, Blue data (RGB) each. Thus, True Color mode is synonymous with "24-bit" mode, and High Color "16-bit" mode. Due to reduced memory prices and the ability of 24-bit (True Color) to convincingly display any image without much noticeable degradation, most computer systems now use 24 bit "True Color" color. Some video systems may also use more than 24 bits per pixel wherein the extra bits are used to denote levels of transparency such that multiple depths of pixels may be combined.

To display an image on a video display system, the video display adapter of a computer system fetches pixel data from the frame buffer, interprets the color data, and then generates an appropriate display signal that is sent to a display device such as a liquid crystal display (LCD) panel. Only a single frame buffer is required to render a video display. However, more than one frame buffer may be present in a computer system memory depending on the application.

In a personal computer system, the video adapter system may have a separate video frame buffer that is in a dedicated video memory system. The video memory system may be designed specifically for handling the task of display data. Thus, in most personal computers the rendering of a video display can be handled easily. However, in small computer systems such as mobile telephones, handheld computer systems, netbooks, and terminal systems the computing resources tend to be much more limited. The computing resources may be limited due to cost, battery usage, heat dissipation, and other reasons. Thus, the task of generating a video display in a small computer system can be much more difficult. For example, a small computer system will generally have less CPU power, memory, and video display adapter resources than a personal computer system.

In a small computer system, there is often no separate video memory system. Thus, the video generation system must share the same memory as the rest of the small computer system. Since a video generation system must constantly read the entire frame buffer at high rate (generally 30 to 60 times per second), the memory bandwidth (the amount of data that can be read out of the memory system per unit time) can become a very scarce resource that limit functionality of the small computer system. Thus, it is important to devise methods of reducing the memory bandwidth requirements of applications within a small computer system.

Thin-Client Terminal System Overview

As set forth above, many different types of computer systems with limited resources may benefit from methods that reduce the memory bandwidth requirements This application will focus on an implementation within a small computer terminal system known as a thin-client terminal system. A thin-client terminal system is an inexpensive small computer system that is only designed to receive user input and transmit that input to a remote computer system and receive output information from that remote computer system and present that output information to the user. For example, a thin-client terminal system may transmit mouse movements and keystrokes received from a user to a remote computer system and display video output data received from the remote computer system. No user application programs execute on the processor of a dedicated thin-client terminal system.

Modern thin-client terminal systems strive to provide all of the standard interface features that personal computers provide to their users. For example, modern thin-client terminal systems includes high-resolution graphics capabilities, audio output, and cursor control (mouse, trackpad, trackball, etc.) input that personal computer users have become accustomed to using. To implement all of these features, modern thin-client terminal systems have small dedicated computer systems that implement all of the tasks such as decoding and rendering the video display and encoding the user inputs for transmission to the remote computer system.

Note that although the techniques set forth this document will be disclosed with reference to thin-client terminal systems, the techniques described herein are applicable in any other type of small computer system that needs to efficiently use limited computer resources. For example, any other small computer system that renders full-motion video such as mobile telephones, netbooks, slate computers, or other small systems may use the teachings of this document.

An Example Thin-Client System

Figure 2:
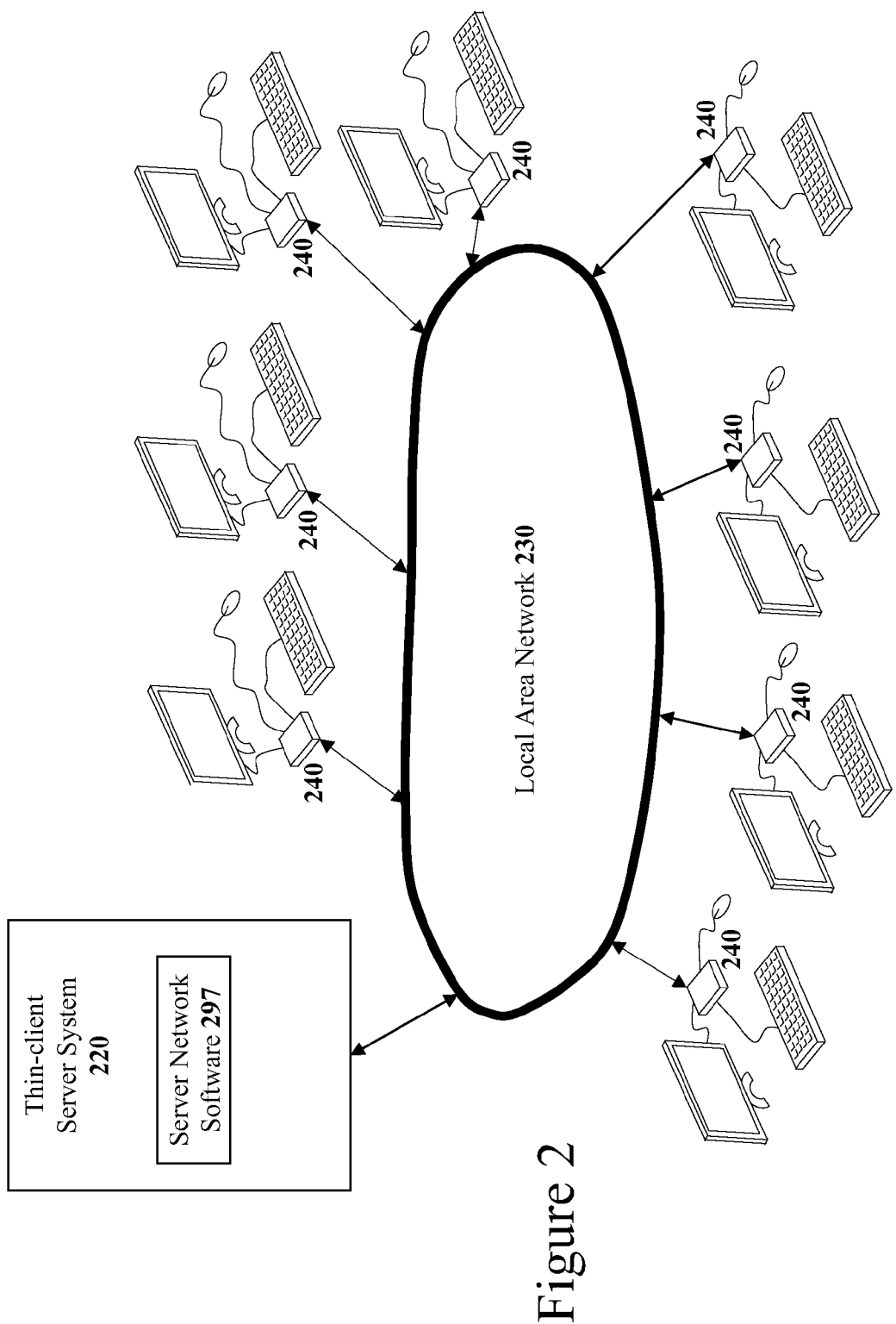
FIG. 2 illustrates a high-level block diagram of a single thin-client server computer system supporting multiple individual thin-client terminal systems using a local area network.

FIG. 2 illustrates a conceptual diagram of a thin-client environment. Referring to FIG. 2, a single thin-client server computer system 220 provides computer processing resources to many individual thin-client terminal systems 240. Computer applications execute on the server computer system 220 and the thin-client terminal systems 240 are only used for displaying output and receiving user input.

In the embodiment of FIG. 2, each of the individual thin-client terminal systems 240 is coupled to the thin-client server computer system 220 using local area network 230 as a bi-directional communication channel. The individual thin-client terminal systems 240 transmit user input (such as key strokes and mouse movements) across the local area network 230 to the thin-client server system 220 and the thin-client server system 220 transmits output information (such as video and audio) across the local area network 230 to the individual thin-client terminal systems 240.

Figure 3:
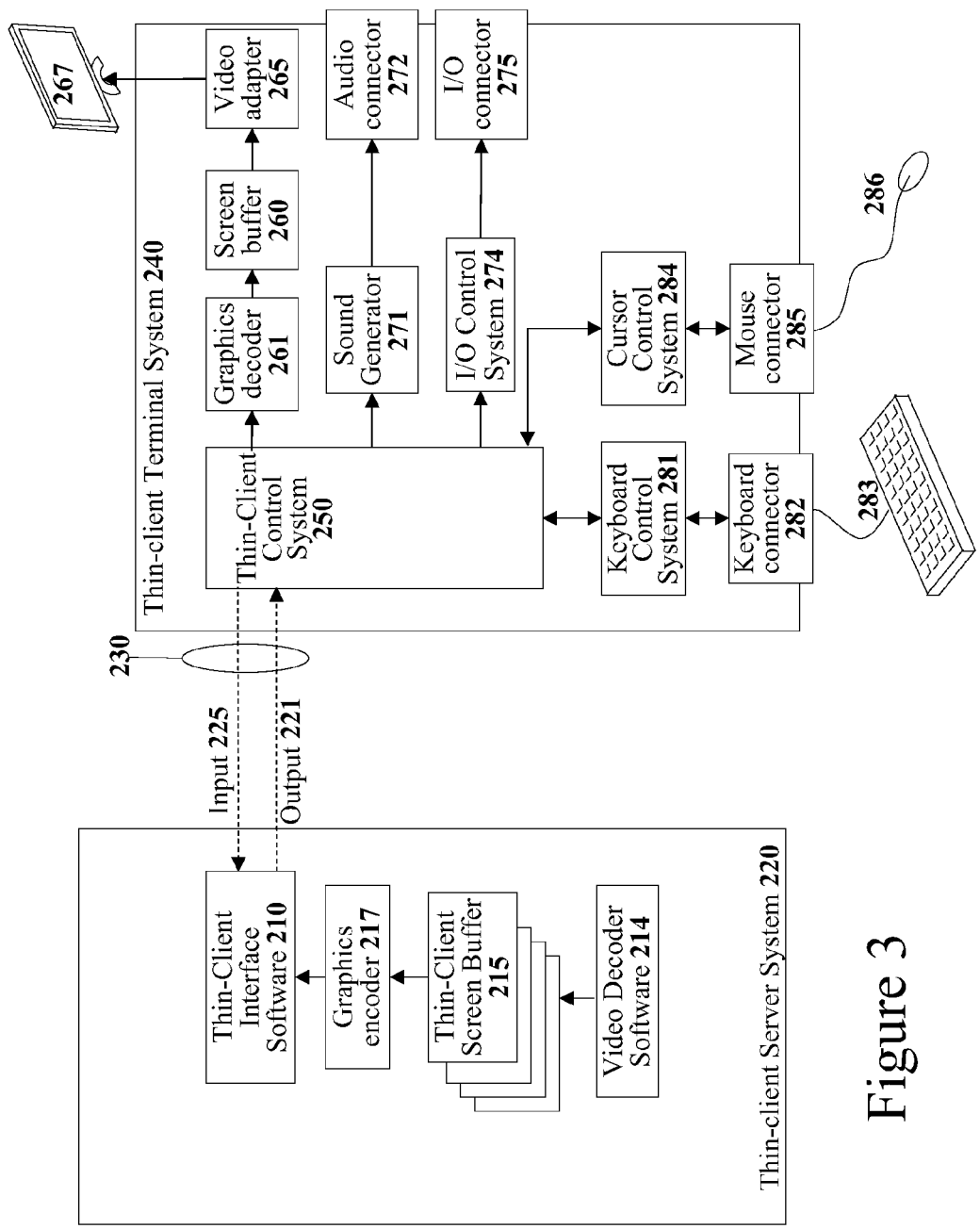
FIG. 3 illustrates a block diagram of one embodiment of a thin-client terminal system coupled to a thin-client server computer system.

FIG. 3 illustrates a block diagram of a basic embodiment of a thin-client server computer system 220 coupled to one (of possibly many) thin-client terminal system 240. The thin-client server computer system 220 and thin-client terminal system 240 are coupled with a bi-directional digital communications channel 230 that may be a serial data connection, an Ethernet connection, or any other suitable bi-directional digital communication means such as the local area network 230 of FIG. 2.

The goal of thin-client terminal system 240 is to provide most or all of the standard input and output features of a personal computer system to the user of the thin-client terminal system 240. However, this goal should be achieved at the lowest possible cost since if a thin-client terminal system 240 is too expensive, a personal computer system could be purchased instead of the inexpensive-client terminal system 240. Keeping the costs low can be achieved since the thin-client terminal system 240 will not need the full computing resources or software of a personal computer system. Those features will be provided by the thin-client server system 220 that will interact with the thin-client terminal system 240.

Referring back to FIG. 3, the thin-client terminal system 240 provides both visual and auditory output using a high-resolution video display system and an audio output system. The high-resolution video display system consists of a graphics update decoder 261, a screen buffer 260, and a video adapter 265. When changes are made to a representation of a terminal's display in thin-client screen buffer 215 within the server system 220, a graphics encoder 217 identifies those changes in the thin-client screen buffer 215, encodes the changes, and then transmits the changes to the thin-client terminal system 240.

Within the thin-client terminal system 240, the graphics update decoder 261 decodes graphical changes made to the associated thin-client screen buffer 215 in the server 220 and applies those same changes to the local screen buffer 260 thus making screen buffer 260 an identical copy of the bit-mapped display information in thin-client screen buffer 215. Video adapter 265 reads the video display information out of screen buffer 260 and generates a video display signal to drive display system 267.

From an input perspective, thin-client terminal system 240 allows a terminal system user to enter both alpha-numeric (keyboard) input and cursor control device (mouse) input that will be transmitted to the thin-client computer system 220. The alpha-numeric input is provided by a keyboard 283 coupled to a keyboard connector 282 that supplies signals to a keyboard control system 281. The thin-client control system 250 encodes keyboard input from the keyboard control system 281 and sends that keyboard input as input 225 to the thin-client server system 220. Similarly, the thin-client control system 250 encodes cursor control device input from cursor control system 284 and sends that cursor control input as input 225 to the thin-client server system 220. The cursor control input is received through a mouse connector 285 from a computer mouse 285 or any other suitable cursor control device such as a trackball, trackpad, etc. The keyboard connector 282 and mouse connector 285 may be implemented with a PS/2 type of interface, a USB interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 3 includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server computer system 220 is equipped with multi-tasking software for interacting with multiple thin-client terminal systems 240. As illustrated in FIG. 3, thin-client interface software 210 in thin-client server system 220 supports the thin-client terminal system 240 as well as any other thin-client terminal systems coupled to thin-client server system 220. The thin-client server system 220 keeps track of the state of each thin-client terminal system 240 by maintaining a thin-client screen buffer 215 in the thin-client server system 220 for each thin-client terminal system 240. The thin-client screen buffer 215 in the thin-client server system 220 contains representation of what is displayed on the associated thin-client terminal system 240.

Transporting Video Information to Terminal Systems

The bandwidth required to transmit an entire high-resolution video frame buffer from a server to a terminal at full refresh speeds is prohibitively large. Thus video compression systems are used to greatly reduce the amount of information needed to recreate a video display on a terminal system at a remote location. In an environment that uses a shared communication channel to transport the video display information (such as the computer network based thin-client environment of FIG. 3), large amounts of display information transmitted to each thin-client terminal system 240 can adversely impact the computer network 230. If the video display information is not encoded efficiently enough, the large amount of display information may overwhelm the network 230 thus not allowing the system to function at all.

When the applications running on the thin-client server system 220 are typical office software applications (such as word processors, databases, spreadsheets, etc.) then there are some simple techniques that can be used to significantly decrease the amount of display information that must be delivered over the computer network 230 to the thin-client terminal systems 240 while maintaining a quality user experience for each terminal system user. For example, the thin-client server system 220 may only send display information across the computer network 230 to a thin-client terminal system 240 when the display information in the thin-client screen buffer 215 for that specific thin-client terminal system 240 actually changes. In this manner, when the display for a thin-client terminal system is static (no changes are being made to the thin-client screen buffer 215 in the thin-client server system 220), then no display information needs to be transmitted from the thin-client server system 220 to that thin-client terminal system 240. Small changes (such as a few words being added to a document in a word processor or the pointer being moved around the screen) will only require small updates to be transmitted.

As long as the software applications run by the users of thin-client terminal systems 240 do not change the display screen information very frequently, then the thin-client system illustrated in FIGS. 2 and 3 will work adequately. However, if some thin-client terminal system users run software applications that rapidly change the thin-client terminal's display screen (such as viewing full-motion video), the volume of network traffic over the computer network 230 will increase greatly due to the much larger amounts of graphical update messages that must be transmitted. If several thin-client terminal system 240 users run applications that display full-motion video then the bandwidth requirements for the communication channel 230 can become quite formidable such that data packets may be dropped. Dropped packets will greatly decrease the user experience.

To create a more efficient system for handling full-motion video in a thin-client environment, an improved full-motion system was disclosed in the related United States Patent Application titled "System And Method For Low Bandwidth Display Information Transport" having Ser. No. 12/395,152 filed Feb. 27, 2009 which is hereby incorporated by reference in its entirety. That disclosed system transmits full-motion video information to be displayed on a thin-client terminal system in an efficiently compressed format. The thin-client terminal system then decodes the compressed full-motion video to display the full-motion video locally. An example of this efficient system for transmitting full-motion video is illustrated in FIG. 4.

Figure 4:
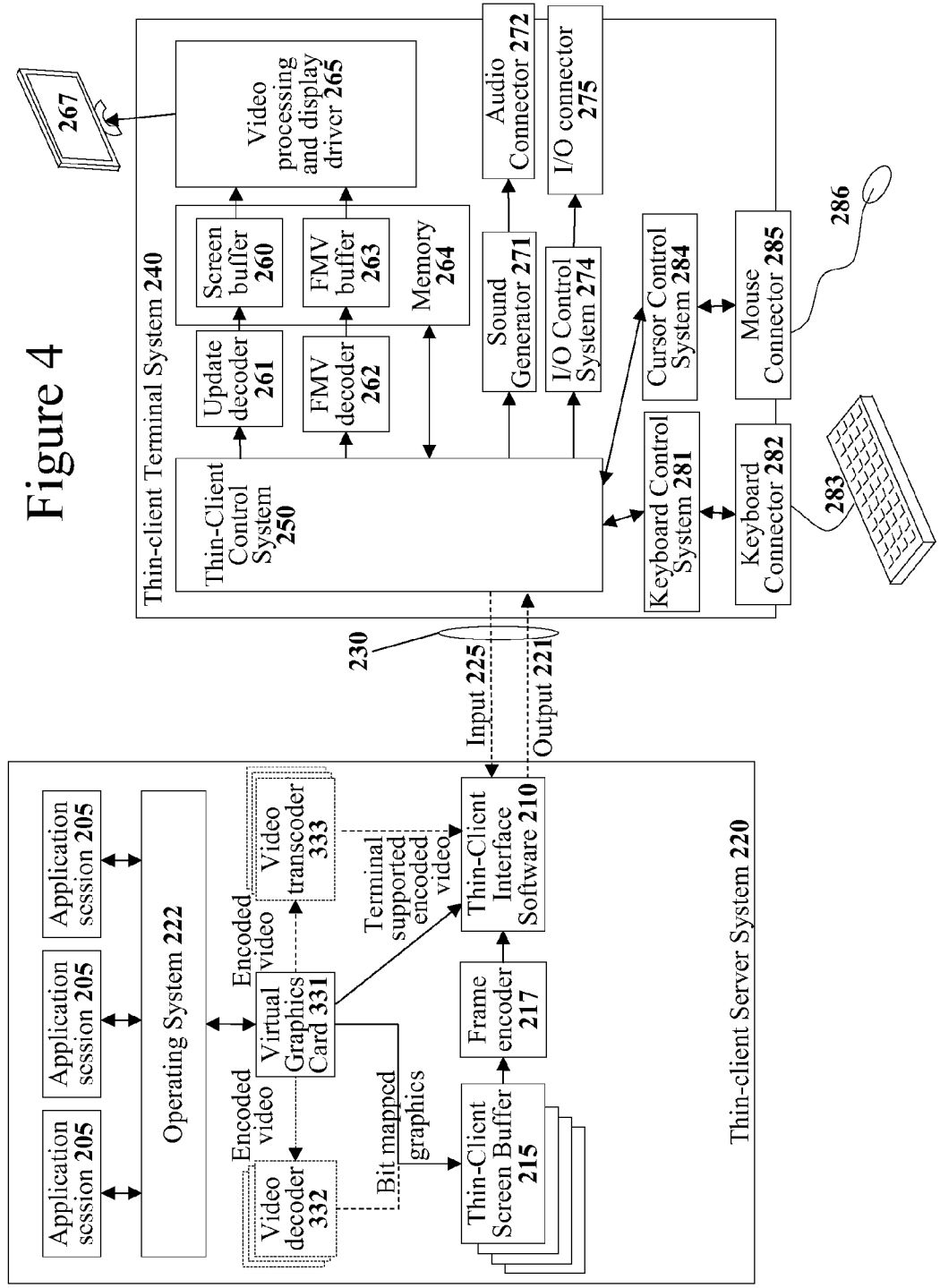
FIG. 4 illustrates a thin-client server computer system and thin-client terminal system that support a higher quality video stream decoded locally within the thin-client terminal system.

Referring to FIG. 4, a thin-client server system 220 and a thin-client terminal system 240 are displayed. The thin-client terminal system 240 of FIG. 4 is similar to the thin-client terminal system 240 of FIG. 3 with the addition of a full-motion video decoder module 262. The full-motion video decoder 262 may receive a full-motion video stream from thin-client control system 250, decode the full-motion video stream, and render the decoded video frames in a full-motion video buffer 263 in a shared memory system 264. The shared memory system 264 may be used for many different memory tasks within thin-client terminal system 240. In the example of FIG. 4, the shared memory system 264 is used to store information for a display screen frame buffer 260, a decoded full-motion video buffer 263, and other digital information from the thin-client control system 250.

The full-motion video decoder 262 may be implemented with software running on a processor, as a discrete off-the-shelf hardware part, as a digital circuit implemented with an Application Specific Integrated Circuit (ASIC), as a Field Programmable Gate Array, or in any other suitable method. In one embodiment, the full-motion video decoder 262 was implemented as a part of an Application Specific Integrated Circuit since several other portions of the thin-client terminal system 240 could also be implemented within the same ASIC device.

The video transmission system in the thin-client server computer system 220 of FIG. 4 must also be modified in order to transmit encoded full-motion video streams directly to the thin-client terminal system 240. Referring to the thin-client server system 220 of FIG. 4, the video system may include a virtual graphics card 331, thin-client screen buffers 215, and graphics encoder 217. Note that FIG. 4 illustrates other elements that may also be included such as full-motion video decoders 332 and full-motion video transcoders 333. For more information on those elements, the reader should refer to the related US Patent application titled "System And Method For Low Bandwidth Display Information Transport" having Ser. No. 12/395,152 filed Feb. 27, 2009.

The virtual graphics card 331 acts as a control system for creating video displays for each of the thin-client terminal systems 240. In one embodiment, an instance of a virtual graphics card 331 is created for each thin-client terminal system 240 that is supported by the thin-client server system 220. The goal of the virtual graphics card 331 is to output either bit-mapped graphics to be placed into the appropriate thin-client screen buffer 215 for a thin-client terminal system 240 or to output an encoded full-motion video stream that is supported by the full-motion video decoder 262 within the thin-client terminal system 240.

The full-motion video decoders 332 and full-motion video transcoders 333 within the thin-client server system 220 may be used to support the virtual graphics card 331 in handling full-motion video streams. Specifically, the full-motion video decoders 332 and full-motion video transcoders 333 help the virtual graphics card 331 handle encoded full-motion video streams that are not natively supported by the digital video decoder 262 in thin-client terminal system. The full-motion video decoders 332 are used to decode full-motion video streams and place the video data thin-client screen buffer 215 (in the same manner as the system of FIG. 3). The full-motion video transcoders 333 are used to convert from a first digital full-motion video encoding format into a second digital full-motion video encoding format that is natively supported by a video decoder 262 in the target thin-client terminal system 240.

The full-motion video transcoders 333 may be implemented as the combination of a digital full-motion video decoder for decoding a first digital video stream into individual decoded video frames, a frame buffer memory space for storing decoded video frames, and a digital full-motion video encoder for re-encoding the decoded video frames into a second digital full-motion video format supported by the target thin-client terminal system 240. This enables the transcoders 333 to use existing full-motion video decoders on the personal computer system. Furthermore, the transcoders 333 could share the same full-motion video decoding software used to implement video decoders 332. Sharing code would reduce licensing fees.

The final output of the video system in the thin-client server system 220 of FIG. 3 is either graphics update messages from the graphics frame buffer encoder 217 or an encoded full-motion video stream that is supported by the target thin-client terminal system 240. The thin-client interface software 210 outputs the graphics update messages and full-motion video stream information across communication channel 230 to the target thin-client terminal system 240.

In the thin-client terminal system 240, the thin-client control system 250 will distribute the incoming output information (such as audio information, frame buffer graphics, and full-motion video streams) to the appropriate subsystem within the thin-client terminal system 240. Thus, graphical frame buffer update messages will be passed to the graphics frame buffer update decoder 261 and the streaming full-motion video information will be passed to the video decoder 262. The graphics frame buffer update decoder 261 decodes the graphical frame buffer update messages and then applies the graphics update to the thin-client terminal's screen frame buffer 260. Similarly, the full-motion video decoder 262 will decode the incoming digital full-motion video stream and write the decoded video frames into the full-motion video buffer 263. As illustrated in FIG. 4, the terminal's screen frame buffer 260 and the full-motion video buffer 263 reside in the same shared memory system 264. The video processing and display driver 265 then reads all of the display information out of the terminal's screen frame buffer 260 and combines it with full-motion video information read from the full-motion video buffer 263 to render a final output display signal for display system 267. Thus, to handle the display of video output, the shared memory system 264 must receive updates from the frame buffer update decoder 261, receive decoded video frames from the full-motion video decoder 262, and output both frame buffer and full-motion video frames to the video processing and display driver 265. In addition, the shared memory system 264 must support other memory users such as a network interface and user interface.

Figure 5A:
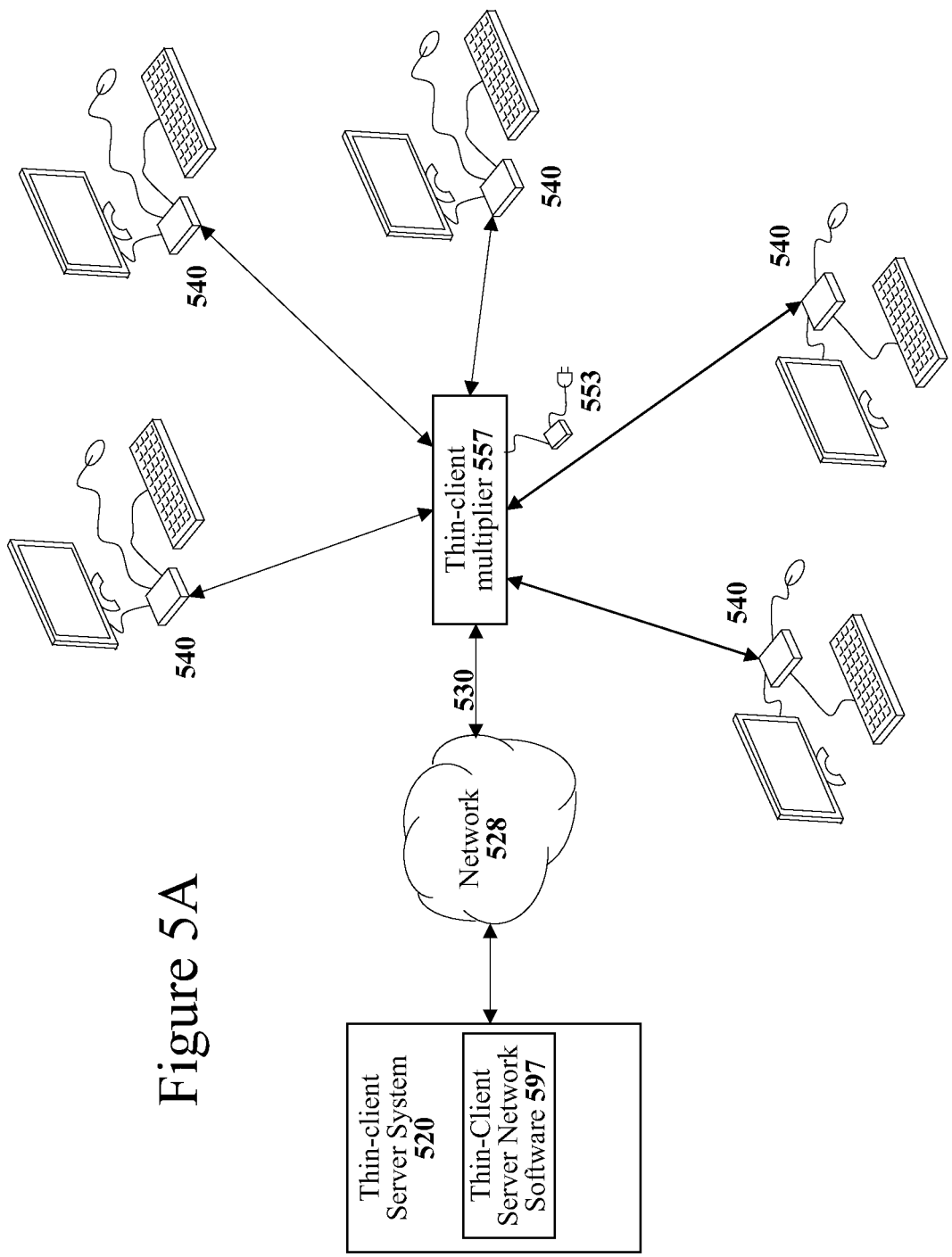
FIG. 5A illustrates a block diagram of three thin-client terminal systems coupled to a thin-client server system using a thin-client multiplier device.

In a system that supports multiple users, the memory bandwidth probably will become even more acute. FIG. 5A illustrates a thin-client terminal environment wherein a thin-client server system 520 is coupled through a network 528 to a thin-client multiplier 557 that serves five different thin-client terminal systems 540. In one embodiment, the thin-client multiplier 557 is a small computer system constructed with an Application Specific Integrated Circuit (ASIC) that outputs video signals for the three different thin-client terminal systems 540 using a shared memory system.

Figure 5B:
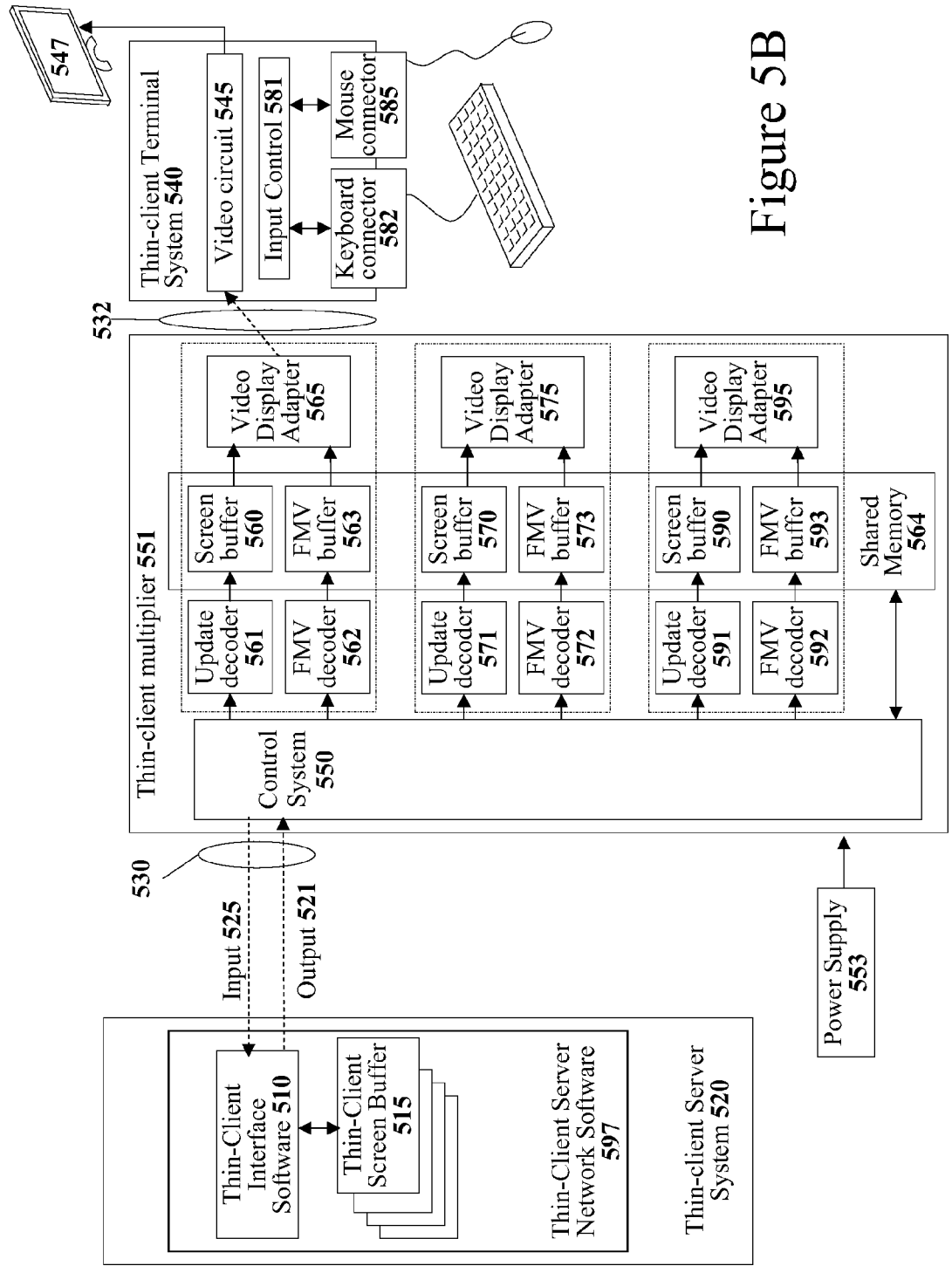
FIG. 5B illustrates a block diagram of a thin-client multiplier device that may support up to three thin-client terminal systems.

FIG. 5B illustrates a block diagram of the video display circuitry for a thin-client multiplier 551 that serves three different thin-client terminal systems using a single shared memory system 564. (Note that for clarity, FIG. 5B only displays one of the three thin-client terminal systems and does not display circuitry that for handing terminal input data.) The single shared memory system 564 in the thin-client multiplier 551 handles all the incoming video display data for three screen buffers (560, 570, and 590) and three full-motion video buffers (563, 573, and 593). Similarly, there are three video display adapters (565, 575, and 595) for reading display data out the screen buffers (560, 570, and 590) and full-motion video buffers (563, 573, and 593) in order to generate video output signals to drive associated thin-client terminal systems. All of this video display activity will greatly stress the memory bandwidth limitations of the shared memory system 564.

Combining Full-Motion Video with Frame Buffer Graphics

Figure 6A:
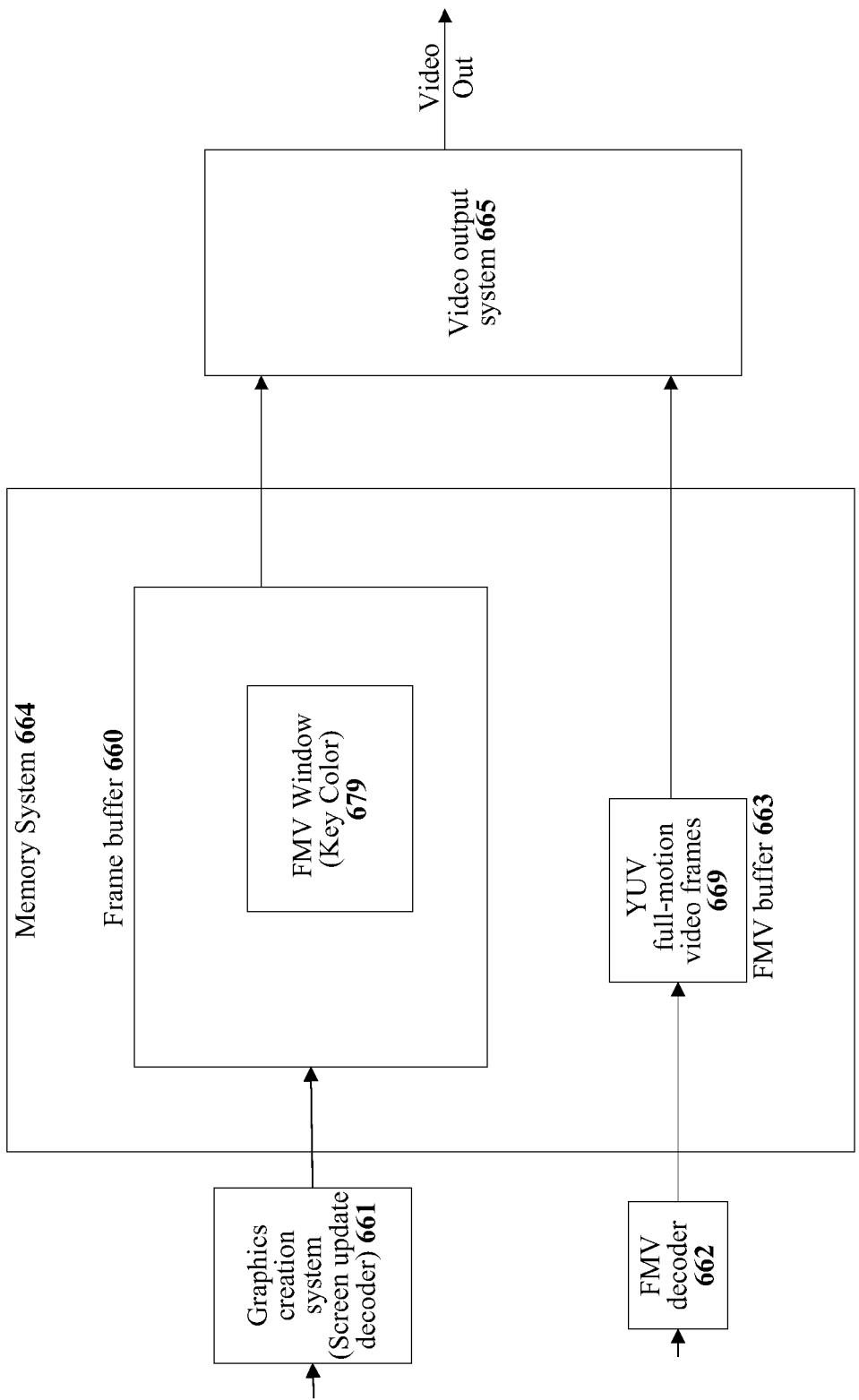
FIG. 6A illustrates a block diagram of a video output system that combines data from a frame buffer with full-motion video data read from a full-motion video buffer.

The task of combining a typical display frame buffer with full-motion video information may be performed in many different ways. One method that is commonly employed is to place a designated "key color" in the section of the frame buffer where the full-motion video is to be displayed. A video output system then replaces the key color areas of the frame buffer with full-motion video data. FIG. 6A illustrates a block diagram of this type of video output system arrangement.

Referring to FIG. 6A, a graphics creation system 661 (such as the screen update decoder 261 in FIG. 4) renders a digital representation of a display screen in a frame buffer 660. In an area where a user has opened up a window to display full-motion video, the graphics creation system 661 has created a full-motion video window 679 with a specified key color. In addition to the frame buffer 660 display information, the system also has a full-motion video decoder 662 that decodes full-motion video frames into a full-motion video buffer 663. The full-motion video frames may be encoded in various different formats. In one particular embodiment, the decoded full-motion video consists of video image frames encoded with the "YUV" colorspace. The YUV colorspace encodes pixels with one luminance (Y) component and two chrominance (UV) components in a format that takes into account human perception. In one specific embodiment, the 4:2:0 YUV encoding is employed since the 4:2:0 YUV encoding provides a good quality output with only 1.5 bytes per pixel.

Referring to FIG. 6A, a video output system 665 reads the both the desktop display data in the frame buffer 660 and the YUV video frame data 669 in the FMV buffer 663. The video output system 665 then replaces the key color of the full-motion video window area 679 in the frame buffer 660 with pixel data generated from the YUV video frame data in the FMV buffer 663 to create a composite representation. The composite display data (the combined frame buffer data and full-motion video data) is then used to generate a final video output signal.

Figure 6B:
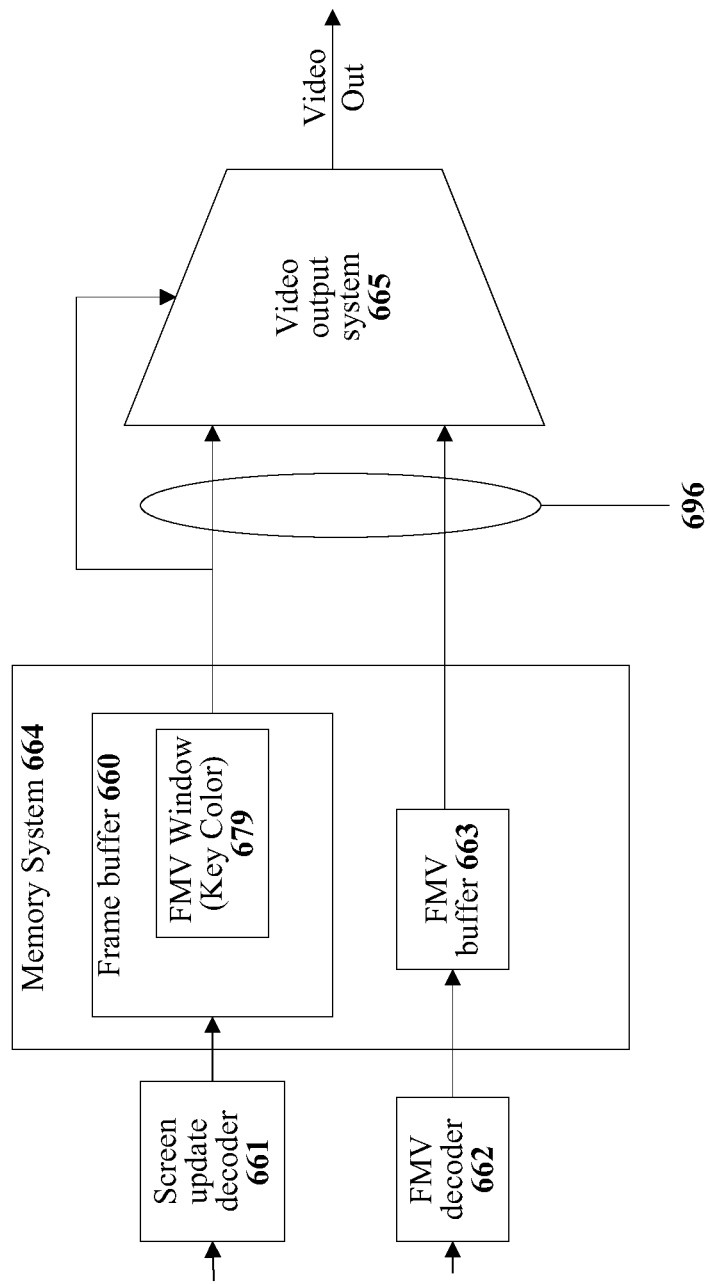
FIG. 6B illustrates a conceptual diagram of the video output system of FIG. 6A that illustrates how the key color image data from the frame buffer may be used to control when the video output system multiplexes in the full-motion video data from the full-motion video buffer.

FIG. 6B conceptually illustrates the process. Specifically, in FIG. 6B, the video output system 665 acts as a multiplexor that receives data from both the frame buffer 660 and the full-motion video buffer 663. The data from the frame buffer 660 acts as a control for the video output system 665 multiplexor. Specifically, the video output system 665 multiplexor selects data from the full-motion video buffer 663 when a key color pixel is specified otherwise it selects data from the frame buffer 660 to output the final video output signal. The video system arrangement of FIG. 6B uses a large amount of valuable memory system bandwidth in a wasteful manner. Specifically, the video output system 665 reads the entire contents of both the display data in the frame buffer 660 and the entire contents of the full-motion video buffer 663 along the memory path 696 between memory system 664 even though a large amount of that data will be discarded.

The full details of the wasteful nature of this approach can be illustrated with reference to FIG. 6A. In the example of FIG. 6A all of the key color data read from the full-motion video window area 679 will be discarded since that key color data will be replaced with full-motion video data. Since the key color data will immediately be discarded, the reading of that key color data is not an efficient usage of valuable memory bandwidth. A more efficient system would have a system to determine which data will be displayed before the data is read such that the system does not bother reading data that is immediately discarded.

In a system having a display screen resolution of $Hor_s$ by $Ver_s$ and that will display full-motion video having a native full-motion video resolution of $Hor_v$ by $Ver_v$, the total memory bandwidth usage from reading the entire contents of both the display frame buffer 660 and the full-motion video buffer 663 (storing the native full-motion video information) is:

$(Hor_s)*(Ver_s)*$(screen bytes per pixel)*(refresh rate)+
$(Hor_v)*(Ver_v)*$(FMV bytes per pixel)*(refresh rate)

As set forth earlier, the entire full-motion video window area 679 read from the frame buffer 660 only contains key color pixels that will immediately be discarded. The reading of all that key color data that will immediately be discarded is clearly wasteful. Thus, if a user has opened up a full-motion video window 679 with a window resolution of $Hor_w$ by $Ver_w$, the system will waste memory bandwidth of:

$(Hor_w)*(Ver_w)*$(screen bytes per pixel)*(refresh rate)

In small computer system with a limited amount of computing resources, such an approach that wastes memory bandwidth by reading data that will immediately be discarded must be avoided. This is especially true when both the frame buffer 660 and the full-motion video buffer 663 reside within the same shared memory system 664. To use the memory bandwidth resources of the computer system more efficiently, the display system should take advantage of the spatial mutual exclusivity between the display of frame buffer information and the display of full-motion video information. Specifically, the video display system should not bother to read the key color data within full-motion video window area 679 since that key color data will immediately be discarded.

Figure 6C:
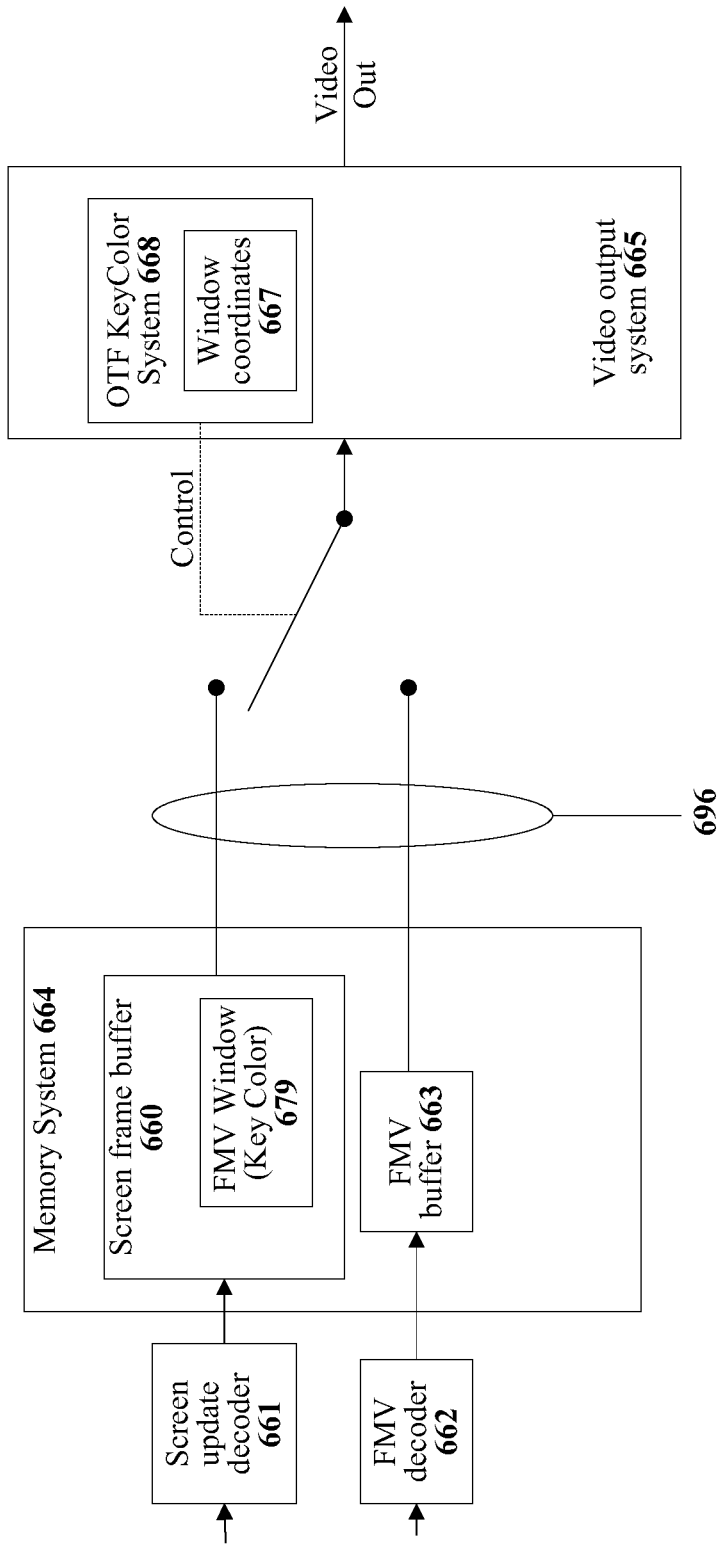
FIG. 6C illustrates a conceptual diagram of an improved implementation of the video output system of FIG. 6A that only reads data from either the frame buffer or the full-motion video buffer.

FIG. 6C conceptually illustrates how such an improved video output system would operate. In the system of FIG. 6C, the video output system 665 controls itself to only read from the either the frame buffer 660 or the full-motion video buffer 663 but not both. The video output system 665 will scan through the frame buffer 660 and when it encounters the full-motion video window 679 it will instead read full-motion video data 669 from the full-motion video buffer 663. After completing a row of data from the full-motion video buffer 663, the video output system 665 returns to the frame buffer 660 but begins reading after the full-motion video window 679.

The system disclosed in FIG. 6C would greatly reduce the memory bandwidth requirements that the video output system 665 places upon the shared memory system 664. Specifically, if the user opens a window with a resolution of $Hor_w$ by $Ver_w$ to view full-motion video with a native video resolution of $Hor_v$ by $Ver_v$ on a display screen with a resolution of $Hor_s$ by $Ver_s$ then the memory bandwidth requirements of the improved system will be the full screen scan bandwidth plus the native full-motion video scan minus the full-motion video window scan. In equation form this is:

$(Hor_s)*(Ver_s)*$(screen bytes per pixel)*(refresh rate)+
$(Hor_v)*(Ver_v)*$(FMV bytes per pixel)*(refresh rate)−$(Hor_w)*(Ver_w)*$(screen bytes per pixel)*(refresh rate)

Note that the bit depth of a screen display (screen bytes per pixel in the frame buffer 660) will typically tend to be larger than the bit depth of full-motion video data (full-motion video bytes per pixel in FMV buffer 663) such that the bandwidth savings can be significant. Specifically, not only is the screen area redundancy eliminated but the full-motion video data typically uses fewer bytes per pixel (1.5 bytes per pixel for 4:2:0 YUV encoded full-motion video) than frame buffer data (3 bytes per pixel when 24-bit color is used). If the user creates a large full-motion video window 679, then that larger full-motion video window size will provide even more memory bandwidth savings.

Using the system of FIG. 6C, various different scenarios will use different amounts of memory bandwidth. The best case scenario is where the user opens up a full-motion video window to fill the entire display screen. When that occurs, the video output system 665 will only need to read from the full-motion video buffer 663 which may only use 1.5 bytes per pixel when 4:2:0 YUV encoding is used. One of the worst cases is when there is no full-motion video being displayed such that the entire frame buffer 660 must be read such that 3 bytes per pixel is read when the system uses 24-bit color. When a full-motion video is being displayed, the goal of the video output system is to keep the memory bandwidth usage lower than the case where only the frame buffer 660 is read. This is achieved by not reading the section of the frame buffer 660 where the full-motion video will be displayed.

Thus, in order for the system of FIG. 6C to operate, the system must be able to determine whether to read display data from the frame buffer 660 or the full-motion video buffer 663 without reading the key color data defining the FMV window 679 in the frame buffer 660. This can be accomplished by providing the coordinates of the full-motion video window 679 to the video output system 665. The coordinates of the full-motion video window 679 may be received from the operating system that renders the key color information into the frame buffer 660. The coordinates of a full-motion video window 679 may be provided with just a few bytes by providing the coordinates of the upper-left corner and lower-right corner of the full-motion video window 679.

Unfortunately, the rendering situation is not always as easy as the simple rectangular full-motion video window 679 depicted in FIG. 6C. Users of the computer system may move other application windows on top of the full-motion video window 679 thus obscuring portions of the full-motion video window 679. Those portions of the full-motion video window 679 that are blocked by other application windows overlaid on top of the full-motion video window 679 must be rendered using display data from those application windows (and which is assumed to be in the frame buffer 660 for this document).

Figure 7A:
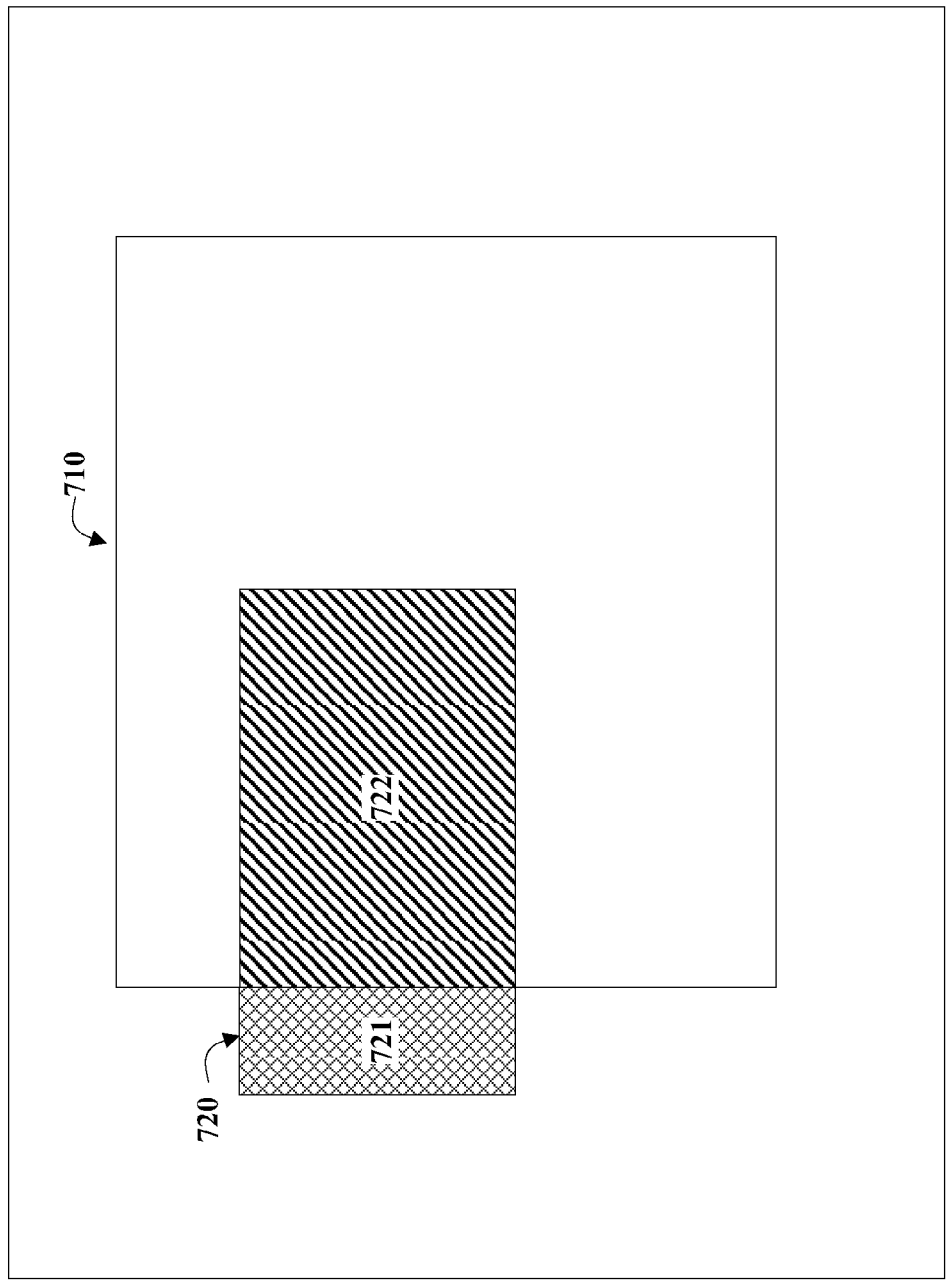
FIG. 7A illustrates a display screen with a full-motion video window and another window overlaid on top of the full-motion video window that blocks the view of the full-motion video.

FIG. 7A illustrates an example of a screen display wherein another application window 720 blocks part of full-motion video window 710 that is being used to display full-motion video. To properly render the screen display of FIG. 7A, the video output system reads from the frame buffer instead of the full-motion video buffer while scanning through application window area 722 that is within rectangular bounds of the full-motion video window 710. FIG. 7B illustrates an even more complicated situation wherein the video output system must read from the frame buffer instead of the full-motion video buffer while scanning through both application window area 722 and application window area 732 that are within the bounds of the full-motion video window 710. Additional application windows that are overlaid on top of full-motion video window 710 may be added by the user.

To fully handle all of the possible cases of other application windows overlaid on top of a full-motion video window 710 without reading key color data from the frame buffer, the video output system needs to be informed of:

1) The coordinates of the full-motion video window within in the frame buffer; and
2) The coordinates of every application window overlaid on the FMV window.

Once equipped with the coordinates of the various application windows on the display screen, the video output system must process the window information to determine exactly when to read display information from the frame buffer 660 and when to read display information from the full-motion video buffer 663. This document discloses several different techniques developed to accomplish this task that do not rely upon reading significant amounts of redundant data. (Some implementations do read small amounts of key color data from the frame buffer 660 but the overall memory bandwidth usage is still reduced significantly.) If a video output system is successful in not reading redundant key color information from the frame buffer 660, the overall memory bandwidth used by the video output system should remain below the case wherein the entire frame buffer 660 is read.

Figure 8:
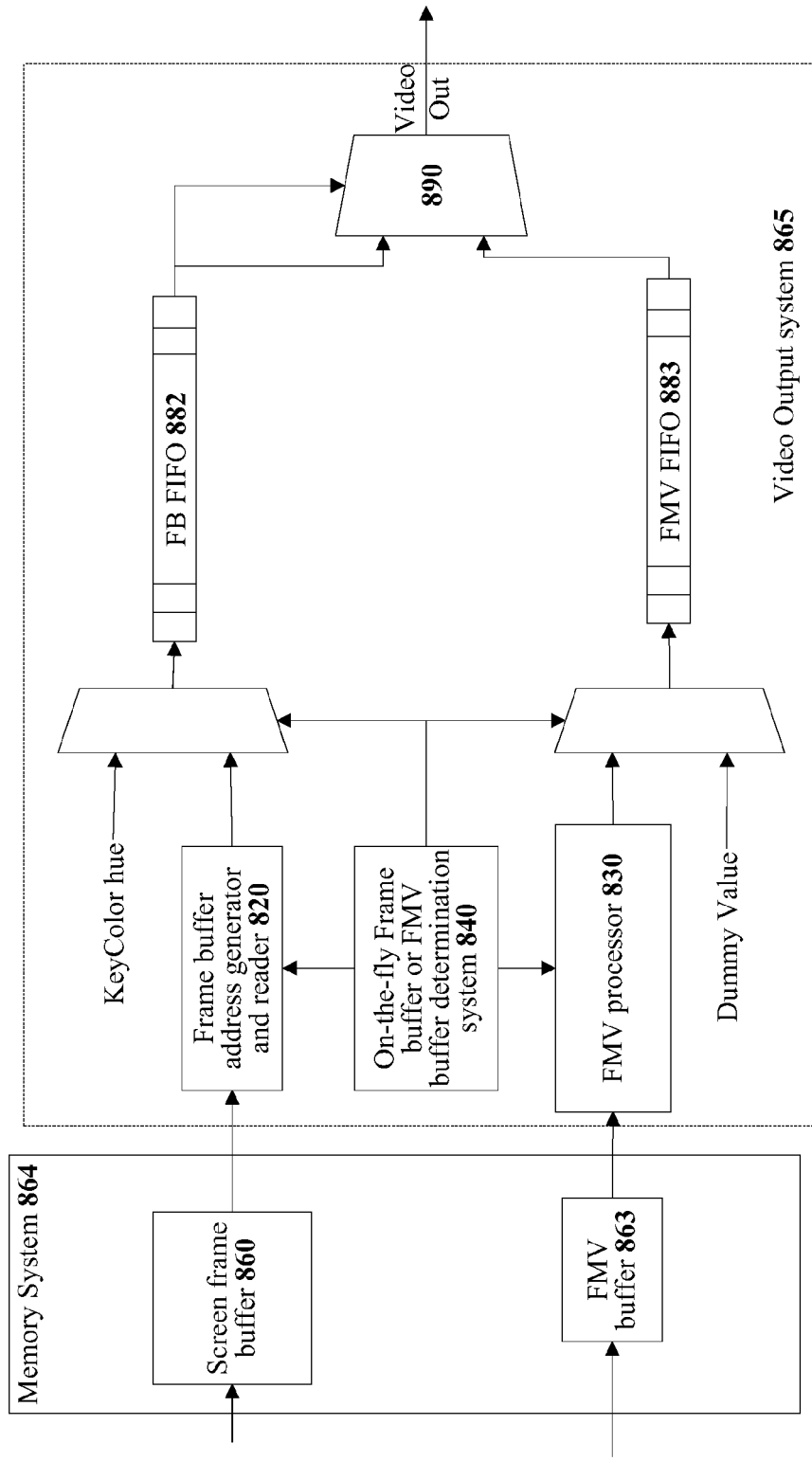
FIG. 8 illustrates an example a video output system implemented with an on-the-fly key color generation system that reads either from a full-motion video buffer or normal frame buffer.

The result of the determination of whether to read from the main frame buffer or the full-motion video buffer may be provided to the video output system in many different ways. FIG. 8 illustrates a block diagram of one possible video output system that uses the result of the determination of whether a particular display area is full-motion video or normal frame buffer. In the embodiment of FIG. 8, a frame buffer or FMV determination system 840 directly controls systems that read from the frame buffer 860 or the full-motion video buffer 863. When the frame buffer or FMV determination system 840 determines that normal desktop graphics data is to be displayed, a frame buffer address generator and reader 820 reads from the frame buffer 860. That data from the frame buffer 860 is then fed into a frame buffer FIFO 882.

When full-motion video needs to be displayed, the frame buffer or FMV determination system 840 feeds key color hue data into the frame buffer FIFO 882. The frame buffer or FMV determination system 840 then also instructs a FMV processor 830 to generate full-motion video data. The FMV processor 830 generates the proper address to read from the FMV buffer 863, reads the needed full-motion video data, processes the full-motion video data, and outputs data in the FMV FIFO 883. A final multiplexer 890 then uses the (synthetically generated) key color hue information in the frame buffer FIFO 882 data stream to determine when to output data from the frame buffer FIFO 882 and when to output data from the FMV FIFO 883. The embodiment of FIG. 8 illustrates just one possible system for employing the frame buffer or FMV determination system 840 of the present disclosure. Other video output system may use the results of the determination in a different manner.

Implementation 1—Transition Codes Embedded within the Frame Buffer

A first technique operates by having the operating system insert special transition codes into the frame buffer data that signal the transitions between frame buffer data and a full-motion video data. Since the operating system is generally responsible for inserting the key color information into the frame buffer, the operating system can be altered to insert these transition codes that will control the operation of the video output system.

Figure 7C:
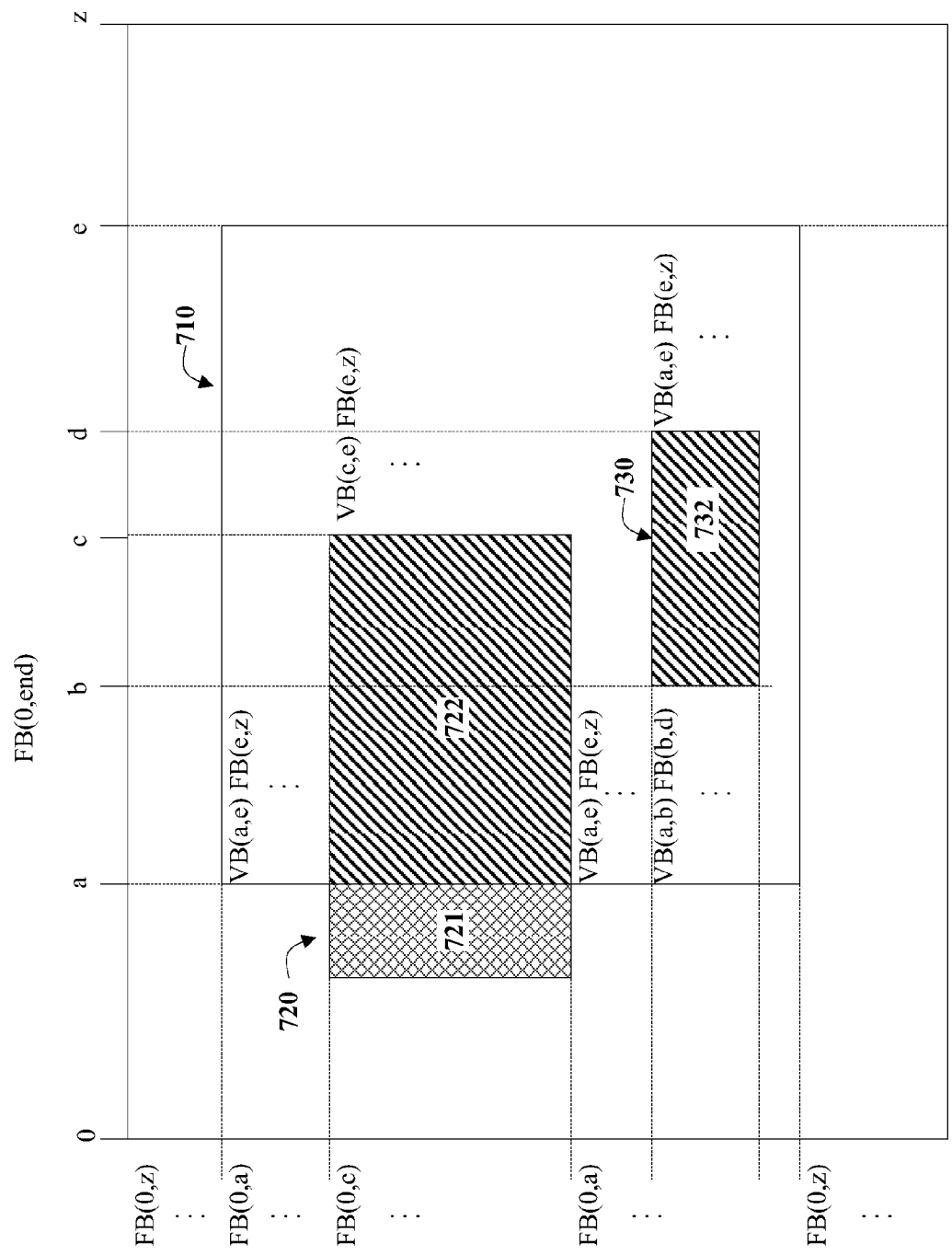
FIG. 7C illustrates how the data in a frame buffer may represent the display screen of FIG. 7B with embedded codes that specify when the video output system should read from the frame buffer and when the video output system should read from the full-motion video buffer.

To illustrate the transition code based system, FIG. 7C conceptually illustrates the contents of a frame buffer that has been altered by an operating system to include transition codes that will be used to guide a video output system. The example of FIG. 7C is based upon the screen display situation illustrated in FIG. 7B wherein two windows (720 and 730) are overlaid on top of a full-motion video window 710 thus blocking sections of the full-motion video. Thus, when the video output system is scanning through areas 722 and 732 that overlap the full-motion video window 710, the video output system should read data from the frame buffer instead of the full-motion video buffer.

Referring to the frame buffer example of FIG. 7C, each row of the frame buffer is preceded by a transition code that specifies a width of how much the video output system should read from the frame buffer before transitioning to the full-motion video buffer. If the row contains no video window, this transition code will simply specify that the video output system will only read from the frame buffer. For example, the top row specifies the transition code FB(0,z) that specifies the video output system should read from the frame buffer from the start of the row (horizontal position 0) to the end of the row (horizontal position 'z'). (Note that the transition code "FB (0,z)" is merely an example notation for this document and that any other code giving the same meaning can be used.) When there is full-motion video in the row then this transition code will specify how much the video output system will read from the frame buffer before reading from the full-motion video buffer. For example, at the first row of the full-motion video window 710, the transition code FB(0,a) specifies that the video output system should read from the frame buffer from the start of the row (horizontal position 0) until the location where full-motion video window 710 begins at horizontal location 'a'.

If a user has moved a full-motion video window all the way to left side of the display (not shown), then the transition code before the frame buffer for such a situation would specify that the video output system should immediately start reading from the full-motion video buffer for that particular row of the screen display. The transition code may specify the width of data from the full-motion video and the width of the next section of frame buffer information.

Referring back to the frame buffer of FIG. 7C, once a section of full-motion video begins, the frame buffer should contain a transition code specifying the width of data to retrieve from the full-motion video buffer followed by a width of data to retrieve from the frame buffer. For example, in the top-left corner of full-motion video window 710 there is a transition code that specifies VB(a,e)FB(e,z). This transition code informs the video output system to read from the (full-motion) video buffer from horizontal location 'a' to horizontal location 'e' and after that read from the frame buffer from horizontal location 'e' to horizontal location 'z' (the end of the row).

In the row where overlay window 720 begins, the transition code preceding the frame buffer, code FB(0,c), specifies that the video output system should read from the frame buffer from the start of the row (horizontal location 0) until horizontal location 'c' that is deep within full-motion video window 710. Thus, the overlay window 720 will be rendered properly on top of motion video window 710. When overlay window 720 ends at horizontal position 'c', the frame buffer contains the transition code VB(c,e)FB(e,z) that informs the video output system to read from the (full-motion) video buffer from horizontal location 'c' to horizontal location 'e' and after that read from the frame buffer from horizontal location 'e' to horizontal location 'z' (the end of the row). Note that specifying reading from the full-motion video buffer starting at horizontal location 'c' informs the video output system that it must begin at a shifted location within the full-motion video buffer since the full-motion video window 710 begins at horizontal location 'a'.

This first implementation may be implemented many different ways with many specific code elements. The basic concept is to have the operating system embed a set of instructions for the video output system within the frame buffer data. This system will read a small amount of extra information (the inserted transition codes), however those added transition codes are very small compared to reading the entire frame buffer and the entire full-motion video buffer.

Implementation 2—Comparators and Truth Table Implementation

The second implementation operates by slicing up the full-motion video window into a set of ranges, creating a set of range comparators to determine where the video output system is currently scanning within that set of ranges, and using a truth table to determine if the video output system should read from the frame buffer or the full-motion video buffer. This second implementation will be disclosed with reference to FIGS. 9A to 9H FIG. 9A illustrates a frame buffer display containing a full-motion video window 910 and several windows (911, 912, 913, 914, and 915) overlaid on top of the full-motion video window 910. When the video output system is scanning within the full-motion video window 910, the video output system should read from full-motion video buffer except when it crosses the areas of windows 911, 912, 913, 914, and 915 when it should read from the frame buffer.

The second implementation begins by first dividing the full-motion video window 910 into both horizontal and vertical slices. Specifically, a division is created at every unique horizontal or vertical border of the overlaid windows 911, 912, 913, 914, and 915. In addition, the horizontal and vertical edges of the full-motion video window 910 also act as borders for slices. FIG. 9B illustrates the frame buffer display of FIG. 9A divided into vertical slices and FIG. 9C illustrates the frame buffer display of FIG. 9A divided into horizontal slices.

Each of the slices that cover any portion of the overlaid windows 911, 912, 913, 914, or 915 is given a label and its range is noted. For example, referring to FIG. 9B, the ranges (a,b), (b,c), (c,d), (e,f), and (f,g), are given labels 0 to 4 respectively. Note that the slices that do not contain any overlaid windows, such as the vertical slice in range (d,e), are ignored since the video output system will just always read from the full-motion video buffer by default when within the bounds of the full-motion video window 910. The following tables list the labelled horizontal and vertical slices along with the ranges of each slice.

| Vertical Slice | Range | Horizontal Slice | Range |
|---|---|---|---|
| 0 | (a, b) | 0 | (p, q) |
| 1 | (b, c) | 1 | (q, r) |
| 2 | (c, d) | 2 | (r, s) |
| 3 | (e, f) | 3 | (s, t) |
| 4 | (f, g) | 4 | (u, v) |

After dividing the full-motion video window 910 in to slices, the system then creates a truth table that specifies which range intersections designate areas where the system needs to read from the frame buffer instead of the full-motion video buffer. FIG. 9D illustrates the frame buffer display of FIG. 9A divided into both horizontal and vertical slices. As illustrated in FIG. 9D, the intersection of vertical slice 1 and horizontal slice 0 designate a portion of window 911. The intersection of vertical slice 1 and horizontal slice 1 designate the remaining portion of window 911. All of these vertical slice and horizontal slice intersections are used to create the truth table of FIG. 9E. The truth table of FIG. 9E specifies the regions where the video output system should read from the frame buffer instead of the full-motion video buffer.

Once the truth table is created, the video output system can use the designated slice ranges and the truth table to determine if the video output system should read from the full-motion video buffer or the frame buffer when the video output system is scanning the display within the bounds of the full-motion video window 910. By default, the system will read from the full-motion video buffer when within the bounds of the full-motion video window 910. However, when the video output system is within a specified vertical slice range and a specified horizontal slice range, the video output system will look up the intersection in the truth table of FIG. 9E to determine if the video output system should read from the frame buffer due to an overlaid window. For example, if the video output system is scanning at coordinates that fall within the intersection of vertical slice 2 and horizontal slice 4, the system will read from the frame buffer since the intersection of vertical slice 2 and horizontal slice 4 specifies 'FB' as illustrated in FIG. 9E.

Figure 9A:
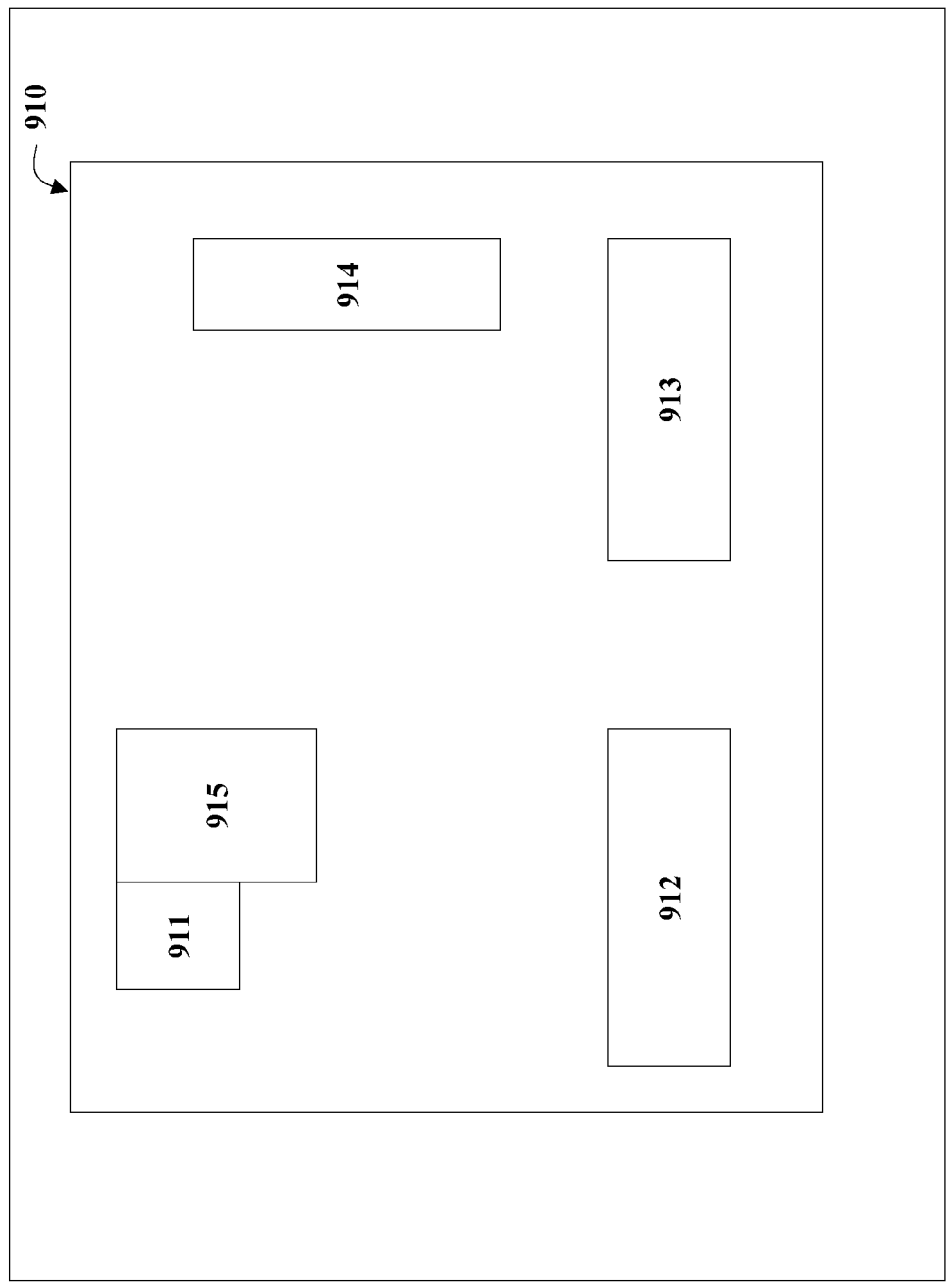
FIG. 9A illustrates a display screen with a full-motion video window that has several other windows overlaid on top of it.
Figure 9B:
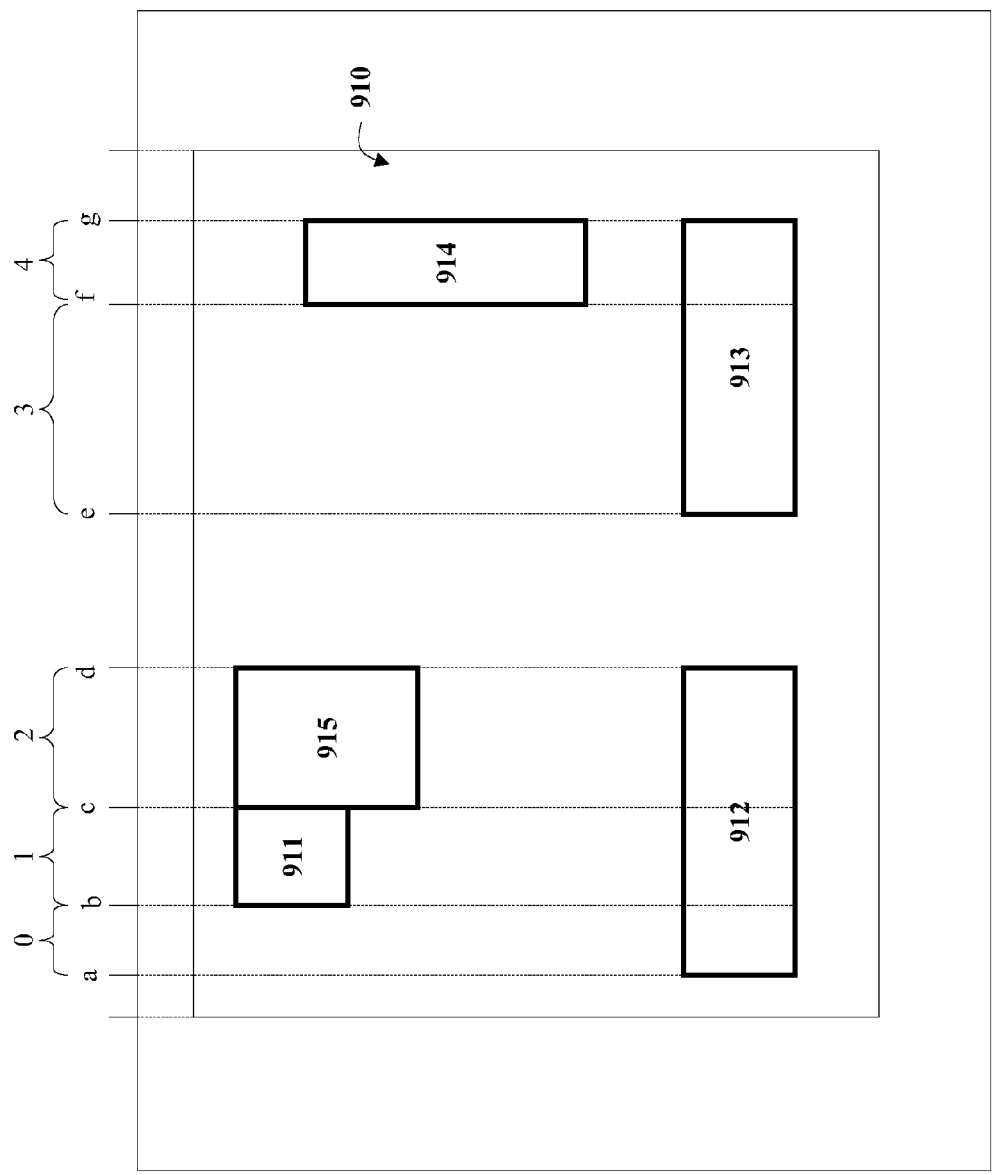
FIG. 9B illustrates the display screen of FIG. 9A divided into vertical slices based upon the edges of the overlay windows.
Figure 9C:
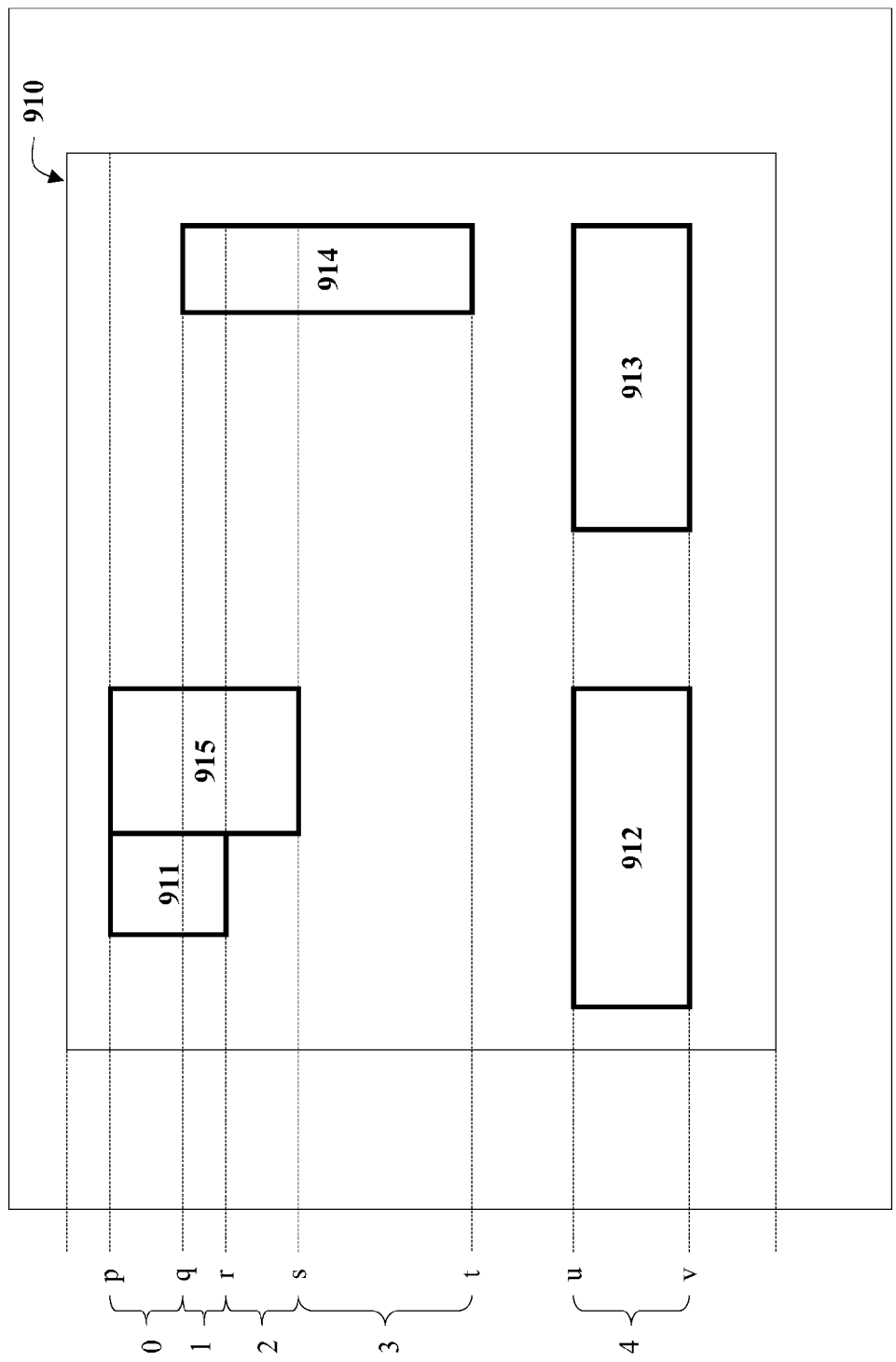
FIG. 9C illustrates the display screen of FIG. 9A divided into horizontal slices based upon the edges of the overlay windows.
Figure 9D:
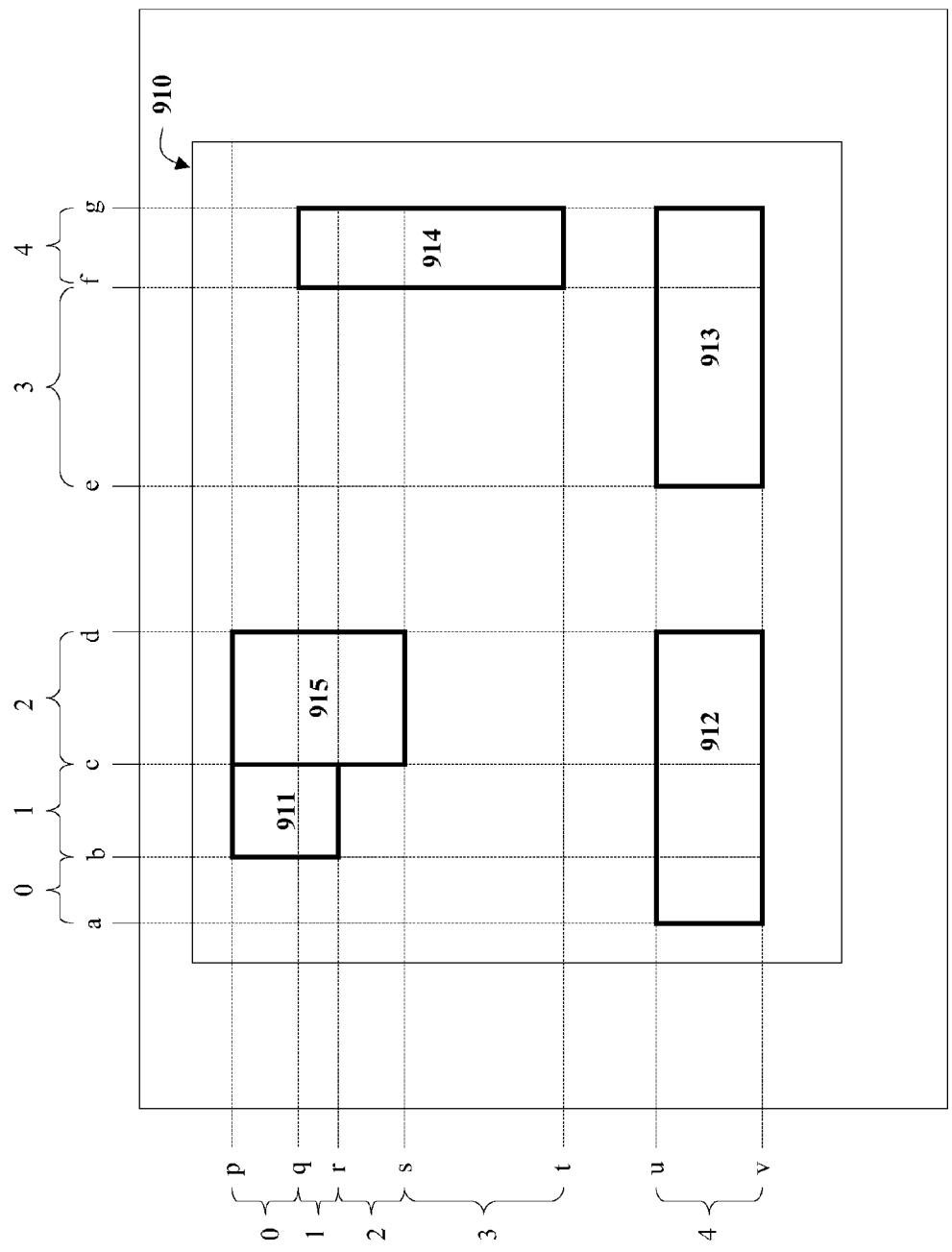
FIG. 9D illustrates the display screen of FIG. 9A divided into both vertical slices and horizontal slices based upon the edges of the overlay windows.
Figure 9E:
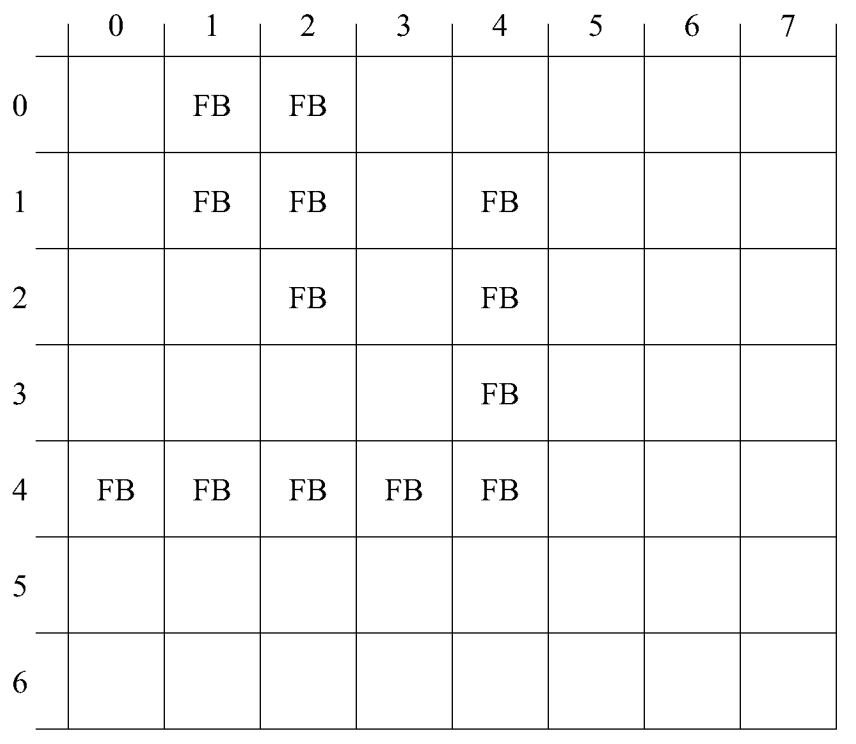
Figure 9F:
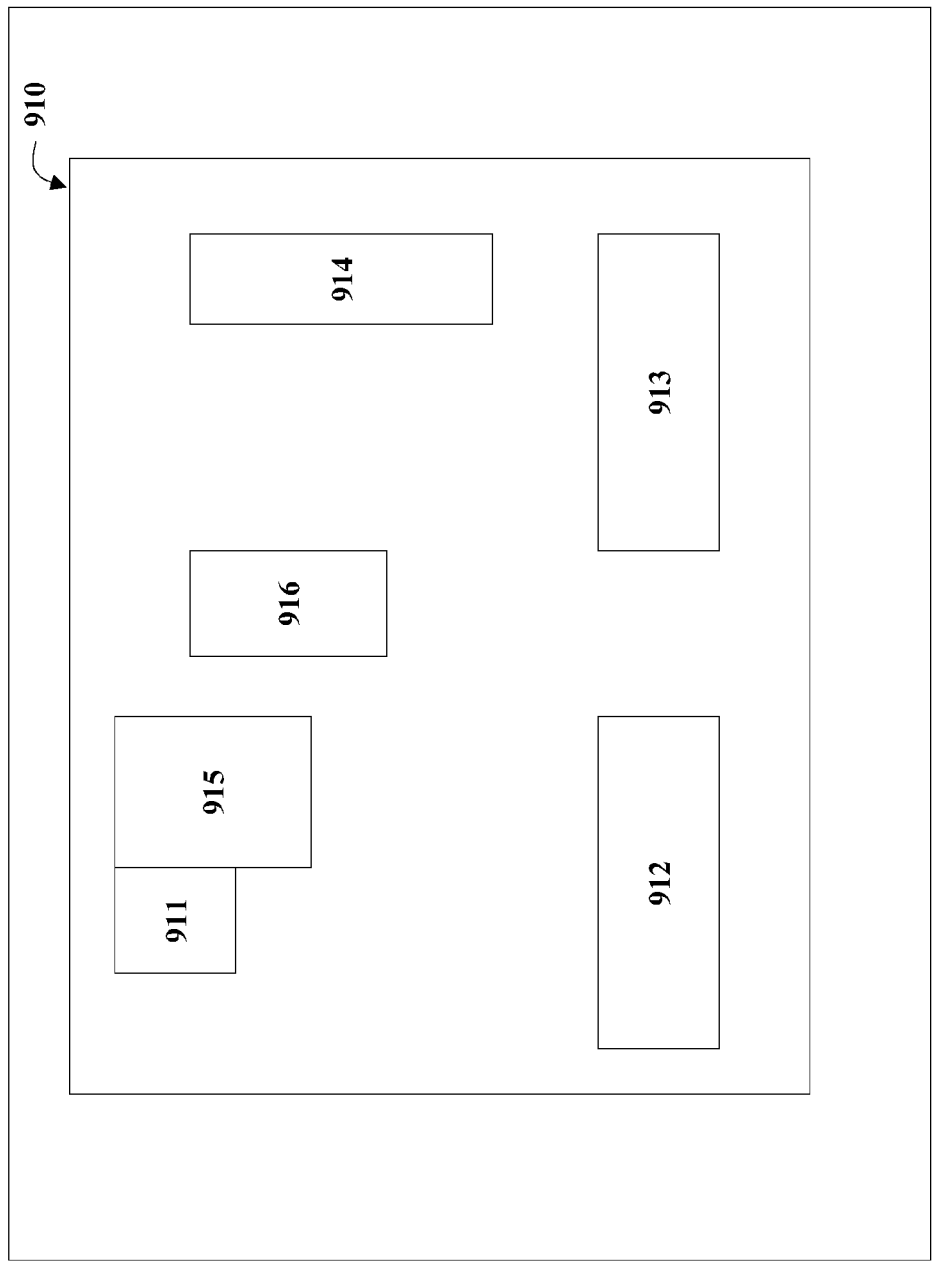
FIG. 9F illustrates the display screen of FIG. 9A with an additional overlay window added.
Figure 9G:
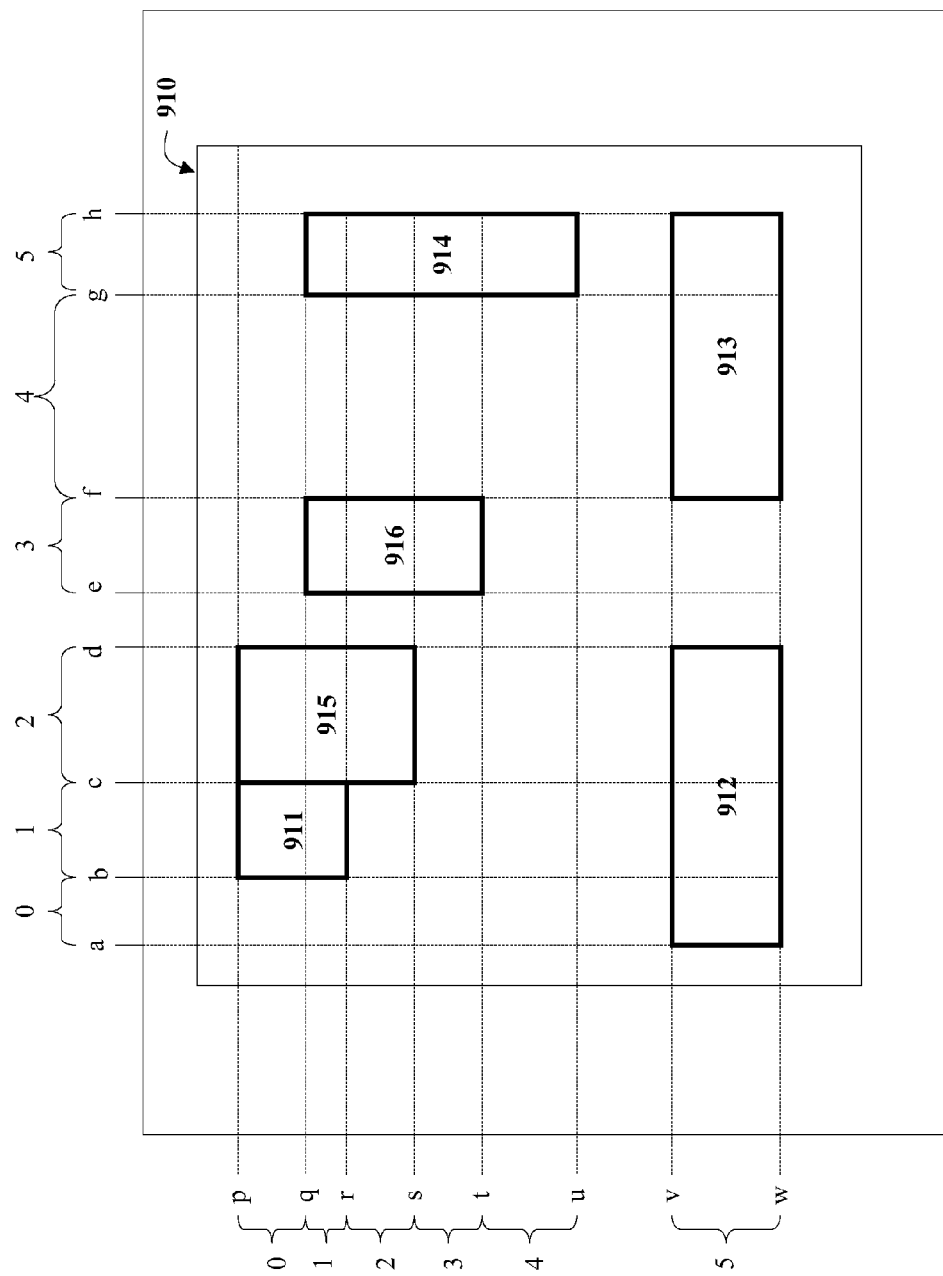
FIG. 9G illustrates the display screen of FIG. 9F divided into both vertical slices and horizontal slices based upon the edges of the overlay windows.

FIG. 9F illustrates the frame buffer display of FIG. 9A with a newly added overlay window 916. When a new overlay window is added or moved (or an existing overlay window is removed), the video output system must horizontally and vertically re-slice the full-motion video window 910 and generate a new truth table. FIG. 9G illustrates the frame buffer display of FIG. 9F divided into both horizontal and vertical slices. The following tables list the labelled horizontal and vertical slices along with the ranges of each slice.

| Vertical Slice | Range | Horizontal Slice | Range |
|---|---|---|---|
| 0 | (a, b) | 0 | (p, q) |
| 1 | (b, c) | 1 | (q, r) |
| 2 | (c, d) | 2 | (r, s) |
| 3 | (e, f) | 3 | (s, t) |
| 4 | (f, g) | 4 | (t, u) |
| 5 | (g, h) | 5 | (v, w) |

After slicing the full-motion video window 910, the video output system then creates a truth table for the intersections of the horizontal and vertical slices. FIG. 9H illustrates the truth table for the frame buffer display of FIGS. 9F and 9G that specifies the regions where the video output system should read from the frame buffer instead of the full-motion video buffer.

The system disclosed with reference to FIGS. 9A to 9H relies upon the horizontal and vertical slices of the frame buffer. These horizontal and vertical slices are defined by a pair of row addresses for horizontal slices and by a pair of column addresses for vertical slices. A simple data structure may be used to store these row and column address values for the horizontal and vertical slices, respectively. FIG. 9I illustrates a simple data structure wherein the slices are defined in two tables. A first table defines the horizontal slices as series of row address pairs and a second table defines the vertical slices as a series of column address pairs.

The tables illustrated in FIG. 9I are relatively small since each slice entry only consists of two small positive integers that may be represented with a relatively small number of bits for each integer. If the resolution of the screen is limited to 2048 by 2048 then each address entry requires eleven bits and each slice entry (with two addresses) requires twenty-two bits. In a system that allows a total of 32 windows to be overlaid on top of the full-motion video window (more than enough for any reasonable user), the total number of bits for the horizontal and vertical slice tables would be 32*2*22=1408 bits. In addition, a 32 by 32 bit array is required to store the truth table illustrated in FIGS. 9E and 9H. This adds another 32*32=1024 bits of storage. Thus, it can be seen that this method requires only a very small amount of internal memory to operate.

Software may be used to create and sort the data for the horizontal slice address table, the vertical slice address table, and the associated truth table. When an overlay window is moved or completely removed, the system will re-determine the contents the horizontal and vertical slice address tables and recalculate the truth table contents. When the software has finished creating new tables, the software will instruct the hardware to load the updated tables during a VSYNC time period (the time when the video display scanning system moves from the lower right corner of the display back to the upper-left corner of the display).

Implementation 3—Sorted Window Tables Implementation

The third implementation of an on-the-fly key color generation system sorts the various overlay windows laid on top of the full-motion video window in scan order and then creates ordered data structures for the overlay windows. The video output system then consults the ordered data structures while scanning through the full-motion video window to determine when the video output system should read from the full-motion video buffer and when it should read from the frame buffer.

In one embodiment, the on-the-fly key color generation system creates two sorted tables of overlay windows: a column group table with the windows sorted from left to right and a row group table with the windows sorted from top to bottom. Each overlay window entry in the sorted overlay windows table generally contains the upper left coordinate of the overlay window, the lower right corner of the overlay window, and a pointer to the next overlay window in the sorted table of overlay windows. FIG. 10A illustrates an example data structure for the row and column groups of overlay windows. As with the system described in the previous section, the system may be limited in the number of overlay windows it can handle. Again, one particular embodiment handles 32 overlay windows since this should provide more than enough overlay windows for reasonable usage.

Figure 11A:
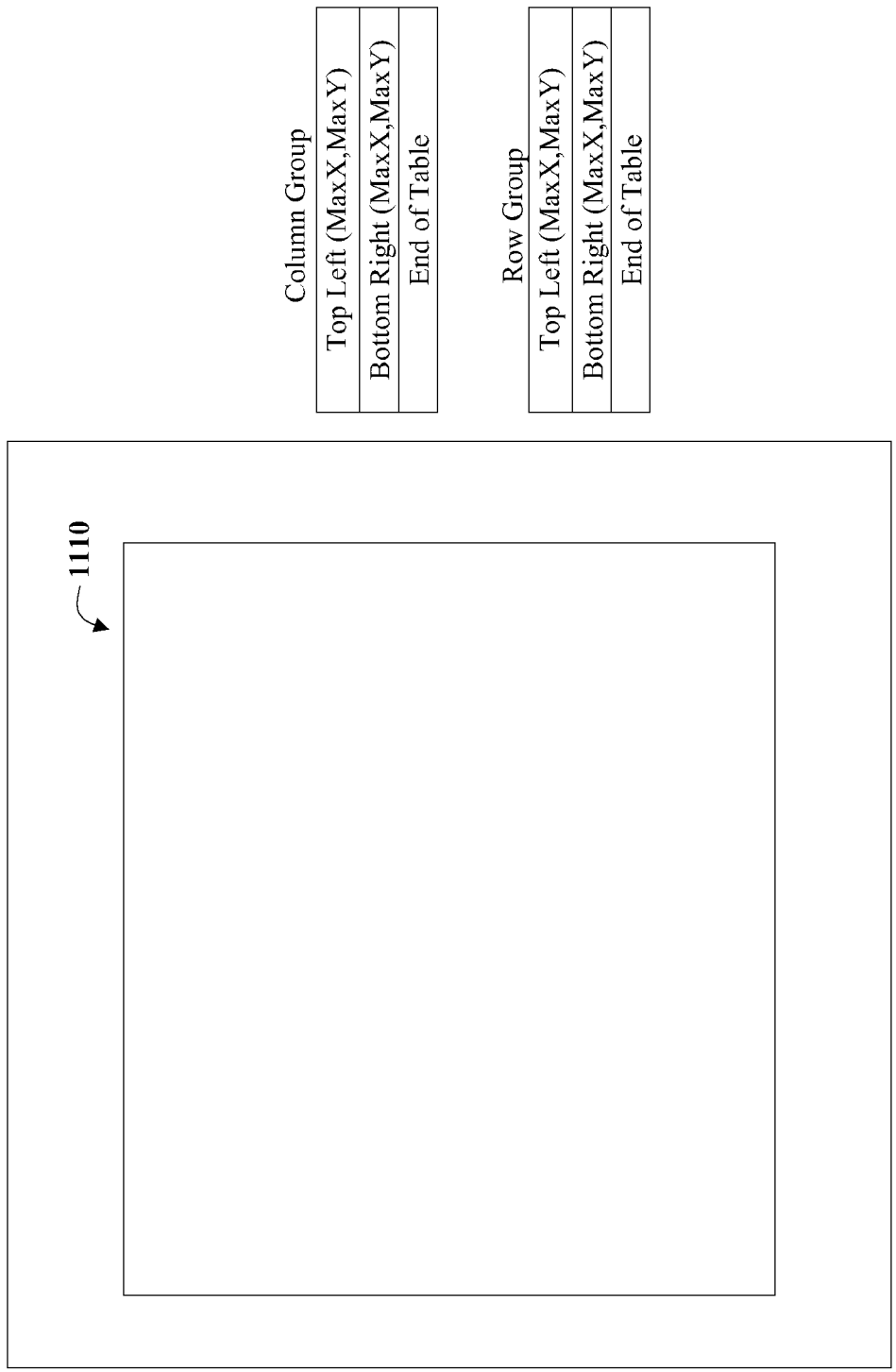
FIG. 11A illustrates a display screen with a full-motion video window along with an empty column group table and an empty row group of table

When a user first creates a full-motion video window on the user's desktop display, there will be no other windows overlaid on top of the full-motion video window. An example of this is illustrated by full-motion video window 1110 in FIG. 11A. The initial column group and row group lists for this initial condition are as illustrated in FIG. 11A where the lists only have one overlay window entry that specifies a maximum value for the both the top left and bottom right coordinates. This one entry is effectively a null window entry since it specifies a single pixel wide window at the very lower right corner. That null overlay window entry has an end-of-table designation in the portion that would point to the next window. Other implementations may simply use a flag to designate that no table has been created since there are no overlay windows.

Figure 11B:
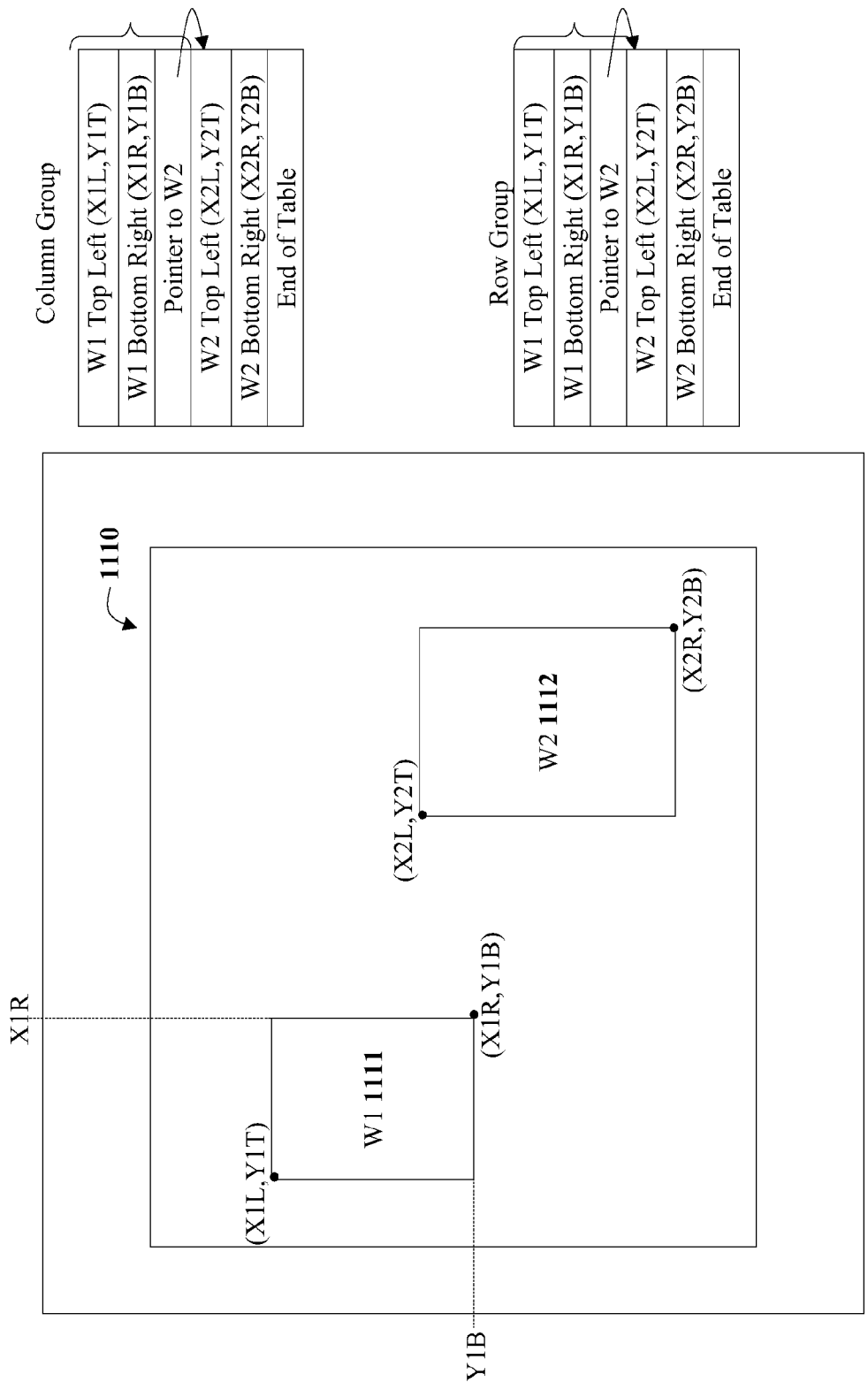
FIG. 11B illustrates a display screen with a full-motion video window for displaying full-motion video, two desktop graphics windows overlaid on top of the full-motion video window, and two tables for denoting the location of the overlaid windows.

As a user overlays windows on top of a full-motion video window, each additional overlay window must be added to the sorted column and row group. FIG. 11B illustrates the display of FIG. 11A with two windows (W1 1111 and W2 1112) overlaid on top of the full-motion video window 1110. Window 1111 (W1) is defined by the top-left coordinate (X1L,Y1T) and the bottom-right coordinate (X1R,Y1B). (Note that in this terminology the number is being used to designate the window number and the L, R, T, and B letters are used to designate Left, Right, Top, and Bottom, respectively.) Window 1112 (W2) is defined by the top-left coordinate (X2L,Y2T) and the bottom-right coordinate (X2R, Y2B).

The sorted column group and sorted row group for the 1111 and 1112 windows are also illustrated in FIG. 11B. A brace "}" is used to indicate the first overlay window in the sorted list of overlay windows and the sorted order of the remainder the overlay windows in the list comes from following the pointers within each overlay window entry successively. Note that the W1 1111 is first in both the column group and row group since W1 1111 is both to the left of and above W2 1112.

Once the video output system has created the sorted column group and the sorted row group, the video output system begins to scan through the frame buffer display. When the system is not scanning within the borders of a full-motion video window, the system will always read data from the frame buffer. When the system is within a full-motion video window (such as full-motion video window 1110), then the system will use the sorted column group and the sorted row group to determine if it should read from the frame buffer or the full-motion video buffer. Specifically, the system examines an entry in both the column group and the row group to determine if the scan is currently within any of the windows overlaid on top of the full-motion video.

To implement the system, the video output system maintains a 'current pointer' into the column and row group tables that specify where comparisons need to be performed. There is a current pointer for the column group referred to as the ColCurPtr and there is a current pointer for the row group referred to as the RowCurPtr. In addition, the system calculates and maintains a 'next pointer' value for both the column group (ColNxtPtr) and row group (RowNxtPtr). The next pointers (ColNxtPtr and RowNxtPtr) identify the next window entry that needs to be considered as the system scans through the full-motion video window. The system calculates the next pointer while the current pointer is being used. The value in the next pointer will immediately become the current pointer value when the window entry pointed to by the current pointer is no longer relevant.

As set forth above, the row group table and the column group table are sorted from top to bottom and from left to right, respectively. The video output system compares the current location of a scan across the full-motion video window with entries in the row and column group tables to determine the next overlay window that must be considered. Initially, when the scan starts at the upper-left corner, the RowCurPtr will point to the first overlay window entry in the row group table that has not been passed yet by the scan. Since the scan has not started yet, this will be first overlay window entry in the row group table. The ColCurPtr will point to the first overlay window entry in the column group table that has a row range that covers the current row being scanned. (If there is no window that covers any portion of the current row then the system may simply point to the first entry in the column group table.)

The RowNxtPtr and ColNxtPtr values are calculated by identifying the next overlay window entry in each table respectively that must be considered. The RowNxtPtr value will point to the next highest overlay window that has not been passed by the current row being scanned. The ColNxtPtr will point to the next entry in the column group table that has a row range that covers the current row being scanned. (Again, If no overlay window covers any portion of the row currently being scanned, the system may simply point to the first overlay window entry in the column group table or some other entry.)

As the system scans through the display screen, the various pointer values will be updated as needed. The row pointer values (RowCurPtr and RowNxtPtr) values will be updated every time the scan reaches the right side of the display and performs a horizontal sync (HSYNC) that brings the scan back to the left side of the display to process the next row. The column pointer (ColCurPtr and ColNxtPtr) values will also be updated once HSYNC goes active. However, the ColCurPtr and ColNxtPtr values will also be updated any time the scan across the current row passes through the right boundary of the current window entry or the left boundary of a later overlay window entry for the current row. To determine if the current location during a scan is within an overlay window, the system will first examine the entry pointed to by the RowCurPtr. If the current scan row is not within the row range of the window entry pointed to by the RowCurPtr then the system is not within any overlay window. Specifically, since the most relevant overlay window entry in the row group table does not cover the current scan row at all then there is no need to perform any calculations with regard to the column group table.

If the current row being scanned is within the row range of the overlay window entry pointed to by the RowCurPtr then the system must consult the overlay window entry pointed to by the ColCurPtr. If the current location is in both the column range and the row range of the entry pointed to by the ColCurPtr then the scan is within an overlay window such that the video output system should read from the frame buffer instead of reading from the full-motion video buffer. Otherwise, the system should read from the full-motion video buffer (assuming it is within the full-motion video window)

The video output system thus uses the row group table first to determine if a window (any window) overlaps the current row address being scanned. If there is at least one window that covers any part of the current row then the system uses the column group table to determine when it is scanning across full-motion video or scanning across an overlay window that has been overlaid on top of a full-motion video window and thus blocking the full-motion video.

An example of how the system may scan through a full-motion video window using the current pointers and next pointers will be presented with reference to FIG. 11B and the following table.

| Row Address | Column Address | RowCurPtr | RowNxtPtr | ColCurPtr | ColNxtPtr |
|---|---|---|---|---|---|
| VSYNC | VSYNC | W1 | W2 | W1 | W2 |
| | After X1R | | | W2 | W1 |
| | HSYNC | W1 | W2 | W1 | W2 |
| After Y1B | | W2 | W1 | W2 | W1 |

The video output system starts each new frame scan from the top-left of the display illustrated in FIG. 11B. The video output system progressively scans each row from left to right starting at the top of the display and working down to the bottom of the display. Each time the video output system hits the right side of the display, a horizontal resynchronization (HSYNC) occurs that brings the scanning back to the left side of the display. When the system reaches the bottom of the display, a vertical resynchronization (VSYNC) occurs that brings the scanning from the bottom-right corner back to the top-left corner of the display. As listed in the above table, right after a VSYNC both the ColCurPtr and the RowCurPtr point to Window 1 and both the ColNxtPtr and the RowNxtPtr point to Window 2. This is because the Window 1 is above and to the left of Window 2. Note that ColNxtPtr value does not really matter initially since Window 2 is not encountered until row Y2T.

At the very start of the display scan, the overlay window entries pointed to by the pointers do not matter since the overlay windows do not begin to overlay the full-motion video window 1110 until row Y1T. There will be comparisons to the value pointed to by the RowCurPtr those comparisons will not indicate a possible overlay window until row Y1T is encountered. Once the scan reaches row Y1T, the comparison to the W1 overlay window entry pointed to by RowCurPtr will indicate that the scan row does contain at least one overlay window that covers a portion of that scan row. Thus, the system will begin making comparisons using the ColCurPtr in addition to the RowCurPtr.

As the system scans from left to right, it will eventually pass the right edge of W1 1111 at column X1R. At this point, W1 1111 is no longer relevant for the rest of the scan of that row. Thus, as listed in the above table, ColCurPtr is changed to the value of the ColNxtPtr which points to the W2 entry in the column group. Thus, the system will no longer make comparisons for W1 1111 when scanning across the rest of the row but may make comparisons to for W2 1112. The ColNxtPtr may be changed to point to the Window W1 entry in the column group since Window W1 will be encountered next (in the next row).

When the video output system reaches the end of the row, a horizontal resynchronization (HSYNC) occurs that brings the scanning from the right side of the display back to the left side of the display. The system then begins scanning the next lower row. At this point, as listed in the above table, the ColCurPtr is changed to the value of the ColNxtPtr which points to the W1 overlay window entry in the column group such that W1 1111 is again considered.

The video output system continues along in this manner until it passes the lower edge of W1 1111 at row Y1B. Once the video output system has passed row Y1B, the video output system never has to consider overlay window W1 1111 again. Thus, after the row Y1B the RowColPtr is changed to the value in the RowNxtPtr which points to the entry for overlay window W2 1112. For the remainder of the scan though the full-motion video window 1110, the system will no longer have to consider the entry for overlay window W1 1111 in the row group.

When new overlay windows are added or existing overlay windows are removed, the system must adjust the row group table and column group table. New windows must be added, removed windows deleted, and the coordinates for moved windows must be changed. Furthermore, the pointers in the column group and row group tables that order the overlay windows must be set according to the orders of the new overlay windows.

Figure 11C:
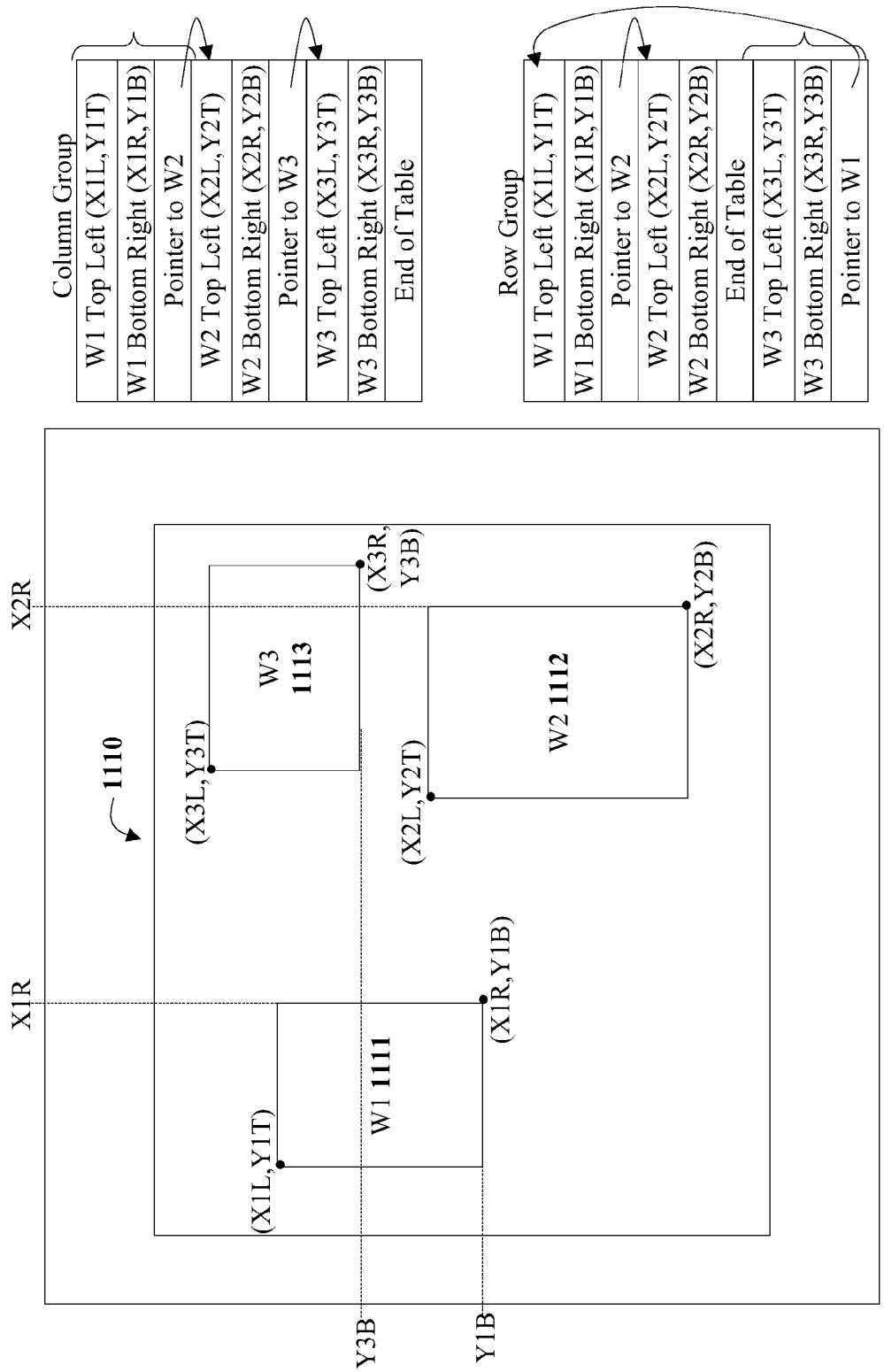
FIG. 11C illustrates the display screen of FIG. 11B with an additional desktop graphics window overlaid on top of the full-motion video window.

FIG. 11C illustrates the screen display of FIG. 11B with an added third overlay window, W3 1113. Overlay window W3 1113 is higher than overlay window W1 1111 such that overlay window W3 1113 becomes the first overlay window in the vertically sorted row group table. However, overlay window W3 1113 is to the right of overlay window W2 1112 so that overlay window W3 1113 will be placed at the end of the horizontally sorted column group table. FIG. 11C illustrates the column group table and the row group with a new entry for overlay window W3 1113 in each table. As illustrated in the row group table, the overlay window W3 entry is marked as first by the braces and it points to the overlay window W1 as the second entry in the sorted list and the overlay window W1 entry points to the overlay window W2 entry as the last overlay window entry in the vertically sorted list of the row group table.

Figure 12:
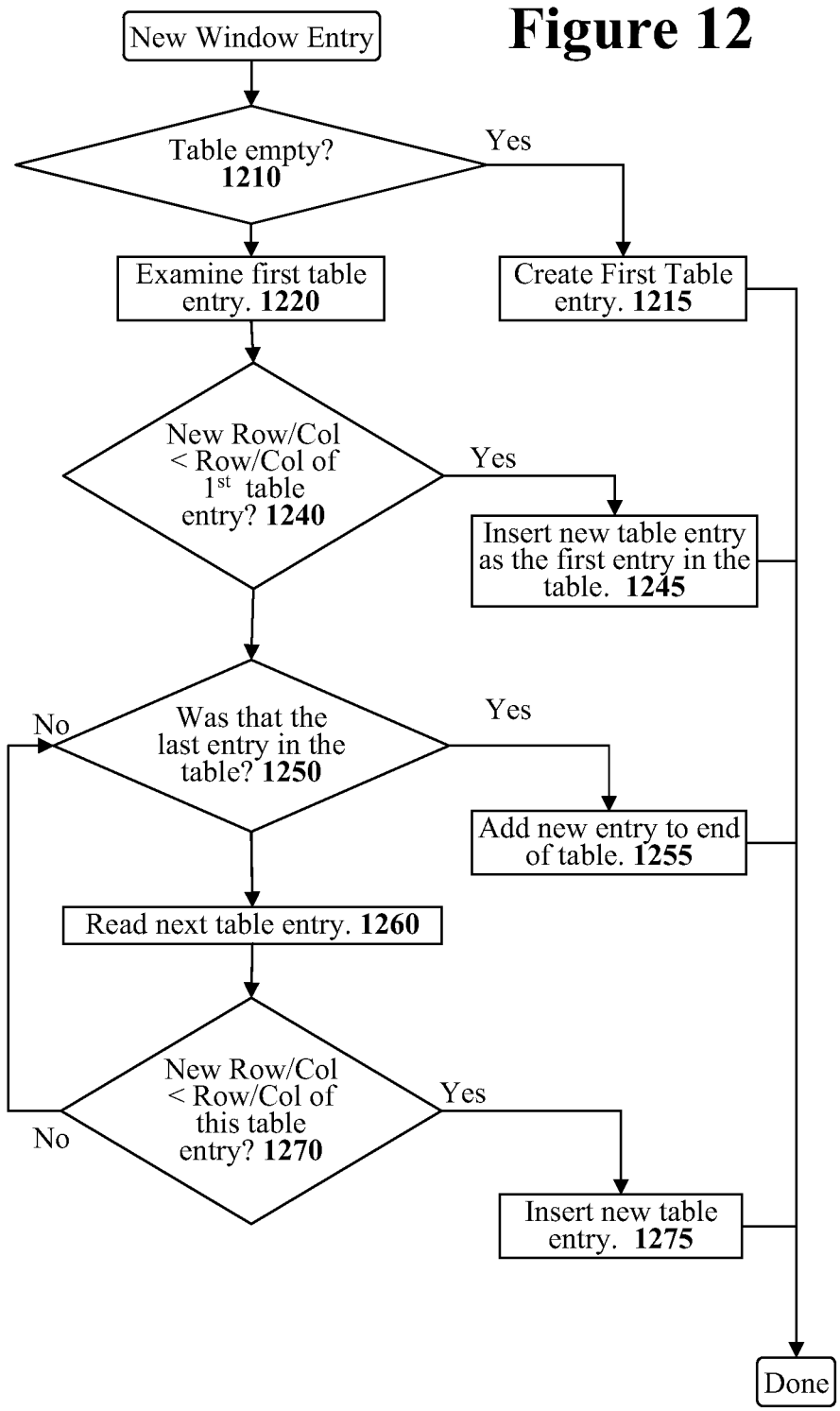
FIG. 12 illustrates a flow diagram that describes how a new window may be added to a row or column group table.

FIG. 12 illustrates a flow diagram that describes how a new overlay window may be added to a row or column group table. In one embodiment, new overlay windows are added to the row group and column group tables during the VSYNC period. For an implementation that allows up to 32 overlay window entries, the added 32nd overlay window entry may require 32 clock cycles. However, this will fall within the VSYNC period (which spans multiples of 32 clock cycles) used to add new overlay window entries.

In order to most efficiently add new overlay window entries, the system should add the new overlay window entries to both the row group table and the column group table at the same time. This use of parallelism will minimize the time to add new overlay window entries into the tables.

Referring to FIG. 12, the system initially determines if the table is empty at stage 1210. If the table is empty, then the system creates a first real overlay window entry at stage 1215. The first overlay window entry will contain the overlay window coordinates and an end-of-table designation in the pointer section.

If the table is not empty then the system examines the first overlay window entry at stage 1220. If the row or column of the new overlay window is smaller than the first overlay window entry at stage 1240 then the system proceeds to stage 1245 where it creates a new entry for the overlay window. That new overlay window entry will point to the (formerly) first overlay window entry in the table. Thus, the new overlay window entry will become the first overlay window entry in the table.

If the row or column of the new overlay window was not smaller than the row or column of the first overlay window entry at stage 1240 then the system proceeds to stage 1250 where it determines if that overlay window entry was the last overlay window entry in the table. If it was the last overlay window entry then a new overlay window entry is created at the end of the table at stage 1255. The previous overlay window entry will point to the new overlay window entry. The system will put an end-of-table designation in the pointer section of the new overlay window entry to designate the new overlay window entry as the last overlay window entry in the table.

If that first overlay window entry in the table was not the last entry in the table (according to the comparison at stage 1250), the system then moves to the next overlay window entry in the table at stage 1260. Then at stage 1270, the system compares if the new overlay window has a row or column smaller than this next overlay window entry. If it is smaller then the system adds a new overlay window entry in before it at stage 1275. Otherwise, the system loops back to stage 1250 to see if it was the last entry in the table. The system loops through stages 1250, 1260, and 1270 until the new window is added into the proper location of the ordered linked list.

FIGS. 13A to 13C illustrate how the column group and row group tables may be implemented. In one embodiment, each overlay window entry of the column group and row group tables is a fixed-size entry in table that can handle up to N windows. In one embodiment N is thirty-two but any number may be chosen. FIG. 13A illustrates example column group and row group tables with the five overlay window entries and an empty entry. If these were the first five windows encountered, these five overlay window entries would fill the first five slots of an N entry table followed by the empty overlay window entries. An empty pointer points to the first empty overlay window entry, the sixth overlay window entry in this example. That first empty overlay window entry would then form the top of a linked list linking all of the empty overlay window entries.

When the user removes an overlay window then that overlay window must be deleted from the column group and row group tables. This will create a hole such that the remaining overlay window entry pointers must be adjusted to point around the removed entry. The empty entry is then added to the empty entry linked list. In one embodiment, the deleted overlay window entry becomes the new top of the linked list of empty overlay window entries.

For example, FIG. 13B illustrates the column group and row group tables of FIG. 13A with overlay window 3 (W3) removed after a user closed or moved the W3 overlay window. To handle the removal of the W3 overlay window, the pointers of the remaining windows are adjusted to remove the W3 overlay window from the active list of the W3 overlay windows and that overlay window entry is added to the linked list of empty overlay window entries. Thus, FIG. 13C illustrates Window 2 (W2) pointing to Window 4 (W4) after the removal of W3. Similarly, table entry 3 (the empty location of former W3) now points to entry 6 in the table such that entry 3 is now the top of the empty entry linked list.

Referring back to FIG. 11C, the following table illustrates of how the system scans through the full-motion video window using the current pointer and next pointer.

| Row Address | Column Address | RowCurPtr | RowNxtPtr | ColCurPtr | ColNxtPtr |
|---|---|---|---|---|---|
| VSYNC | VSYNC | W3 | W1 | W1 | W2 |
|  | After X1R |  |  | W2 | W3 |
|  | After X3L |  |  | W3 | W1 |
|  | HSYNC |  |  | W1 | W2 |
| After Y3B |  | W1 | W2 |  |  |
| After Y1B |  | W2 | W3 |  |  |

Figure 14A:
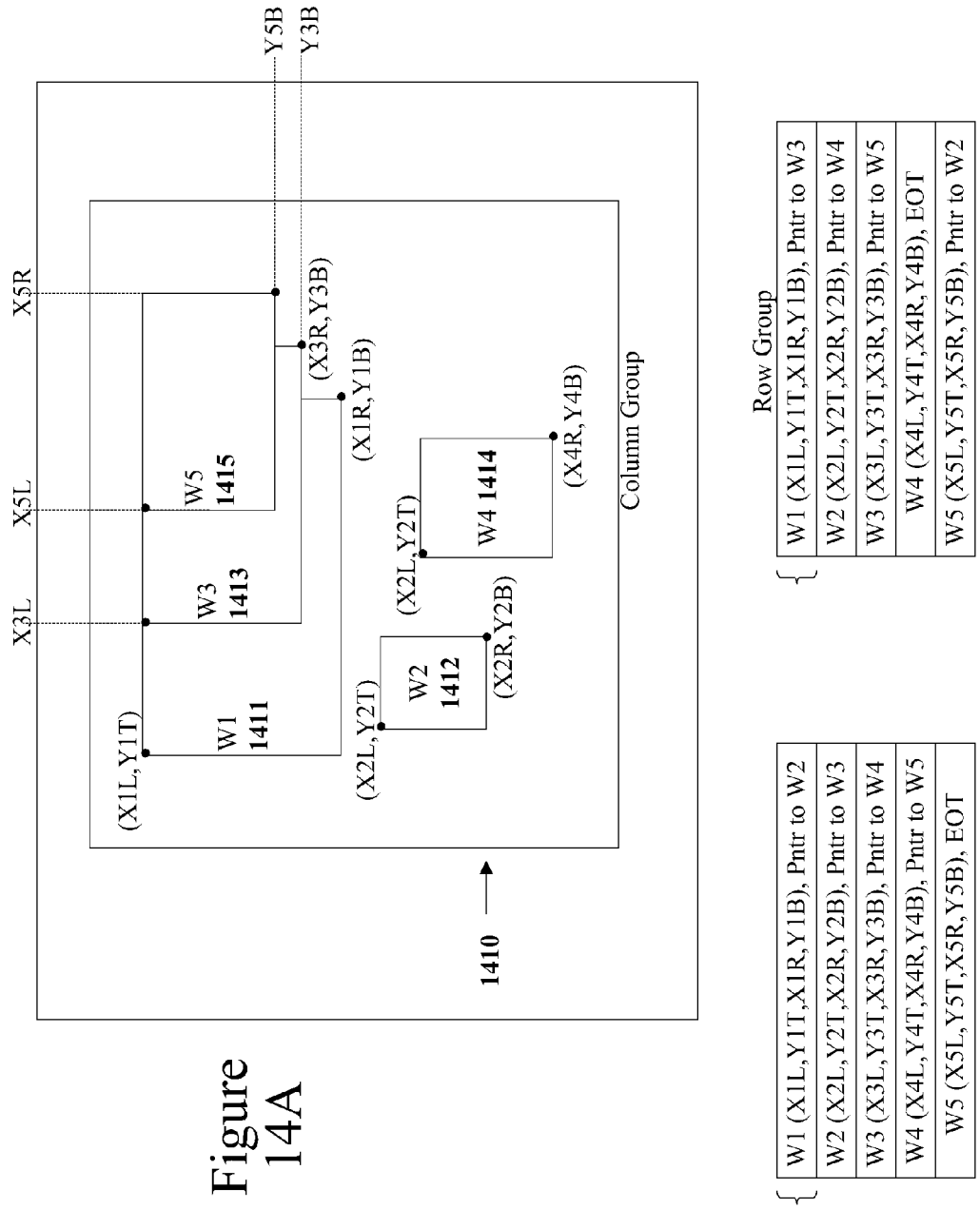
FIG. 14A illustrates a screen display with three overlapping windows.

A special case occurs when windows overlap each other. For example, FIG. 14A illustrates a case wherein there are three overlapping windows: W1 1411, W3 1413, and W5 1415. To handle such cases, the system will change the ColCurPtr as soon as the system crosses the leading (left) border of the next overlay window instead of waiting for the trailing border of the previous overlay window. Furthermore, each overlay window is allowed to be no smaller than a width in pixels that allows the next pointer to be calculated before the system passes out of the current overlay window. For example, in a system that allows up to 32 overlay windows, the system may require each overlay window to be at least 32 pixels wide. This will allow the system to have enough time to calculate the next pointer value since the system will immediately begin calculating a new value for the next pointer as soon as the system crosses the left boundary of a window.

If the system did immediately encounter another transition in quick succession (for example if after switching to W3 1413 the system then encounters W5 1415 within a couple pixels), the system would not have the next pointer ready in time. Thus, if the system immediately switched to the next pointer value, it might switch to an invalid next pointer value. To prevent this from occurring, the system sets a "next pointer mask" (NxtPtrMask) bit when next pointer calculations begin. The NxtPtrMask bit will remain set until the next pointer value is fully calculated. The system then clears NxtPtrMask bit such that the next pointer (ColNxtPtr) may then be used. While the NxtPtrMask bit is set, the system will continue to use the current pointer (ColCurPtr). And since the overlay window was required to be at least 32 pixels wide, the system will still be within an overlay window when the next pointer is ready.

The following table illustrates of how the system scans through the full-motion video window of FIG. 14A using the current pointer and next pointer. The table only follows the column pointers since that is the pointer that changes more often. In the following tables "NP" means "next pointer" and CP means "current pointer".

| Column Address | ColCurPtr | ColNxtPtr | NxtPtrMask (NP = CP when =1) |
|---|---|---|---|
| HSYNC | W1 | W3 | Off |
| After X3L, Y1T | W3 | W5 | On until NP calculated |
| After X5L, Y1T | W5 | W1 | On until NP calculated |
| After X3L, Y5B + 1 | W3 | W1 | On until NP calculated |
| After Y3B + 1 | W1 | W1 | Off |
| Y2T | W1 | W1 | Off |
| After (X2L, Y4T) | W2 | W4 | Off |
| After (X4L, Y4T) | W4 | W1 | Off |

Figure 14B:
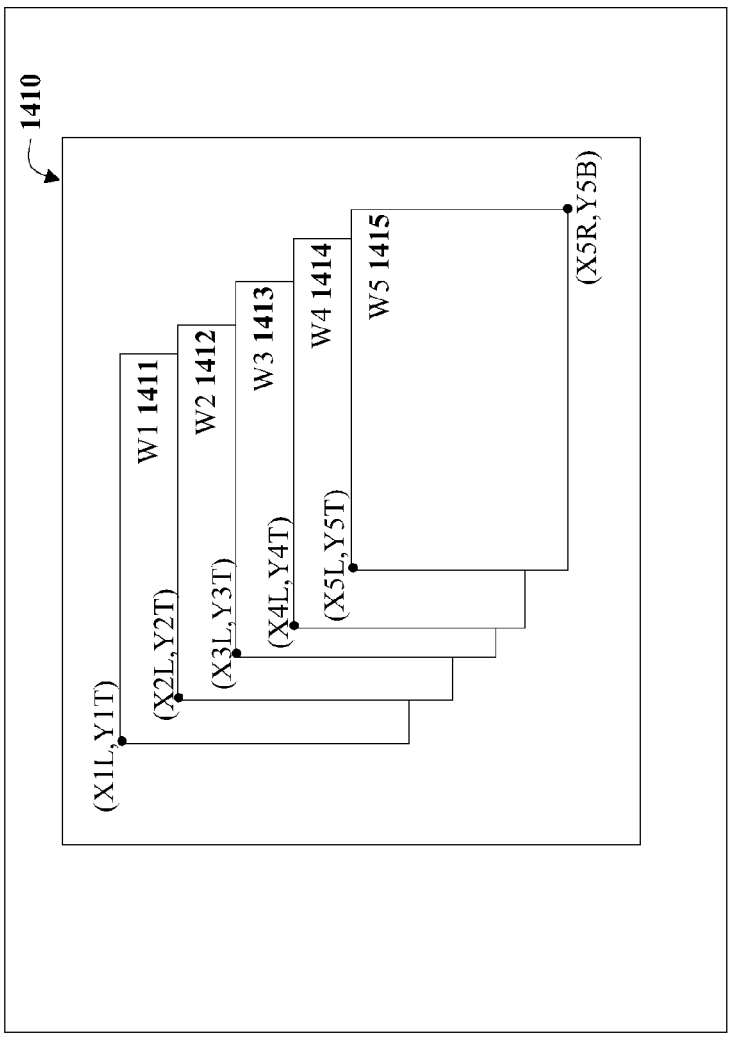
FIG. 14B illustrates a screen display with five staggered overlapping windows.

FIG. 14B illustrates a case wherein there are a set of staggered overlapping windows W1, W2, and W3. To handle a worst case situation, these windows may be staggered by a single pixel. To handle such cases wherein the windows change quickly, the system adds a current pointer mask (CurPtrMask). The current pointer mask (CurPtrMask) acts like a flag that indicates at the current pointer needs to be changed but the next pointer is not yet available. Thus, the current pointer should be changed to the next pointer as soon as it becomes available. The current pointer mask (CurPtrMask) will have the current pointer remain the same (current pointer=previous current pointer) until the next pointer is fully calculated. At that point, the current pointer will immediately switch to the next pointer value that was just calculated. Again, masking will prevent the system from switching to an invalid ColNxtPtr before the real ColNxtPtr is fully calculated.

The following table illustrates of how the system scans through the full-motion video window of FIG. 14B using the current pointer and next pointer. The table only follows the column pointers since that is the pointer that changes more often. In the following tables "NM" means "next pointer mask" and "CM" means "current pointer mask".

| Column Address | ColCurPtr | ColNxtPtr | CurPtrMask (CM = PrevCP when =1) |
|---|---|---|---|
| HSYNC | W1 | W2 | Off |
| After X1L, Y3T | W1 | W2 | Off |
| After X2L, Y3T | W2 | W2 | On until NP calculated |
| After X3L, Y3T | CM = 1, W2 | NM = 1, W2 | On until NP calculated |
|  | CM = 1, W2 | NM = 0, W3 | On until NP calculated |
|  | CM = 0, W3 | NM = 0, W1 | Off |
| After X4L, Y4T | CM = 1, W3 | NM = 1, W3 | On until NP calculated |
|  | CM = 1, W3 | NM = 0, W4 | On until NP calculated |
|  | CM = 0, W4 | NM = 0, W1 | Off |
| After X5L, Y5T | CM = 1, W4 | NM = 1, W4 | On until NP calculated |
|  | CM = 1, W4 | NM = 0, W5 | On until NP calculated |
|  | CM = 0, W5 | NM = 0, W1 | Off |

Figure 14C:
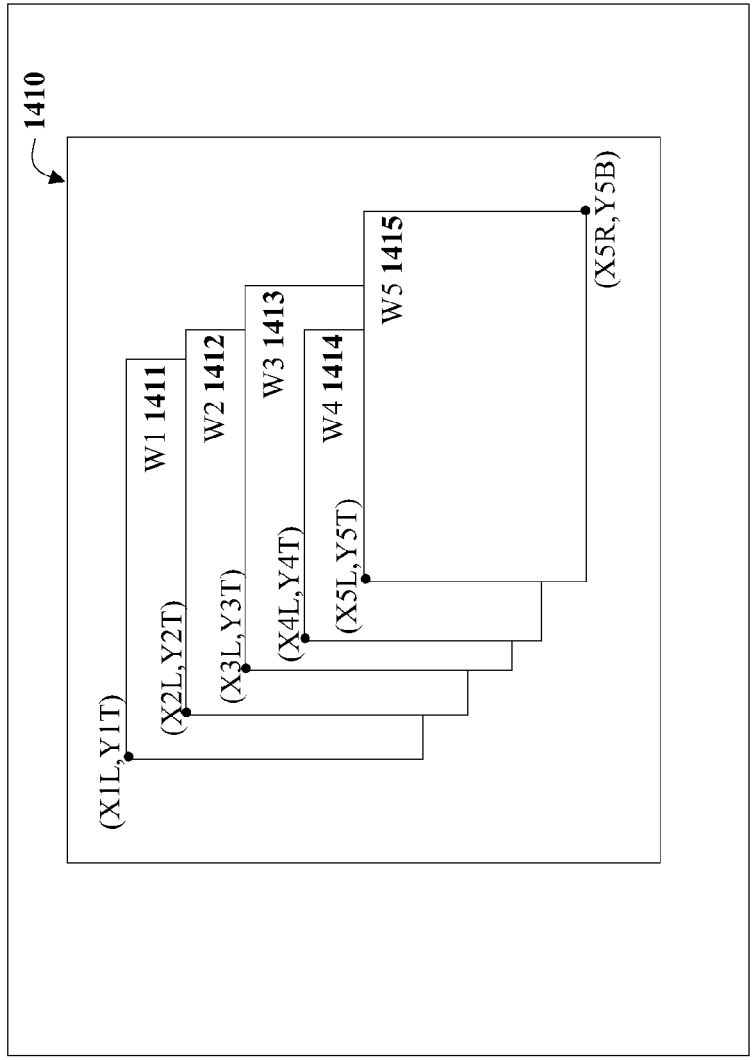
FIG. 14C illustrates the screen display of FIG. 14B wherein one of the five staggered overlapping windows is overlaid on top of a larger window.

Another difficult case occurs when a smaller window overlaps a larger window. In such a case, the system should not switch from the lower larger window to the smaller overlapping window. FIG. 14C illustrates a case wherein W4 1414 of FIG. 14B is smaller than W3 1413 and is lying on top of W3 1413. To handle such a case, the system will keep using W3 1413 as the current window even though it passes through W4 1414. The system will consider W4 1414 after it has passed the bottom of W3 1413. The current pointer mask will have the current pointer remain the same (current pointer=previous current pointer) until the next pointer is fully calculated. Again, masking will prevent the system from switching to an invalid ColNxtPtr before the real ColNxtPtr is fully calculated.

The following table illustrates of how the system scans through the full-motion video window of FIG. 14C using the current pointer and next pointer. The table only follows the column pointers since that is the pointer that changes more often. Furthermore, the following table does not list all the stages that are passed through, just the initial state and the final state.

| Column Address | ColCurPtr | ColNxtPtr | CurPtrMask (CP = PrevCP when =1) |
|---|---|---|---|
| HSYNC | W1 | W2 | Off |
| After X1L, Y3T | W1 | W2 | Off |
| After X2L, Y3T | W2 | W2 | On until NP calculated |
| After X3L, Y3T | CM = 1, W2 | NM = 1, W2 | On until NP calculated |
| | CM = 0, W3 | NM = 0, W1 | Off |
| After X4L, Y4T | CM = 1, W3 | NM = 1, W3 | On until NP calculated |
| | CM = 0, W3 | NM = 0, W1 | Off |
| After X5L, Y5T | CM = 1, W3 | NM = 1, W3 | On until NP calculated |
| | CM = 0, W5 | NM = 0, W1 | Off |
| HSYNC, Y3B + 1 | W4 | W5 | Off |

Figure 10B:
FIG. 10B illustrates an optimized version of the data structure of FIG. 10A that may be used to store an ordered column group of overlay windows and an ordered row group of overlay windows.

Various optimizations may be performed to reduce the resource requirements of this system. For example, FIG. 10B illustrates a method of reducing the size of the column and row group tables. FIG. 10B illustrates the column and row group tables of FIG. 10A, wherein the overlay window entries in the row group table do not store the horizontal (or column) coordinates of the associated overlay window. The horizontal coordinates are not needed for the row group table comparisons since the row group is only used to determine if there is at least one overlay window that covers any part of the row currently being scanned. Eliminating the horizontal coordinates of the overlay window from the entries in the row group table reduces the size of the row group table.

Similarly, in the tables of FIG. 10B, the column group table does not store the vertical (or row) coordinates of the associated window. However, the vertical (or row) coordinates of the associated window are needed for the column group table comparisons. To provide the vertical (or row) coordinates of the associated overlay window, the column group table entries include a pointer to the associated overlay window entry in the row group table that has the needed vertical (or row) coordinates of the overlay window. This technique saves space since a pointer is generally smaller than two coordinate values.

The implementation of this section that uses sorted window tables will ideally be implemented in hardware. It may be possible to create the sorted window tables using software but using hardware will ensure fast operation.

Implementation 4—Partial Reading of Key Color Pixel Data

The previous three implementations all rely upon having the video output system receive the screen coordinates of the various application windows overlaid on top of the full-motion video window in order to determine when to read from the frame buffer and when to read from the full-motion video buffer. However, it may not be easy to obtain those overlay window coordinates in all the different operating system environments. For example, in the thin-client environment illustrated in FIGS. 2 and 4, the server system 220 that distributes output information to the thin-client systems 240 may not receive the coordinates of all the application windows from the operating system. (Although the operating system will generally provide the coordinates of the full-motion video window being used to display full-motion video.)

To determine the coordinates of the application windows that are overlaid on top of the full-motion video window when the operating system does not provide the overlay window coordinates, the server system 220 from FIG. 4 could locate the key color pixels in the frame buffer and then derive the coordinates of the various overlay windows from the locations all of key color pixels. The task of deriving all of the overlay window coordinates only from the key color pixels is very difficult. The task becomes particularly acute when the user is moving an overlay window around such that the coordinates of the overlay window are constantly changing. This will cause the server system to repeatedly re-determine where the overlay windows are located. Such an implementation would waste a significant amount of valuable server system CPU cycles.

In the thin-client environment illustrated in FIGS. 2 and 4, the server system 220 will generally transmit the contents of the frame buffer that include the key color pixels which specify where the full-motion video window lies within the frame buffer. Since the key color hue that defines the full-motion video window changes relatively infrequently (only when a user moves or resizes the full-motion video window), the transmission of this key-color pixel information does not use much in terms of resources (CPU cycles in the server, bandwidth of the communication channel, memory bandwidth in the thin-client system, etc.). Therefore, since this key color pixel information is already being transmitted from the server 220 to the thin-client terminal system 240, it would be desirable to implement a system that operates using this available key color pixel information to determine the location of the full-motion video window and the overlay windows overlaid on top of that full-motion video. However, the very goal of an on-the-fly key color generation systems is to avoid reading the key color pixel information that will be discarded and instead only read full-motion video pixels when full-motion video needs to be displayed.

In the thin-client environment in FIGS. 2 and 4, the server system 220 may transmit the contents of terminal's frame buffer as a group of small rectangular regions that are combined to create a full display screen. Specifically, referring to FIG. 4, the frame encoder 217 in the server system 220 may encode changed sections of the screen frame buffer 215 as small rectangular regions that are transmitted to the associated thin-client terminal system 240. In one embodiment, the small rectangular regions may be 8 by 8 pixel "macro-blocks" but other shapes and sizes may be used. Furthermore, completely different frame buffer encoding systems may be used.

In the thin-client environment in FIGS. 2 and 4, the encoded macro-blocks are received by thin-client terminal system 240 and used to generate a local video output signal. In the embodiment of FIG. 4, a control system 250 will provide the macro-blocks containing screen update information to the screen update decoder 261. The screen update decoder 261 decodes the macro-blocks and updates the screen frame buffer 260 in the thin-client terminal system 240 accordingly. By examining the incoming macro-block updates as the macro-block updates arrive at the thin-client terminal system 240, the thin-client terminal system 240 can determine where overlay windows have been overlaid on top of a full-motion video window without reading the key color information from the frame buffer. Specifically, the update decoder 261 that is responsible for decoding and applying updates to the frame buffer 260 is in an ideal position to determine the overlay window coordinates and create a map of the overlay windows before the pixel data is written into the frame buffer 260.

Using update decoder 261 to determine the overlay window coordinates provides several advantages. For example, by examining the macro-blocks with the update decoder 261 to locate key color pixels before the macro-block updates are applied to the frame buffer 260, the system will not waste memory bandwidth by reading pixel data back out of the frame buffer 260 in the memory system 264 to determine the overlay window coordinates. Furthermore, in a thin-client system that only transmits screen buffer updates when the data in the associated screen buffer 215 is changed, the local display system will only be prompted to re-determine overlay window coordinates when the update decoder 261 receives updates for the screen frame buffer 260. Thus, if no screen frame buffer updates are received then the position and size overlay windows have not changed such that the existing overlay window information can continue to be used.

In one embodiment, the update decoder 261 determines the exact coordinates of each overlay window using screen buffer updates that are received. (The update decoder 261 may be implemented with either hardware or software but in one implemented embodiment, the update decoder 261 is implemented with software.) Once the update decoder 261 determines the exact overlay window coordinates, the video output system could then use any of the techniques disclosed in the previous sections to implement an on-the-fly key color generation system. In one embodiment, the system will have the update decoder 261 only determine an approximate location of the two sides of various overlay windows while decoding and applying frame buffer updates. Key color information will later be used to define the exact side boundaries of the windows.

Figure 15A:
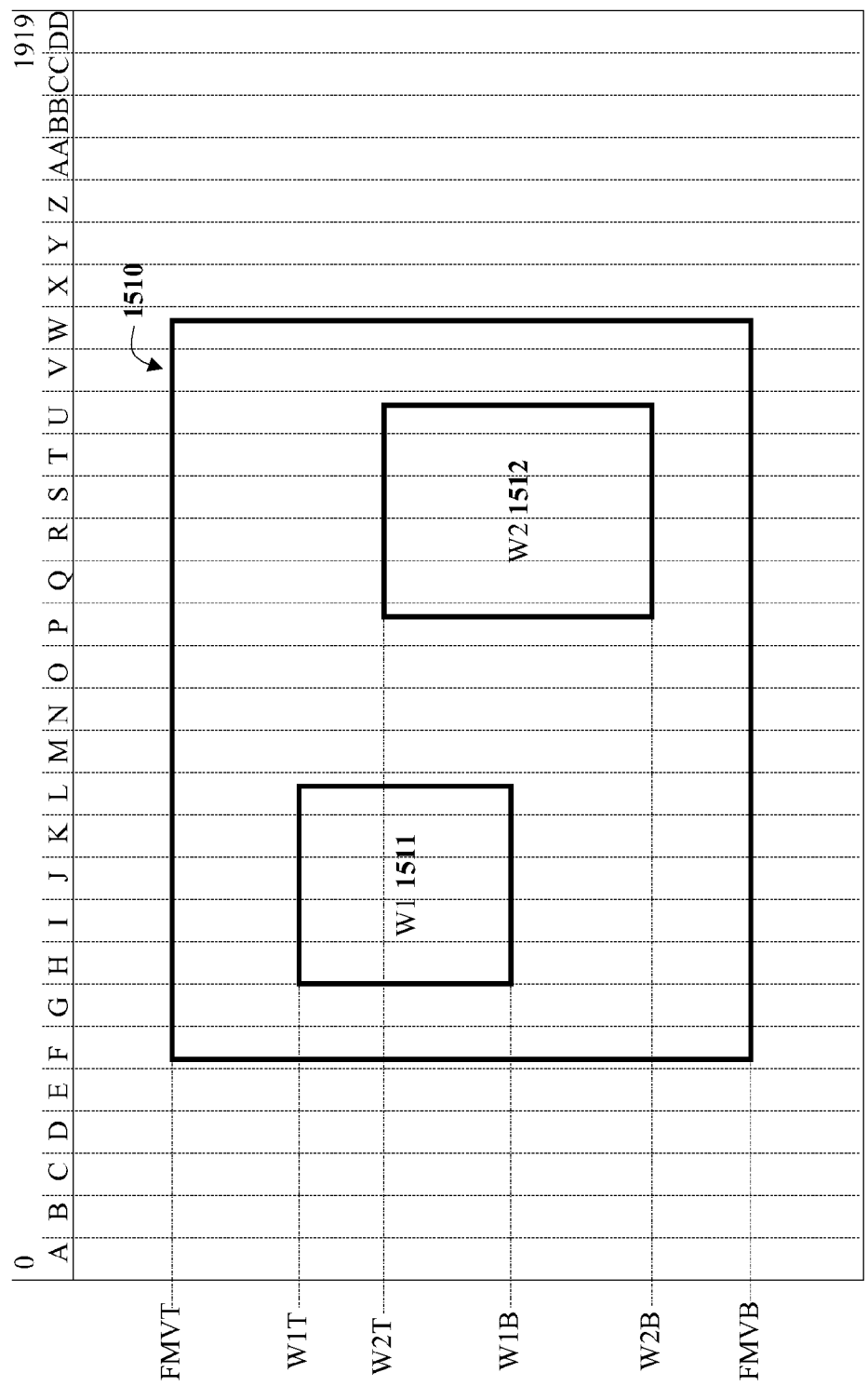
FIG. 15A illustrates a screen display with a full-motion video window and two windows overlaid on top of the full-motion video window wherein the screen display has been divided into column slices.

To define approximate overlay window locations, the system divides the display screen into vertical column slices. The approximate location of the side boundaries of overlay windows will then be specified by indicating which column slices contain overlay window side boundaries. The size of the column slices and the size of the video screen itself may vary in different implementations. Thus, although this disclosure will disclose the system with one particular set of column slice size and display resolution values, other implementations may be implemented with other sets of specific values. FIG. 15A illustrates an example with a high-definition 1920 by 1080 pixel display screen. In the example of FIG. 15A, the display screen has been divided into thirty (30) column slices that are each 64 pixels wide. Thus, in the example of FIG. 15A, the approximate side boundaries for overlay windows are defined by specifying which of the 30 column slices the side boundaries of the overlay window fall within.

For one implementation, a 64 pixel wide column size was chosen since the processor used in that embodiment was able to efficiently 'burst read' data from the frame buffer in external memory in 64 byte wide chunks. With a 64 pixel wide column slice size, each column slice of the main frame buffer will be made up of 128 bytes for high-color (16-bit) mode and 192 bytes for true color (24-bit) mode, both of which are even multiples of 64 bytes. For YUV data in the video buffer, Y data takes up 1 byte per pixel. Hence, 64 pixel boundary translates to 64 bytes. There is 1 byte of Cr and 1 byte of Cb for every 2×2 pixel patch in 4:2:0 format. Thus, in 4:2:0 format, there will be Cr/Cb 64 bytes for 64 pixels for rows that include Cr/Cb data. However, there will only be one row of Cr/Cb data for every two rows of Y data in the 4:2:0 format.

A full-motion video window 1510 on the high-definition display screen of FIG. 15A extends horizontally from column F to column W. In the vertical dimension, the full-motion video window extends from row FMVT (Full-Motion Video Top) down to row FMVB (Full-Motion Video Bottom). In one embodiment, the exact coordinates of the full-motion video window 1510 are provided to the video output system by some upstream source such as an operating system.

To complicate the situation, portions of the full-motion video window 1510 may be obscured by overlaid windows. In the example of FIG. 15A, overlay window W1 1511 and overlay window W2 1512 are overlaid on top of the full-motion video window 1510. When the video output system scans over overlay window W1 1511 and overlay window W2 1512, the video output system will need to read from the frame buffer to display the data from the overlay windows.

Figure 15B:
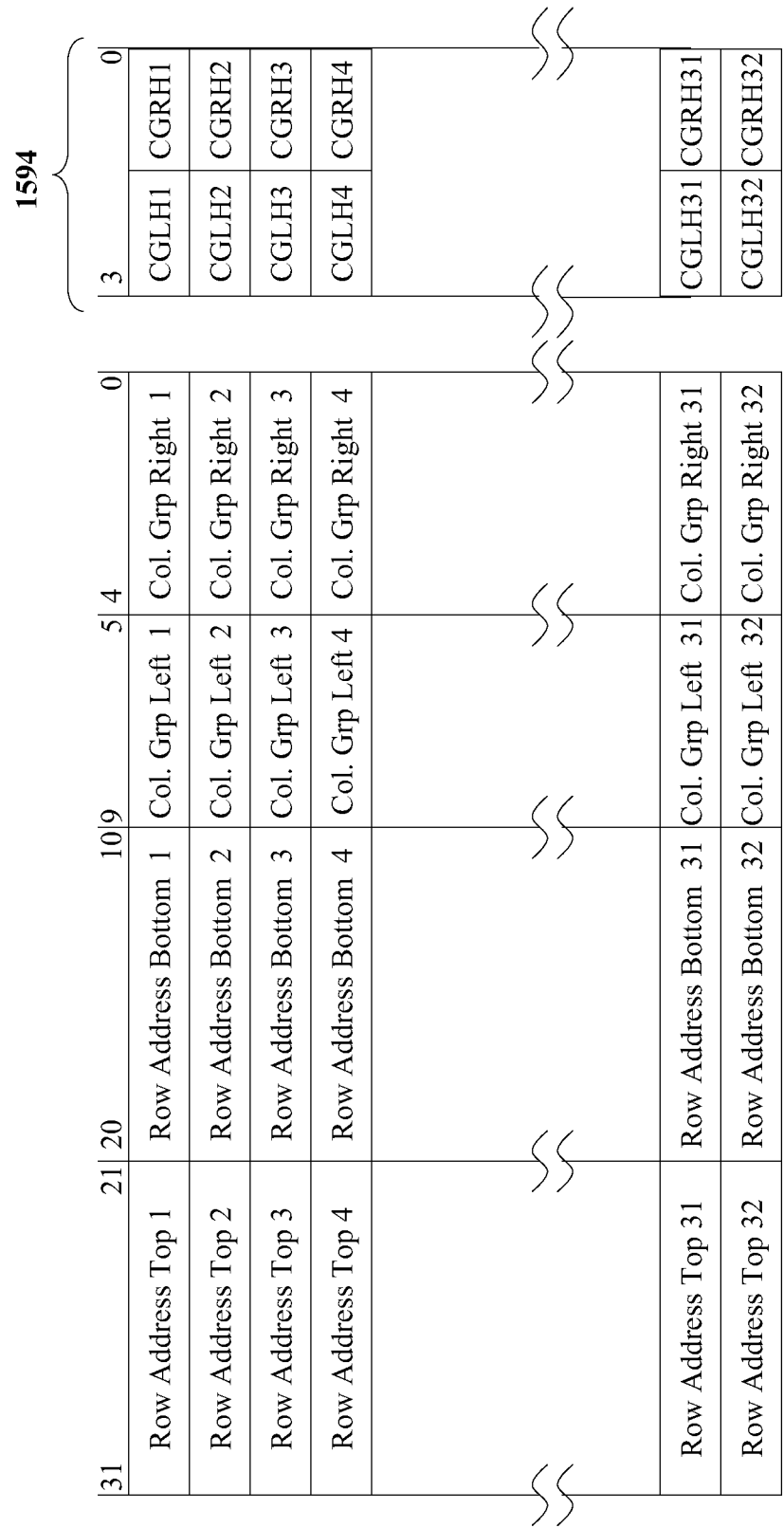
FIG. 15B illustrates a data structure that may be used to define windows that are overlaid on top of a full-motion video window.

To handle the overlay windows, one embodiment uses software to determine the approximate location of all the overlay windows that are overlaid on top of the full-motion video window 1510. The horizontal dimension of the overlay windows may be designated by determining which display screen column slices each overlay window begins and ends within. (In an alternate embodiment that will be described with reference to FIG. 16A, the full-motion video window is divided into another set of column slices.) The overlay window coordinate information is then loaded into a data structure that will be used by the video output system hardware to determine when the video output system needs to read from the frame buffer (due to an overlay window) while within confines of the full-motion video window 1510. FIG. 15B illustrates an example of a data structure (or register structure) that may be used to store overlay window definitions that are defined using the screen column slices of FIG. 15A.

The table structure of FIG. 15B contains information defining up to 32 overlay windows that may be laid on top of the full-motion video window. Other implementations may handle a different number of overlay windows. The information needed to fill the overlay window table of FIG. 15B is obtained while examining the macro-blocks of the screen frame buffer updates.

In the specific embodiment disclosed in FIG. 15B, the exact start and stop rows for each overlay window (the top and bottom boundaries of the overlay window) will be determined. In other embodiments the display screen is also divided into horizontal slices such that the start and stop rows (the top and bottom boundaries of the overlay window) are defined as approximate values. When such approximate values are used, the video output system will read from both the frame buffer and the full-motion video buffer while within the horizontal slice containing the top or bottom boundary and use the presence of key color information to determine whether to use frame buffer or full-motion video pixels.

In one embodiment, software examines each screen buffer update as it is received and determines the information needed to fill the table of FIG. 15B using temporary storage memory. When the software has completed its calculations and has determined new overlay window boundary values, the software instructs the video output system hardware to load the information from the temporary storage memory and into table of FIG. 15B during a vertical synchronization (VSYNC) period.

Each overlay window entry in the table structure of FIG. 15B defines the top, bottom, left, and right edges of an overlay window that has been overlaid on top of the full-motion video window. The top and bottom edges may be defined with the specific rows where the overlay window begins and ends in the vertical dimension or with approximate values using horizontal slice values. In the specific implementation of FIG. 15B, 11 bits provide enough information to define a specific boundary row value between 0 and 1079 for the screen display depicted in of FIG. 15A. In the table of FIG. 15B, the left and right side boundaries are defined only by the column slice that the overlay window side boundary falls within. The table of FIG. 15B uses 5 bits of data for each side boundary which provides enough information to define a value between 0 and 29 such that the 30 column slices in the screen display of FIG. 15A may be defined.

Note that systems may be constructed which support more than one column slice size. For example, if the column slice size was defined to be only 16 pixels wide instead of 64 pixels wide, then there will be more column slices to divide the same screen resolution. To handle this larger number of column slices, an extra two bits of information in the optional additional table 1594 of FIG. 15B may be used to define the column size location of the overlay window edges.

FIG. 15C illustrates the table structure of FIG. 15B filled with the overlay window information that defines the locations of the overlay window W1 1511 and overlay window W2 1512 illustrated in FIG. 15A. The first overlay window entry in FIG. 15C defines overlay window W1 1511 as having a top boundary of row of W1T, a bottom boundary row of W1B, a left side boundary in column of H, and a right side boundary in column of L (using the window boundary designations in FIG. 15A). Similarly, the second overlay window entry defines overlay window W2 1512 as having a top boundary of row of W2T, a bottom boundary of row of W2B, a left side boundary in column of P, and a right side boundary in column of U. Since there are only two overlay windows in FIG. 15A, the remaining overlay window entries are designated as 'empty'. Designating empty entries in the table may be done by placing an invalid value in the table entries, using flag bits for each table entry, or any other suitable method that indicates which overlay window entries in the table of FIGS. 15B and 15C are valid.

Once the overlay window table structure of FIG. 15C has been constructed, that overlay window table may be used to fill bit-map register used to control the video output system during the scan of each row of the display screen. Specifically, the bit map-register controls whether the video output system reads data out of the frame buffer and/or the full-motion video buffer during the scan of each row. The bit-map register has one bit for each column section of the scan line row.

The bit-map register may be filled by the video output system right before each row scan begins. In one embodiment, the video output system will construct the bit-map register for the top row of the display during the VSYNC time period and then will create the bit-map register for the next row of the display while the current row is being scanned. In another embodiment, the system determines the contents of the bit map register for the next row during the HSYNC time period after each row scan ends.

In the specific example presented in FIGS. 15A and 15C, the screen display has been divided into 30 columns that are 64 pixels wide each. Thus, the bit-map register will be at least 30 bits wide. FIG. 15D conceptually illustrates a 30 bit wide register wherein each bit in the register represents a corresponding column slice (as designated by the corresponding letter) of the display screen illustrated in 15A. In a real implementation, the bit-map register structure of FIG. 15D may be reversed since the least significant bit on the right side may correspond to the left most starting column in FIG. 15A. However, this document will use the order depicted in FIG. 15D for clarity.

To illustrate the way the bit-map register may be used, an example scan of the display illustrated in FIG. 15 will be described using the overlay window data presented in the table of FIG. 15C. At the start of the scan for the display screen depicted in FIG. 15A, the bit-map register is not needed until the video output system begins scanning across the full-motion video window 1510. Once video output system scan reaches the top of full-motion video window 1510 that begins at row FMVT, the bit-map register will become important for determining which buffer(s) to read pixel data from. The bit-map register will be filled using the data in the table of FIG. 15C.

The bit-map register is used to designate where the overlay windows (such as overlay window W1 1511 and overlay window W2 1512) lie within the full-motion video window 1510 for the row that is currently being scanned. Referring to FIG. 15A, the initial rows of the full-motion video window 1510 are not covered by overlay windows such that the bit-map register will be empty as depicted in FIG. 15E. When the bit-map register is empty, the video output system will generally only read from the full-motion video buffer while it is scanning within the full-motion video window. The one exception is that video output system will also read from the frame buffer for the columns that contain the left and right borders of the full-motion video window. For example, the full-motion video window 1510 depicted in FIG. 15A has left and right borders that fall within columns F and W such that the video output system will read from both the frame buffer and the full-motion video buffer for those two columns. The data read from the frame buffer will be combined with the data read from the full-motion video buffer using the key color pixel data in the frame buffer.

Referring to FIG. 15A, the video output system will eventually scan down to reach row W1T where the first overlay window W1 1511 begins. Thus, the video output system will begin to represent overlay window W1 1511 within the bit-map register. As illustrated in FIG. 15A and depicted in the table of FIG. 15C, overlay window W1 1511 resides within columns H to L starting at row W1T (and ending at row W1B). This will be reflected in the bit-map register that is used to control the video output system. FIG. 15F illustrates how the bit-map register will appear beginning at row W1T and up until row W2T (where window W2 1512 begins). As illustrated in FIG. 15F, window W1 1511 is represented by a series of "1"s from column H to column L.

While within a full-motion video window, the video output system will generally read data only from the full-motion video buffer when the bit-map register specifies a '0' (with the exception of the border column as specified earlier). For example, the bit-map register of FIG. 15F specifies a '0' in column G such that the system only reads from the full-motion video buffer for column G.

When the bit-map register specifies a transition from '0' to '1' where an overlay window begins, the video output system will read from both the frame buffer and the full-motion video buffer for that transition column slice. The key color pixels in the frame buffer data will be used to combine the data read from both the frame buffer and the full-motion video buffer. Then, for the sequentially following '1's in the bit-map register (except a later '1' before a transition back to '0'), the video output system will only read from the frame buffer. Thus, for column H, the video output system will read from both the frame buffer and the full-motion video buffer for that transition column. Then, starting in column I and continuing to column K the video output system will only read from the frame buffer (until the next transition) since the video output system is scanning across the overlay window W1 1511 that blocks the full-motion video in full-motion video window 1510.

When the bit-map register subsequently transitions from '1' back to '0', the system will again read from both the frame buffer and the full-motion video buffer for that transition column slice. Specifically, the video output system will read from both the frame buffer and the full-motion video buffer for that final column that contains a '1' before the transition to a '0' in the bit-map register. In the example of FIG. 15A and FIG. 15F, the video output system will read from both the frame buffer and the full-motion video buffer for the transition column slice L. Again, the key color pixels in the frame buffer data will be used to combine the data read from both the frame buffer and the full-motion video buffer.

After the transition column slice ending an overlay window, the video output system will then resume reading only from the full-motion video buffer for each subsequent '0' in the bit-map register. In the example of FIG. 15F, the video output system will read only from full-motion video buffer starting at column M until the right side border of the full-motion video window is reached since the bit map register of FIG. 15F specifies a '0' for all the remaining columns. The video output system will proceed to process the subsequent scan rows using the bit-map register as depicted in FIG. 15F until the video output system reaches row W2T where the top row of overlay window W2 1512 begins.

At row W2T, the video output scan encounters the top of overlay window W2 1512. As illustrated in FIG. 15A, overlay window W2 1512 extends from column slice P to column slice U. FIG. 15G illustrates how the bit-map register will appear from row W2T up until row W1B where overlay window W1 1511 ends. Note that there are now two sections of '1' bits (from slice H to slice L and from slice P to slice U) in the bit-map register of FIG. 15G to indicate where the two overlay windows are located. Again, the system specifies a '1' in the register when any portion of the column is covered by an overlay window. The video output system will use the bit-map register to determine whether to read from the frame buffer, the full-motion video buffer, or both. The transitions from '0' to '1' and from '1' to '0' specify when the video output system should read from buffers.

After row W1B (and until row W2B), the bit-map register will appear as depicted in FIG. 15H where only overlay window W2 1512 is represented in the bit map register. After row W2B, there are no more overlay windows for the rest of the full-motion video window such that the bit-map register will again be empty as depicted in FIG. 15E again. After row FMVB where the full-motion video window ends, the bit-map register is no longer needed. Thus, the video output system will only read from the frame buffer for the remainder of the display screen scan.

FIGS. 16A to 16G illustrate an alternate embodiment that uses two different bit-map registers and two different associated tables. The first bit-map register is used to read pixel data from the frame buffer and operates as depicted with reference to FIGS. 15C to 15H. The second bit-map register (and associated overlay window table) is used when reading from the full-motion frame buffer. The use of two different bit-map registers (and associated overlay window tables) can simplify some technical details. Firstly, the use of a separate bit map register for the full-motion video buffer helps facilitate data reads that are aligned with the byte boundaries. Second, the use of the separate bit map register for the full-motion video buffer helps deal with the fact that the frame buffer and the full-motion video buffer operate in different scales.

Figure 16A:
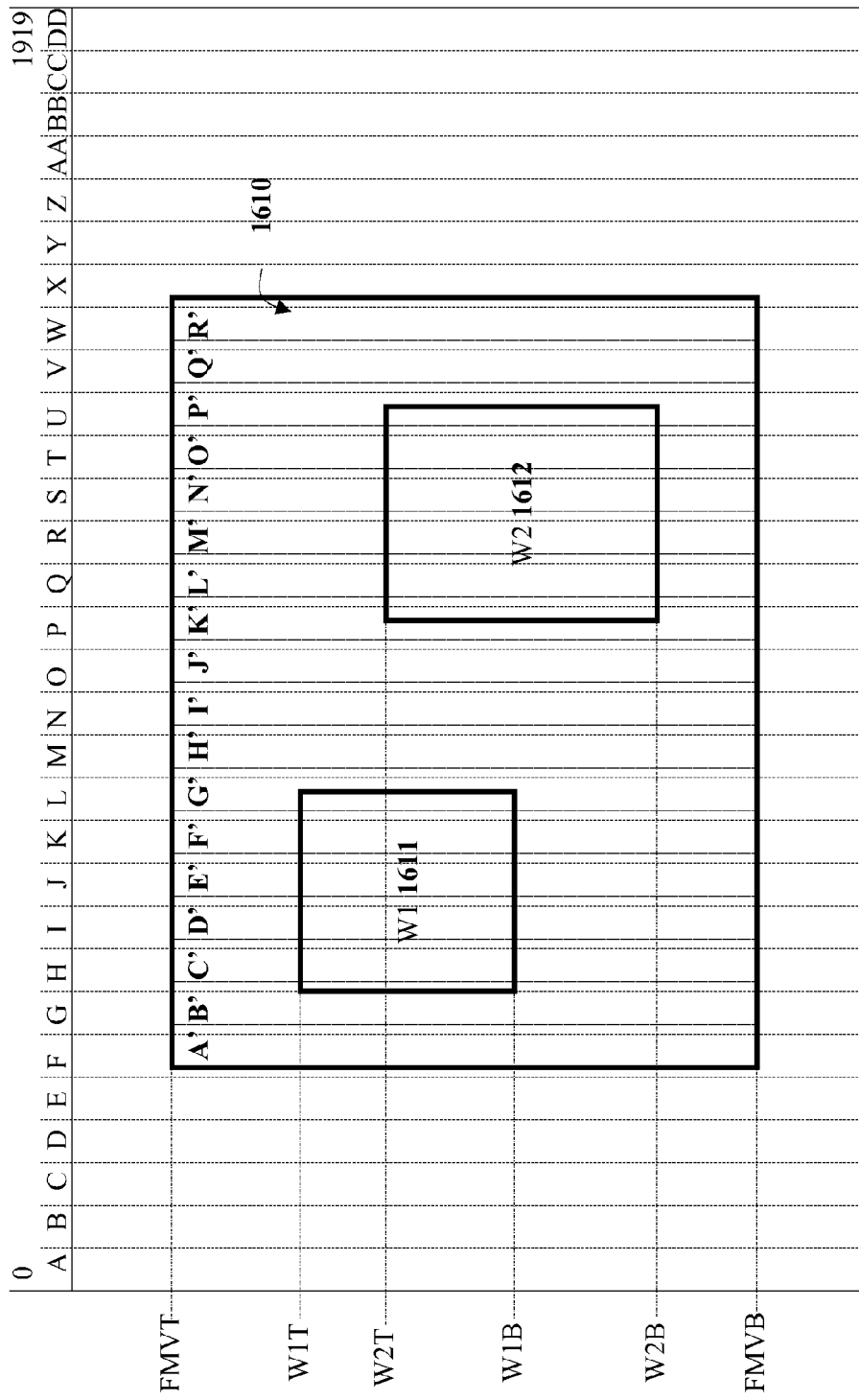
FIG. 16A illustrates a screen display with a full-motion video window and two windows overlaid on top of the full-motion video window wherein both the frame buffer and the full-motion video buffer have been divided into column slices.

The two different bit-map registers are each aligned to different sets of column slices. Referring to FIGS. 16A and 16C, the first bit-map register is aligned to the column slices A to DD in the frame buffer and operates as depicted with reference to FIGS. 15C to 15H. The second bit-map register is aligned to column slices A' to R' within in the full-motion video buffer. Note that although the slices are depicted in the same scale on FIG. 16A (the full-motion video window and the frame buffer are show to have a 1-to-1 pixel mapping), the column slice scales will often be different due to the scale of the full-motion video source data not being the same scale as the full-motion video window. Thus, the frame buffer and the full-motion video buffer each have their own sets of overlay window tables and bit map registers.

Referring to FIG. 16A, with respect to the full-motion video buffer column slices, overlay window W1 1611 starts in column B' and ends in column G'. Similarly, overlay window W2 1612 starts in column K' and ends in column P'. When the video output system is scanning through the full-motion video window, the default action will be to read from the full-motion video buffer. Conversely, when an overlay window blocks the full-motion video then the video output system should not read from full-motion video buffer. However, in those column slices where the side border of an overlay window resides, the video output system will read from both the frame buffer and the full-motion video buffer and use key color information to identify the exact overlay window border. Thus, the table structure for full-motion video buffer will exclude those column slices that contain the side boundary of the overlay window.

Figure 16B:
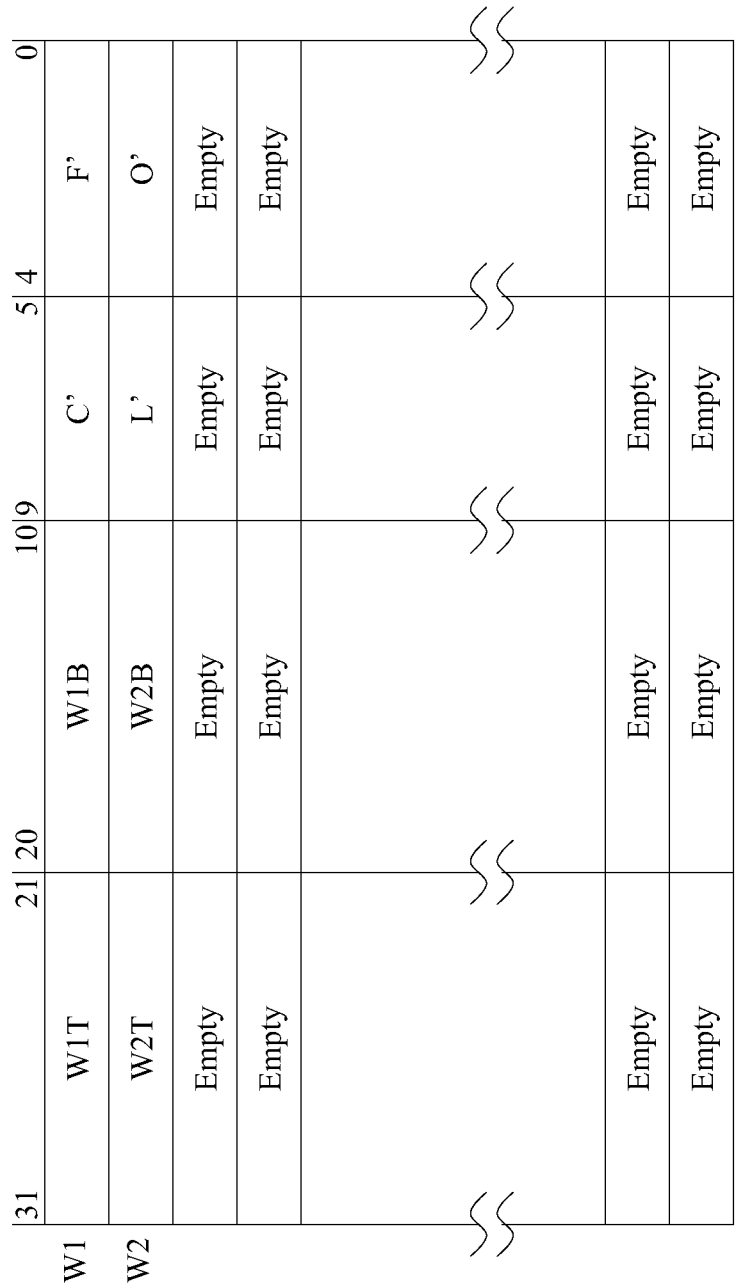
FIG. 16B illustrates a data structure that may be used to define windows that are overlaid on top of a full-motion video window.

FIG. 16B illustrates a table that specifies the locations of the overlay windows which exclude the column slices containing the side borders. The first overlay window W1 1611 that extends from column B' to column G' is represented as existing from column C' to column F' since the border column slices are excluded. Similarly, the second overlay window W2 1612 that extends from column K' to column P' is represented as existing from column L' to column O'. As the video output system scans down the display, the contents of the table in FIG. 16B will be used to fill the second bit map register. The second bit map register is then used to identify when the video output system should not read from the full-motion video buffer while scanning across the full-motion video window 1610. This will be illustrated by example.

Referring to FIG. 16A, from the top of the full-motion video window 1610 until row W1T, the bit map register for the full-motion video buffer will contain all zeros as illustrated in FIG. 16D since there are no overlay windows until row W1T. From row W1T until row W2T, the bit map register will reflect the presence of the first overlay window W1 1611 that extends from column B' to column G'. But this second register is used to specify when the video output system should not read from the full-motion video buffer, the table of FIG. 16B represents overlay window W1 1611 as extending from column C' to column F'. Thus, overlay window W1 1611 is specified by having '1's from column C' to column F' as illustrated in FIG. 16E. As the video output system scans across the full-motion video window 1610 on row W1T, the video output system will read from the full-motion video buffer for columns A' and B', then skip columns C' to F', and resume reading from columns G' to R'.

At row W2T, the second overlay window W2 1612 begins such that the bit map register for the full-motion video buffer will contain '1's from column C' to column F' (for overlay window W1 1611) and from column L' to column O' (for overlay window W2 1612) as illustrated in FIG. 16F. Thus, for rows W2T to W1B, the video output system will read from the full-motion video buffer for all the columns except from column C' to column F' and from column L' to column O'. After row W1B, only overlay window W2 1612 remains such that the bit-map register will appear as illustrated in FIG. 16G. Finally, after row W2B, there are no more overlay windows such that the bit-map register will be empty as illustrated in FIG. 16D.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A digital video display system, said digital video display system comprising:
   a frame buffer, said frame buffer comprising a digital representation of a display screen;
   a frame buffer data structure defining a first set of slices specific to said frame buffer;
   a full-motion video window definition, said full-motion video window definition defining an area of said frame buffer wherein a full-motion video is to be displayed using a full-motion video data structure defining a second set of slices specific to a full-motion video buffer, a scale of said second set of slices being different than a scale of said first set of slices, said second set of slices representing said area of said full-motion video wherein said full-motion video is to be displayed;
   the full-motion video buffer, said full-motion video buffer comprising a representation of a full-motion video;
   an overlay window locator, said overlay window locator determining sub-areas of said full-motion video window that are obscured by at least one overlay window, said first set of slices representing a portion of said area being obscured by said at least one overlay window; and
   a display data reading system for a video output system, said display data reading system reading from said frame buffer while scanning said frame buffer at a location not within said full-motion video window definition or when said overlay window locator specifies an overlay window, wherein reading from said frame buffer is based on said frame buffer data structure,
   else from said full-motion video buffer, wherein reading from said full-motion video buffer is based on said full-motion video data structure.

2. The digital video display system as set forth in claim 1, said digital video display system further comprising:
   a first data structure, said first data structure defining horizontal slices and vertical slices of said frame buffer based upon edges of overlay windows; and
   a second data structure, said second data structure defining a truth table based on said horizontal slices and vertical slices of said frame buffer.

3. The digital video display system as set forth in claim 1, said digital video display system further comprising:
   a first data structure, said first data structure listing overlay windows in a horizontal order; and
   a second data structure, said second data structure listing overlay windows in a vertical order.

4. The digital video display system as set forth in claim 1 wherein said frame buffer includes embedded codes, said embedded codes specifying where static pixels reside and where full-motion video pixels reside.

5. The digital video display system as set forth in claim 1, wherein the representation of the full-motion video is encoded with YUV colorspace.

6. The digital video display system as set forth in claim 1, wherein the representation of the display screen is encoded with RGB colorspace.

7. The digital video display system as set forth in claim 1, wherein the full-motion video window definition defines the sub-areas using the full-motion video data structure on a source scale and wherein the overlay window locator determines the sub-areas using the frame buffer data structure on a display scale.

8. The digital video display system as set forth in claim 1, wherein data in the frame buffer data structure and data in the full-motion video data structure are adjusted when a size of the full-motion video window is changed or when the at least one overlay window is changed.

9. The digital video display system as set forth in claim 1 wherein said overlay window locator detects key color pixels.

10. The digital video display system as set forth in claim 9 wherein said overlay window locator detects said key color pixels while receiving updates to said frame buffer.

11. The digital video display system as set forth in claim 1 wherein said overlay window locator determines:
    a first set of sub-areas of said full-motion video window not blocked by said at least one overlay window including determining exact coordinates of said first set of sub-areas; and
    a second set of sub-areas of said full-motion video window fully blocked by said at least one overlay window including determining exact coordinates of said second set of sub-areas.

12. The digital video display system as set forth in claim 1 wherein said overlay window locator detects exact coordinates of said at least one overlay window.

13. A digital video display system, said digital video display system comprising:
    a frame buffer, said frame buffer comprising a digital representation of a display screen;

a frame buffer data structure defining a first set of slices specific to said frame buffer;

a full-motion video window definition, said full-motion video window definition defining a full-motion video window area of said frame buffer wherein a full-motion video is to be displayed using a full-motion video data structure defining a second set of slices specific to a full-motion video buffer, a scale of said second set of slices being different than a scale of said first set of slices, said second set of slices representing said area of said full-motion video wherein said full-motion video is to be displayed, said first set of slices representing a portion of said area being obscured by said at least one overlay window, said full motion video window area overlaid by one or more overlay windows;

the full-motion video buffer, said full-motion video buffer comprising a representation of a full-motion video;

an overlay window detector, said overlay window detector detecting,
 a first set of sub areas of said full-motion video window definition not blocked by said overlay windows,
 a second set of sub areas of said full-motion video window definition fully blocked by said overlay windows, and
 a third set of sub areas of said full-motion video window definition partially blocked by said overlay windows; and a display data reading system for a video output system, said display data reading system reading data
 from said frame buffer while scanning a location not within said full-motion video window definition, wherein reading from said frame buffer is based on said frame buffer data structure,
 from said full-motion video buffer while scanning said first set of sub areas of said full-motion video window definition not blocked by said overlay windows, wherein reading from said full-motion video buffer is based on said full-motion video data structure,
 from said frame buffer while scanning said second set of sub areas of said full-motion video window definition fully blocked by said overlay windows, and
 from said frame buffer and said full-motion video buffer while scanning said third set of sub areas of said full-motion video window definition partially blocked by said overlay windows.

14. The digital video display system as set forth in claim 13 wherein said overlay window detector detects key color pixels.

15. The digital video display system as set forth in claim 14 wherein said overlay window detector detects said key color pixels while receiving updates to said frame buffer.

16. The digital video display system as set forth in claim 13 wherein said display data reading system generates a bit map register, said bit map register specifying said first set of sub areas of said full-motion video window definition partially blocked by said overlay windows and said second set of sub areas of said full-motion video window definition fully blocked by said overlay windows.

17. The digital video display system as set forth in claim 13 wherein said display data reading system for a video output system uses pixel key color information to determine whether to use data from said frame buffer or data from said full-motion video buffer while scanning said first set of said first set of sub areas of said full-motion video window definition partially blocked by said overlay windows.

18. The digital video display system as set forth in claim 13 wherein said first, second, and third set of sub areas of said full-motion video window definition comprise horizontal sections of a scan line row.

19. The digital video display system as set forth in claim 13, wherein the representation of the full-motion video is encoded with YUV colorspace.

20. The digital video display system as set forth in claim 13, wherein the representation of the display screen is encoded with RGB colorspace.

21. The digital video display system as set forth in claim 13, wherein the full-motion video window definition defines the first, second, and third sub-areas using the full-motion video data structure on a source scale and wherein the overlay window locator determines the sub-areas first, second, and third using the frame buffer data structure on a display scale.

22. A method of generating a video signal in a digital video system, said method comprising:
 receiving a location of a full-motion video window, said full-motion video window location defining an area of a frame buffer wherein a full-motion video is to be displayed within a frame buffer including defining the area using a full-motion video data structure defining a second set of slices specific to a full-motion video buffer, a scale of said second set of slices being different than a scale of a first set of slices of a frame buffer data structure defining the first set of slices specific to the frame buffer, said second set of slices representing said area of said full-motion video wherein said full-motion video is to be displayed, said first set of slices representing a portion of said area being obscured by said at least one overlay window, said frame buffer comprising a digital representation of a display screen;
 receiving locations of overlay windows overlaid on top of said full-motion video window; and
 during a scan of said frame buffer for display
  reading from said frame buffer when scanning outside of said full-motion video window location or crossing an overlay window, wherein reading from said frame buffer is based on said frame buffer data structure, and
  reading from a full-motion video buffer when scanning within said full-motion video window location and not crossing an overlay window, wherein reading from said full-motion video buffer is based on said full-motion video data structure.

23. The method of generating a video signal in a digital video system as set forth in claim 22, said method further comprising:
 creating a first data structure, said first data structure defining horizontal slices and vertical slices of said frame buffer based upon edges of overlay windows; and
 creating a second data structure, said second data structure defining a truth tables based on said horizontal slices and vertical slices of said frame buffer.

24. The method of generating a video signal in a digital video system as set forth in claim 22, said method further comprising:
 creating a first data structure, said first data structure listing overlay windows in a horizontal order; and
 creating a second data structure, said second data structure listing overlay windows in a vertical order.

25. The method of generating a video signal in a digital video system as set forth in claim 22 wherein said frame buffer includes embedded codes, said embedded codes specifying said full-motion video window location and locations of said overlay windows.

26. A method of generating a video signal in a digital video system, said method comprising:
receiving a location of a full-motion video window, said full-motion video window location defining an area of a frame buffer wherein a full-motion video is to be displayed within a frame buffer including defining the area using a full-motion video data structure defining a second set of slices specific to a full-motion video buffer, a scale of said second set of slices being different than a scale of a first set of slices of a frame buffer data structure defining the first set of slices specific to the frame buffer, said second set of slices representing said area of said full-motion video wherein said full-motion video is to be displayed, said first set of slices representing a portion of said area being obscured by said at least one overlay window, said frame buffer comprising a digital representation of a display screen, said full-motion video window location having overlay windows overlaid on top of said full-motion video window;
detecting
a first set of sub areas of said full-motion video window definition not blocked by said overlay windows,
a second set of sub areas of said full-motion video window definition fully blocked by said overlay windows, and
a second set of sub areas of said full-motion video window definition partially blocked by said overlay windows; and
scanning said frame buffer for display, during said scan of said frame buffer for display, reading data
from said frame buffer while scanning a location not within said full-motion video window definition, wherein reading from said frame buffer is based on said frame buffer data structure,
from said full-motion video buffer while scanning said first set of sub areas of said full-motion video window definition not blocked by said overlay windows, wherein reading from said full-motion video buffer is based on said full-motion video data structure,
from said frame buffer while scanning said second set of sub areas of said full-motion video window definition fully blocked by said overlay windows, and
from said frame buffer and said full-motion video buffer while scanning said third set of sub areas of said full-motion video window definition partially blocked by said overlay windows.

27. The method of generating a video signal in a digital video system as set forth in claim 26 wherein said detecting comprises identifying key color pixels.

28. The method of generating a video signal in a digital video system as set forth in claim 27 wherein said identifying key color pixels occurs while receiving updates to said frame buffer.

29. The method of generating a video signal in a digital video system as set forth in claim 26, said method further comprising
generating a bit map register, said bit map register specifying said first, second, and third set of sub areas of said full-motion video window definition.

30. The method of generating a video signal in a digital video system as set forth in claim 26, said method further comprising
combining data from said frame buffer and said full-motion video buffer in said third set of sub areas using pixel key color data from said frame buffer.

31. The method of generating a video signal in a digital video system as set forth in claim 26 wherein said first, second, and third set of sub areas of said full-motion video window definition comprise horizontal sections of a scan line row.

* * * * *